United States Patent
Platzer et al.

(10) Patent No.: US 9,367,232 B2
(45) Date of Patent: Jun. 14, 2016

(54) PORTABLE MULTIFUNCTION DEVICE, METHOD, AND GRAPHICAL USER INTERFACE SUPPORTING USER NAVIGATIONS OF GRAPHICAL OBJECTS ON A TOUCH SCREEN DISPLAY

(71) Applicant: Apple Inc., Cupertino, CA (US)

(72) Inventors: Andrew Emilio Platzer, Santa Clara, CA (US); Charles J. Pisula, Bethesda, MD (US); Imran Chaudhri, San Francisco, CA (US); Steven P. Jobs; Gregory Christie, San Jose, CA (US); Scott Forstall, Los Altos, CA (US); Stephen O. Lemay, San Francisco, CA (US); Michael Matas, San Francisco, CA (US); Gregory Novick, San Francisco, CA (US); Marcel van Os, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 246 days.

(21) Appl. No.: 14/011,639

(22) Filed: Aug. 27, 2013

(65) Prior Publication Data

US 2014/0068483 A1 Mar. 6, 2014

Related U.S. Application Data

(63) Continuation of application No. 11/969,809, filed on Jan. 4, 2008, now Pat. No. 8,519,964.

(60) Provisional application No. 60/937,993, filed on Jun. 29, 2007, provisional application No. 60/937,990, filed on Jun. 29, 2007, provisional application No. 60/879,469, filed on Jan. 8, 2007, provisional application No. 60/879,253, filed on Jan. 7, 2007.

(51) Int. Cl.
*G06F 3/041* (2006.01)
*G06F 3/0488* (2013.01)
(Continued)

(52) U.S. Cl.
CPC ............ *G06F 3/0488* (2013.01); *G06F 1/1626* (2013.01); *G06F 1/1656* (2013.01);
(Continued)

(58) Field of Classification Search
None
See application file for complete search history.

(56) References Cited

U.S. PATENT DOCUMENTS

| 5,051,736 A | 9/1991 | Bennett et al. |
| 5,146,556 A | 9/1992 | Hullot et al. |

(Continued)

FOREIGN PATENT DOCUMENTS

| AU | 2006338183 A1 | 8/2007 |
| AU | 2012202140 A1 | 5/2012 |

(Continued)

OTHER PUBLICATIONS

International Preliminary Report on Patentability received for PCT Patent Application No. PCT/US2008/050430, issued on Jul. 7, 2009, 10 pages.

(Continued)

*Primary Examiner* — Adam R Giesy
(74) *Attorney, Agent, or Firm* — Morrison & Foerster LLP

(57) ABSTRACT

A portable multifunction device displays a first user interface object and a second user interface object on a touch screen display. Upon detecting a finger-down event at the first user interface object and one or more finger-dragging events on the touch screen display, the device moves the first user interface object on the touch screen display along a path determined by the finger-dragging events until the first user interface object at least in part overlaps the second user interface object. Upon detecting a finger-up event at the second user interface object, the device visually replaces the second user interface object with the first user interface object.

3 Claims, 34 Drawing Sheets

(51) Int. Cl.
  *G06F 1/16* (2006.01)
  *G06F 3/0486* (2013.01)
  *H04M 1/725* (2006.01)
  *G06F 3/0481* (2013.01)
  *H04M 1/67* (2006.01)

(52) U.S. Cl.
  CPC ............ *G06F1/1684* (2013.01); *G06F 3/0412* (2013.01); *G06F 3/0486* (2013.01); *G06F 3/04817* (2013.01); *G06F 3/04883* (2013.01); *G06F 3/04886* (2013.01); *H04M 1/7258* (2013.01); *H04M 1/72522* (2013.01); *H04M 1/72552* (2013.01); *H04M 1/72563* (2013.01); *G06F 2200/1614* (2013.01); *H04M 1/67* (2013.01); *H04M 1/72558* (2013.01); *H04M 1/72583* (2013.01); *H04M 2250/12* (2013.01); *H04M 2250/22* (2013.01)

(56) References Cited

U.S. PATENT DOCUMENTS

| | | | | |
|---|---|---|---|---|
| 5,196,838 | A | 3/1993 | Meier et al. | |
| 5,491,778 | A | 2/1996 | Gordon et al. | |
| 5,598,524 | A | 1/1997 | Johnston, Jr. et al. | |
| 5,610,653 | A | 3/1997 | Abecassis | |
| 5,612,719 | A | 3/1997 | Beernink et al. | |
| 5,642,490 | A | 6/1997 | Morgan et al. | |
| 5,644,739 | A | 7/1997 | Moursund | |
| 5,657,049 | A | 8/1997 | Ludolph et al. | |
| 5,726,687 | A | 3/1998 | Belfiore et al. | 345/341 |
| 5,745,096 | A | 4/1998 | Ludolph et al. | |
| 5,745,116 | A | 4/1998 | Pisutha-Arnond | |
| 5,745,910 | A | 4/1998 | Piersol et al. | |
| 5,754,179 | A | 5/1998 | Hocker et al. | |
| 5,757,371 | A | 5/1998 | Oran et al. | |
| 5,760,773 | A | 6/1998 | Berman et al. | 345/347 |
| 5,774,119 | A | 6/1998 | Alimpich et al. | |
| 5,796,401 | A | 8/1998 | Winer | 345/433 |
| 5,812,862 | A | 9/1998 | Smith et al. | |
| 5,825,349 | A | 10/1998 | Maier et al. | |
| 5,825,357 | A | 10/1998 | Malamud et al. | |
| 5,870,683 | A | 2/1999 | Wells et al. | |
| 5,877,765 | A | 3/1999 | Dickman et al. | 345/349 |
| 5,914,716 | A | 6/1999 | Rubin et al. | 345/347 |
| 5,914,717 | A | 6/1999 | Kleewein et al. | 345/352 |
| 5,923,327 | A | 7/1999 | Smith et al. | 345/341 |
| 5,934,707 | A | 8/1999 | Johnson | |
| 5,995,106 | A | 11/1999 | Naughton et al. | 345/357 |
| 6,025,842 | A | 2/2000 | Filetto et al. | |
| 6,043,818 | A | 3/2000 | Nakano et al. | |
| 6,049,336 | A | 4/2000 | Liu et al. | 345/353 |
| 6,069,626 | A | 5/2000 | Cline et al. | |
| 6,072,486 | A | 6/2000 | Sheldon et al. | |
| 6,073,036 | A | 6/2000 | Heikkinen et al. | |
| 6,111,573 | A | 8/2000 | McComb et al. | |
| 6,133,914 | A | 10/2000 | Rogers et al. | 345/334 |
| 6,144,863 | A | 11/2000 | Charron | 455/566 |
| 6,145,083 | A | 11/2000 | Shaffer et al. | |
| 6,177,936 | B1 | 1/2001 | Cragun | |
| 6,195,094 | B1 | 2/2001 | Celebiler | 345/339 |
| 6,199,082 | B1 | 3/2001 | Ferrel et al. | |
| 6,229,542 | B1 | 5/2001 | Miller | 345/358 |
| 6,243,080 | B1 | 6/2001 | Molne | |
| 6,256,008 | B1 | 7/2001 | Sparks et al. | |
| 6,262,732 | B1 | 7/2001 | Coleman et al. | |
| 6,262,735 | B1 | 7/2001 | Eteläperä | |
| 6,271,841 | B1 | 8/2001 | Tsujimoto | |
| 6,275,935 | B1 | 8/2001 | Barlow et al. | 713/182 |
| 6,278,454 | B1 | 8/2001 | Krishnan | 345/349 |
| 6,297,795 | B1 | 10/2001 | Kato et al. | |
| 6,313,853 | B1 | 11/2001 | Lamontagne et al. | |
| 6,313,855 | B1 | 11/2001 | Shuping et al. | |
| 6,317,140 | B1 | 11/2001 | Livingston et al. | |
| 6,323,846 | B1 | 11/2001 | Westerman et al. | 345/173 |
| 6,326,970 | B1 | 12/2001 | Mott et al. | |
| 6,349,410 | B1 | 2/2002 | Lortz | |
| 6,353,451 | B1 | 3/2002 | Teibel et al. | 345/803 |
| 6,359,615 | B1 | 3/2002 | Singh | |
| 6,377,698 | B1 | 4/2002 | Cumoli et al. | |
| 6,396,520 | B1 | 5/2002 | Ording | 345/798 |
| 6,407,757 | B1 | 6/2002 | Ho | |
| 6,411,283 | B1 | 6/2002 | Murphy | |
| 6,433,801 | B1 | 8/2002 | Moon et al. | 345/840 |
| 6,466,198 | B1 | 10/2002 | Feinstein | |
| 6,466,203 | B1 | 10/2002 | Ee | |
| 6,486,895 | B1 | 11/2002 | Robertson et al. | |
| 6,489,975 | B1 | 12/2002 | Patil et al. | |
| 6,496,182 | B1 | 12/2002 | Wong et al. | |
| 6,545,669 | B1 | 4/2003 | Kinawi et al. | |
| 6,570,557 | B1 | 5/2003 | Westerman et al. | 345/173 |
| 6,570,583 | B1 | 5/2003 | Kung et al. | |
| 6,590,568 | B1 | 7/2003 | Astala et al. | 345/173 |
| 6,597,391 | B2 | 7/2003 | Hudson | |
| 6,613,100 | B2 | 9/2003 | Miller | |
| 6,621,768 | B1 | 9/2003 | Keller et al. | |
| 6,628,309 | B1 | 9/2003 | Dodson et al. | |
| 6,629,793 | B1 | 10/2003 | Miller | |
| 6,639,584 | B1 | 10/2003 | Li | |
| 6,677,932 | B1 | 1/2004 | Westerman | 345/173 |
| 6,683,628 | B1 | 1/2004 | Nakagawa et al. | |
| 6,700,612 | B1 | 3/2004 | Anderson et al. | |
| 6,710,788 | B1 | 3/2004 | Freach et al. | |
| 6,714,222 | B1 | 3/2004 | Björn et al. | |
| 6,727,916 | B1 | 4/2004 | Ballard | |
| 6,763,388 | B1 | 7/2004 | Tsimelzon | 709/228 |
| 6,771,250 | B1 | 8/2004 | Oh | |
| 6,781,575 | B1 | 8/2004 | Hawkins et al. | |
| 6,820,111 | B1 | 11/2004 | Rubin et al. | |
| 6,915,294 | B1 | 7/2005 | Singh et al. | |
| 6,915,490 | B1 | 7/2005 | Ewing | |
| 6,928,461 | B2 | 8/2005 | Tuli | |
| 6,931,601 | B2 | 8/2005 | Vronay et al. | 715/767 |
| 6,934,911 | B2 | 8/2005 | Salmimaa et al. | |
| 6,950,949 | B1 | 9/2005 | Gilchrist | |
| 6,956,564 | B1 | 10/2005 | Williams | |
| 6,970,749 | B1 | 11/2005 | Chinn et al. | |
| 6,976,210 | B1 | 12/2005 | Silva et al. | 715/513 |
| 6,978,127 | B1 | 12/2005 | Bulthuis et al. | 455/412.1 |
| 6,987,991 | B2 | 1/2006 | Nelson | |
| 6,990,452 | B1 | 1/2006 | Ostermann et al. | |
| 7,007,239 | B1 | 2/2006 | Hawkins et al. | |
| 7,017,118 | B1 | 3/2006 | Carroll | |
| 7,030,861 | B1 | 4/2006 | Westerman et al. | |
| 7,054,965 | B2 | 5/2006 | Bell et al. | |
| 7,071,943 | B2 | 7/2006 | Adler | 345/473 |
| 7,075,512 | B1 | 7/2006 | Fabre et al. | |
| 7,085,590 | B2 | 8/2006 | Kennedy et al. | |
| 7,093,201 | B2 | 8/2006 | Duarte | |
| 7,134,095 | B1 | 11/2006 | Smith et al. | 715/860 |
| 7,149,549 | B1 | 12/2006 | Ortiz et al. | |
| 7,166,791 | B2 | 1/2007 | Robbin et al. | |
| 7,167,731 | B2 | 1/2007 | Nelson | |
| 7,171,625 | B1 | 1/2007 | Sacchi | |
| 7,221,933 | B2 | 5/2007 | Sauer et al. | |
| 7,231,229 | B1 | 6/2007 | Hawkins et al. | 455/564 |
| 7,283,845 | B2 | 10/2007 | De Bast | 455/566 |
| 7,310,636 | B2 | 12/2007 | Bodin et al. | |
| 7,346,855 | B2 | 3/2008 | Hellyar et al. | |
| 7,355,593 | B2 | 4/2008 | Hill et al. | 345/173 |
| 7,360,166 | B1 | 4/2008 | Krzanowski | |
| 7,362,331 | B2 | 4/2008 | Ording | 345/473 |
| 7,432,928 | B2 | 10/2008 | Shaw et al. | 345/473 |
| 7,434,177 | B1 | 10/2008 | Ording et al. | 715/862 |
| 7,437,005 | B2 * | 10/2008 | Drucker | G06F 3/0483 382/205 |
| 7,461,353 | B2 | 12/2008 | Rohrabaugh et al. | |
| 7,480,870 | B2 | 1/2009 | Anzures et al. | |
| 7,487,467 | B1 | 2/2009 | Kawahara et al. | |
| 7,490,295 | B2 | 2/2009 | Chaudhri et al. | |
| 7,493,573 | B2 | 2/2009 | Wagner | |
| 7,506,268 | B2 | 3/2009 | Jennings et al. | 715/786 |
| 7,509,588 | B2 | 3/2009 | van Os et al. | 715/835 |
| 7,512,898 | B2 | 3/2009 | Jennings et al. | 715/822 |

(56) References Cited

U.S. PATENT DOCUMENTS

| | | | |
|---|---|---|---|
| 7,526,738 B2 | 4/2009 | Ording et al. | 715/862 |
| 7,546,548 B2 | 6/2009 | Chew et al. | |
| 7,546,554 B2 | 6/2009 | Chiu et al. | |
| 7,561,874 B2 | 7/2009 | Wang et al. | 455/418 |
| 7,587,671 B2 | 9/2009 | Saft et al. | |
| 7,587,683 B2 | 9/2009 | Ito et al. | |
| 7,603,105 B2 | 10/2009 | Bocking et al. | |
| 7,614,008 B2 | 11/2009 | Ording | |
| 7,624,357 B2 | 11/2009 | De Bast | 715/828 |
| 7,633,076 B2 | 12/2009 | Huppi et al. | |
| 7,642,934 B2 | 1/2010 | Scott | |
| 7,650,137 B2 | 1/2010 | Jobs et al. | |
| 7,653,883 B2 | 1/2010 | Hotelling et al. | |
| 7,657,252 B2 | 2/2010 | Futami | |
| 7,657,849 B2 | 2/2010 | Chaudhri et al. | |
| 7,663,607 B2 | 2/2010 | Hotelling et al. | |
| 7,669,135 B2 | 2/2010 | Cunningham et al. | |
| 7,683,889 B2 | 3/2010 | Rimas Ribikauskas et al. | |
| 7,694,231 B2 | 4/2010 | Kocienda et al. | |
| 7,719,542 B1 | 5/2010 | Gough et al. | |
| 7,720,893 B2 | 5/2010 | Boudreau et al. | |
| 7,730,401 B2 | 6/2010 | Gillespie et al. | |
| 7,735,021 B2 | 6/2010 | Padawer et al. | |
| 7,739,271 B2 | 6/2010 | Cook et al. | |
| 7,739,604 B1 | 6/2010 | Lyons et al. | |
| 7,747,289 B2 | 6/2010 | Wang et al. | 455/566 |
| 7,783,583 B2 | 8/2010 | Sendhoff et al. | |
| 7,783,990 B2 | 8/2010 | Amadio et al. | |
| 7,788,583 B1 | 8/2010 | Amzallag et al. | |
| 7,805,684 B2 | 9/2010 | Arvilommi | 715/829 |
| 7,810,038 B2 | 10/2010 | Matsa et al. | 715/765 |
| 7,831,926 B2 | 11/2010 | Rohrabaugh et al. | |
| 7,835,729 B2 | 11/2010 | Hyon | |
| 7,840,901 B2 | 11/2010 | Lacey et al. | |
| 7,844,889 B2 | 11/2010 | Rohrabaugh et al. | |
| 7,844,914 B2 | 11/2010 | Andre et al. | |
| 7,853,972 B2 | 12/2010 | Brodersen et al. | 725/40 |
| 7,856,602 B2 | 12/2010 | Armstrong | |
| 7,917,846 B2 | 3/2011 | Decker et al. | |
| 7,934,152 B2 | 4/2011 | Krishnamurthy et al. | |
| 7,940,250 B2 | 5/2011 | Forstall | |
| 7,957,762 B2 | 6/2011 | Herz et al. | |
| 7,958,457 B1 | 6/2011 | Brandenberg et al. | |
| 7,996,789 B2 | 8/2011 | Louch et al. | |
| 8,006,002 B2 | 8/2011 | Kalayjian et al. | |
| 8,239,784 B2 | 8/2012 | Hotelling et al. | |
| 8,279,180 B2 | 10/2012 | Hotelling et al. | |
| 8,365,084 B1 | 1/2013 | Lin et al. | |
| 8,381,135 B2 | 2/2013 | Hotelling et al. | |
| 8,446,371 B2 | 5/2013 | Fyke et al. | |
| 8,479,122 B2 | 7/2013 | Hotelling et al. | |
| 8,519,964 B2 | 8/2013 | Platzer et al. | |
| 8,519,972 B2 | 8/2013 | Forstall | |
| 8,558,808 B2 | 10/2013 | Forstall | |
| 8,601,370 B2 | 12/2013 | Chiang et al. | |
| 8,619,038 B2 | 12/2013 | Chaudhri et al. | |
| 8,788,954 B2 | 7/2014 | Lemay et al. | |
| 2001/0024195 A1 | 9/2001 | Hayakawa | 345/173 |
| 2001/0024212 A1 | 9/2001 | Ohnishi | 345/769 |
| 2002/0015024 A1 | 2/2002 | Westerman et al. | 345/173 |
| 2002/0015042 A1 | 2/2002 | Robotham et al. | 345/581 |
| 2002/0015064 A1 | 2/2002 | Robotham et al. | |
| 2002/0024540 A1 | 2/2002 | McCarthy | |
| 2002/0038299 A1 | 3/2002 | Zernik et al. | |
| 2002/0054090 A1 | 5/2002 | Silva et al. | 345/747 |
| 2002/0085037 A1 | 7/2002 | Leavitt et al. | |
| 2002/0093531 A1 | 7/2002 | Barile | |
| 2002/0104096 A1 | 8/2002 | Cramer et al. | |
| 2002/0152283 A1 | 10/2002 | Dutta et al. | |
| 2002/0188948 A1 | 12/2002 | Florence | |
| 2002/0191029 A1 | 12/2002 | Gillespie et al. | 345/810 |
| 2003/0007012 A1 | 1/2003 | Bate | |
| 2003/0013483 A1 | 1/2003 | Ausems et al. | |
| 2003/0014415 A1 | 1/2003 | Weiss et al. | |
| 2003/0016241 A1 | 1/2003 | Burke | 345/733 |
| 2003/0025676 A1 | 2/2003 | Cappendijk | |
| 2003/0030664 A1 | 2/2003 | Parry | |
| 2003/0033331 A1 | 2/2003 | Sena et al. | |
| 2003/0048295 A1 | 3/2003 | Lilleness et al. | 345/738 |
| 2003/0063125 A1 | 4/2003 | Miyajima et al. | |
| 2003/0081135 A1 | 5/2003 | Boll | |
| 2003/0090572 A1 | 5/2003 | Belz et al. | |
| 2003/0095135 A1 | 5/2003 | Kaasila et al. | |
| 2003/0095155 A1 | 5/2003 | Johnson | |
| 2003/0117427 A1 | 6/2003 | Haughawout et al. | |
| 2003/0117440 A1 | 6/2003 | Hellyar et al. | |
| 2003/0132938 A1 | 7/2003 | Shibao | |
| 2003/0164861 A1 | 9/2003 | Barbanson et al. | |
| 2003/0169298 A1 | 9/2003 | Ording | 345/810 |
| 2003/0174172 A1 | 9/2003 | Conrad et al. | |
| 2003/0184552 A1 | 10/2003 | Chadha | 345/581 |
| 2003/0184587 A1 | 10/2003 | Ording et al. | 345/769 |
| 2003/0193524 A1 | 10/2003 | Bates et al. | |
| 2003/0200289 A1 | 10/2003 | Kemp et al. | |
| 2003/0206195 A1 | 11/2003 | Matsa et al. | 345/744 |
| 2003/0206197 A1 | 11/2003 | McInerney | |
| 2003/0210280 A1 | 11/2003 | Baker et al. | |
| 2003/0225811 A1 | 12/2003 | Ali et al. | |
| 2004/0021643 A1 | 2/2004 | Hoshino et al. | |
| 2004/0041849 A1 | 3/2004 | Mock et al. | |
| 2004/0056839 A1 | 3/2004 | Yoshihara | |
| 2004/0093582 A1 | 5/2004 | Segura | |
| 2004/0103156 A1 | 5/2004 | Quillen et al. | |
| 2004/0103371 A1 | 5/2004 | Chen et al. | |
| 2004/0109025 A1 | 6/2004 | Hullot et al. | |
| 2004/0121823 A1 | 6/2004 | Noesgaard et al. | |
| 2004/0138569 A1 | 7/2004 | Grunwald et al. | |
| 2004/0141011 A1 | 7/2004 | Smethers et al. | |
| 2004/0143796 A1 | 7/2004 | Lerner et al. | |
| 2004/0155909 A1 | 8/2004 | Wagner | |
| 2004/0169674 A1 | 9/2004 | Linjama | |
| 2004/0177148 A1 | 9/2004 | Tsimelzon, Jr. | 709/227 |
| 2004/0201595 A1 | 10/2004 | Manchester | |
| 2004/0205492 A1 | 10/2004 | Newsome | |
| 2004/0205496 A1 | 10/2004 | Dutta et al. | |
| 2004/0215719 A1 | 10/2004 | Altshuler | 709/204 |
| 2004/0221006 A1 | 11/2004 | Gopalan et al. | |
| 2004/0222975 A1 | 11/2004 | Nakano et al. | 345/173 |
| 2004/0268400 A1 | 12/2004 | Barde et al. | |
| 2005/0005246 A1 | 1/2005 | Card et al. | |
| 2005/0005248 A1 | 1/2005 | Rockey et al. | |
| 2005/0020317 A1 | 1/2005 | Koyama | |
| 2005/0024341 A1 | 2/2005 | Gillespie et al. | |
| 2005/0026644 A1 | 2/2005 | Lien | |
| 2005/0039134 A1 | 2/2005 | Wiggeshoff et al. | |
| 2005/0044509 A1 | 2/2005 | Hunleth et al. | |
| 2005/0057524 A1 | 3/2005 | Hill et al. | 345/173 |
| 2005/0057548 A1 | 3/2005 | Kim | 345/204 |
| 2005/0060653 A1 | 3/2005 | Fukase et al. | |
| 2005/0060664 A1 | 3/2005 | Rogers | 715/810 |
| 2005/0060665 A1 | 3/2005 | Rekimoto | 715/810 |
| 2005/0066286 A1 | 3/2005 | Makela | |
| 2005/0071364 A1 | 3/2005 | Xie et al. | |
| 2005/0071736 A1 | 3/2005 | Schneider et al. | |
| 2005/0071778 A1 | 3/2005 | Tokkonen | |
| 2005/0078804 A1 | 4/2005 | Yomoda | |
| 2005/0079896 A1 | 4/2005 | Kokko et al. | |
| 2005/0091609 A1 | 4/2005 | Matthews et al. | 715/804 |
| 2005/0093826 A1 | 5/2005 | Huh | |
| 2005/0097089 A1 | 5/2005 | Nielsen et al. | 707/3 |
| 2005/0108657 A1 | 5/2005 | Han | |
| 2005/0114788 A1 | 5/2005 | Fabritius | |
| 2005/0120142 A1 | 6/2005 | Hall | |
| 2005/0134578 A1 | 6/2005 | Chambers et al. | 345/184 |
| 2005/0154798 A1 | 7/2005 | Nurmi | |
| 2005/0156873 A1 | 7/2005 | Walter et al. | |
| 2005/0166232 A1 | 7/2005 | Lamkin et al. | |
| 2005/0169527 A1 | 8/2005 | Longe et al. | |
| 2005/0177783 A1 | 8/2005 | Agrawala et al. | |
| 2005/0183017 A1 | 8/2005 | Cain | |
| 2005/0190059 A1 | 9/2005 | Wehrenberg | |
| 2005/0192924 A1 | 9/2005 | Drucker et al. | |
| 2005/0204385 A1 | 9/2005 | Sull et al. | |
| 2005/0210018 A1 | 9/2005 | Singh et al. | |

(56) References Cited

U.S. PATENT DOCUMENTS

| | | |
|---|---|---|
| 2005/0210369 A1 | 9/2005 | Damm, Jr. |
| 2005/0210403 A1 | 9/2005 | Satanek |
| 2005/0229102 A1 | 10/2005 | Watson et al. ............... 715/739 |
| 2005/0229118 A1 | 10/2005 | Chiu et al. |
| 2005/0250438 A1 | 11/2005 | Makipaa et al. ............ 455/3.06 |
| 2005/0251755 A1 | 11/2005 | Mullins et al. |
| 2005/0253817 A1 | 11/2005 | Rytivaara et al. |
| 2005/0262448 A1 | 11/2005 | Vronay et al. ............... 715/767 |
| 2005/0267869 A1 | 12/2005 | Horvitz et al. |
| 2005/0275636 A1 | 12/2005 | Dehlin et al. ................. 345/173 |
| 2005/0285880 A1 | 12/2005 | Lai et al. |
| 2005/0289458 A1 | 12/2005 | Kylmanen |
| 2005/0289476 A1 | 12/2005 | Tokkonen |
| 2006/0005207 A1 | 1/2006 | Louch et al. |
| 2006/0007182 A1 | 1/2006 | Sato et al. |
| 2006/0017692 A1 | 1/2006 | Wehrenberg et al. |
| 2006/0025110 A1 | 2/2006 | Liu |
| 2006/0026170 A1 | 2/2006 | Kreitler et al. |
| 2006/0026521 A1 | 2/2006 | Hotelling et al. |
| 2006/0026536 A1 | 2/2006 | Hotelling et al. |
| 2006/0033724 A1 | 2/2006 | Chaudhri et al. |
| 2006/0033761 A1 | 2/2006 | Suen et al. |
| 2006/0036944 A1 | 2/2006 | Wilson |
| 2006/0051073 A1 | 3/2006 | Jung et al. |
| 2006/0053386 A1 | 3/2006 | Kuhl et al. |
| 2006/0053387 A1 | 3/2006 | Ording |
| 2006/0055662 A1 | 3/2006 | Rimas-Ribikauskas et al. |
| 2006/0055700 A1 | 3/2006 | Niles et al. |
| 2006/0064647 A1 | 3/2006 | Tapuska et al. |
| 2006/0075355 A1 | 4/2006 | Shiono et al. ................ 715/778 |
| 2006/0080616 A1 | 4/2006 | Vogel et al. .................. 715/769 |
| 2006/0085743 A1 | 4/2006 | Baudisch et al. |
| 2006/0085763 A1 | 4/2006 | Leavitt et al. |
| 2006/0097991 A1 | 5/2006 | Hotelling et al. |
| 2006/0101354 A1 | 5/2006 | Hashimoto et al. |
| 2006/0105814 A1 | 5/2006 | Monden et al. |
| 2006/0112335 A1 | 5/2006 | Hofmeister et al. .......... 715/701 |
| 2006/0116578 A1 | 6/2006 | Grunwald et al. |
| 2006/0117197 A1 | 6/2006 | Nurmi |
| 2006/0123360 A1 | 6/2006 | Anwar et al. ................. 715/810 |
| 2006/0125799 A1 | 6/2006 | Hillis et al. |
| 2006/0129647 A1 | 6/2006 | Kaghazian |
| 2006/0143574 A1 | 6/2006 | Ito et al. |
| 2006/0146016 A1 | 7/2006 | Chan et al. |
| 2006/0146038 A1 | 7/2006 | Park et al. |
| 2006/0148526 A1 | 7/2006 | Kamiya et al. |
| 2006/0153531 A1 | 7/2006 | Kanegae et al. |
| 2006/0161871 A1 | 7/2006 | Hotelling et al. |
| 2006/0168510 A1 | 7/2006 | Bryar et al. |
| 2006/0174211 A1 | 8/2006 | Hoellerer et al. |
| 2006/0179415 A1 | 8/2006 | Cadiz et al. |
| 2006/0190833 A1 | 8/2006 | SanGiovanni et al. |
| 2006/0197753 A1 | 9/2006 | Hotelling |
| 2006/0209035 A1 | 9/2006 | Jenkins et al. |
| 2006/0224997 A1 | 10/2006 | Wong et al. |
| 2006/0236266 A1 | 10/2006 | Majava |
| 2006/0238625 A1 | 10/2006 | Sasaki et al. |
| 2006/0242145 A1 | 10/2006 | Krishnamurthy et al. |
| 2006/0242596 A1 | 10/2006 | Armstrong |
| 2006/0242604 A1 | 10/2006 | Wong et al. |
| 2006/0242607 A1 | 10/2006 | Hudson |
| 2006/0265643 A1 | 11/2006 | Saft et al. |
| 2006/0271864 A1 | 11/2006 | Satterfield et al. |
| 2006/0271867 A1 | 11/2006 | Wang et al. |
| 2006/0271874 A1 | 11/2006 | Raiz et al. .................... 715/767 |
| 2006/0277460 A1 | 12/2006 | Forstall et al. ................ 715/513 |
| 2006/0277588 A1 | 12/2006 | Harrington et al. |
| 2006/0278692 A1 | 12/2006 | Matsumoto et al. |
| 2006/0282786 A1 | 12/2006 | Shaw et al. |
| 2006/0282790 A1 | 12/2006 | Matthews et al. |
| 2006/0284852 A1 | 12/2006 | Hofmeister et al. .......... 345/173 |
| 2006/0290661 A1 | 12/2006 | Innanen et al. |
| 2007/0004451 A1 | 1/2007 | Anderson |
| 2007/0013665 A1 | 1/2007 | Vetelainen et al. |
| 2007/0022386 A1 | 1/2007 | Boss et al. |
| 2007/0024646 A1 | 2/2007 | Saarinen et al. |
| 2007/0028269 A1 | 2/2007 | Nezu et al. ..................... 725/52 |
| 2007/0030362 A1 | 2/2007 | Ota et al. ...................... 348/239 |
| 2007/0038612 A1 | 2/2007 | Sull et al. |
| 2007/0055947 A1 | 3/2007 | Ostojic et al. ................. 715/800 |
| 2007/0067272 A1 | 3/2007 | Flynt et al. |
| 2007/0067738 A1 | 3/2007 | Flynt et al. |
| 2007/0083827 A1 | 4/2007 | Scott et al. |
| 2007/0083911 A1 | 4/2007 | Madden et al. ............... 725/135 |
| 2007/0101292 A1 | 5/2007 | Kupka |
| 2007/0101297 A1 | 5/2007 | Forstall et al. |
| 2007/0106952 A1 | 5/2007 | Matas et al. |
| 2007/0124677 A1 | 5/2007 | de los Reyes et al. ........ 715/705 |
| 2007/0132789 A1 | 6/2007 | Ording et al. |
| 2007/0150810 A1 | 6/2007 | Katz et al. |
| 2007/0150830 A1 | 6/2007 | Ording et al. |
| 2007/0152980 A1 | 7/2007 | Kocienda et al. |
| 2007/0152984 A1 | 7/2007 | Ording et al. |
| 2007/0155434 A1 | 7/2007 | Jobs et al. |
| 2007/0156697 A1 | 7/2007 | Tsarkova |
| 2007/0157089 A1 | 7/2007 | van Os et al. |
| 2007/0157228 A1 | 7/2007 | Bayer et al. |
| 2007/0177803 A1 | 8/2007 | Elias et al. .................... 382/188 |
| 2007/0177804 A1 | 8/2007 | Elias et al. |
| 2007/0180395 A1 | 8/2007 | Yamashita et al. |
| 2007/0189737 A1 | 8/2007 | Chaudhri et al. ............. 386/125 |
| 2007/0192741 A1 | 8/2007 | Yoritate et al. |
| 2007/0200713 A1 | 8/2007 | Weber et al. |
| 2007/0204218 A1 | 8/2007 | Weber et al. |
| 2007/0233695 A1 | 10/2007 | Boudreau et al. |
| 2007/0240079 A1 | 10/2007 | Flynt et al. |
| 2007/0243862 A1 | 10/2007 | Coskun et al. ................ 455/418 |
| 2007/0245250 A1 | 10/2007 | Schechter et al. ............ 715/760 |
| 2007/0250768 A1 | 10/2007 | Funakami et al. |
| 2007/0254722 A1 | 11/2007 | Kim et al. |
| 2007/0260999 A1 | 11/2007 | Amadio et al. |
| 2007/0263176 A1 | 11/2007 | Nozaki et al. |
| 2007/0266011 A1 | 11/2007 | Rohrs et al. |
| 2007/0266342 A1 | 11/2007 | Chang et al. |
| 2007/0288860 A1 | 12/2007 | Ording et al. |
| 2007/0288862 A1 | 12/2007 | Ording ........................... 715/788 |
| 2007/0288868 A1 | 12/2007 | Rhee et al. |
| 2007/0300160 A1 | 12/2007 | Ferrel et al. |
| 2008/0001924 A1 | 1/2008 | de los Reyes et al. |
| 2008/0005703 A1 | 1/2008 | Radivojevic et al. |
| 2008/0034309 A1 | 2/2008 | Louch et al. |
| 2008/0042984 A1 | 2/2008 | Lim et al. |
| 2008/0059906 A1 | 3/2008 | Toki |
| 2008/0062137 A1 | 3/2008 | Brodersen et al. |
| 2008/0082930 A1 | 4/2008 | Omernick et al. |
| 2008/0104515 A1 | 5/2008 | Dumitru et al. |
| 2008/0122796 A1 | 5/2008 | Jobs et al. ..................... 345/173 |
| 2008/0125180 A1 | 5/2008 | Hoffman et al. |
| 2008/0132252 A1 | 6/2008 | Altman et al. |
| 2008/0139176 A1 | 6/2008 | Kim |
| 2008/0161045 A1 | 7/2008 | Vuorenmaa |
| 2008/0168075 A1 | 7/2008 | Kamiyabu |
| 2008/0168367 A1 | 7/2008 | Chaudhri et al. ............. 715/764 |
| 2008/0168401 A1 | 7/2008 | Boule et al. |
| 2008/0168478 A1 | 7/2008 | Platzer et al. |
| 2008/0171555 A1 | 7/2008 | Oh et al. |
| 2008/0174562 A1 | 7/2008 | Kim |
| 2008/0182598 A1 | 7/2008 | Bowman |
| 2008/0182628 A1 | 7/2008 | Lee et al. ...................... 455/566 |
| 2008/0184052 A1 | 7/2008 | Itoh et al. |
| 2008/0184112 A1 | 7/2008 | Chiang et al. ................. 715/700 |
| 2008/0189108 A1 | 8/2008 | Atar |
| 2008/0201452 A1 | 8/2008 | Athas et al. |
| 2008/0216017 A1 | 9/2008 | Kurtenbach et al. |
| 2008/0231610 A1 | 9/2008 | Hotelling et al. |
| 2008/0259045 A1 | 10/2008 | Kim et al. |
| 2008/0268882 A1 | 10/2008 | Moloney |
| 2008/0300055 A1 | 12/2008 | Lutnick et al. |
| 2008/0300572 A1 | 12/2008 | Rankers et al. |
| 2008/0310602 A1 | 12/2008 | Bhupati |
| 2009/0002324 A1 | 1/2009 | Harbeson et al. |
| 2009/0006991 A1 | 1/2009 | Lindberg et al. |
| 2009/0007017 A1 | 1/2009 | Anzures et al. ............... 715/835 |
| 2009/0058821 A1 | 3/2009 | Chaudhri et al. |

(56) References Cited

U.S. PATENT DOCUMENTS

| | | | |
|---|---|---|---|
| 2009/0064055 A1 | 3/2009 | Chaudhri et al. ............. 715/863 |
| 2009/0128581 A1 | 5/2009 | Brid et al. | |
| 2009/0138827 A1 | 5/2009 | Van Os et al. | |
| 2009/0163193 A1 | 6/2009 | Fyke et al. | |
| 2009/0178008 A1 | 7/2009 | Herz et al. | |
| 2009/0199128 A1 | 8/2009 | Matthews et al. ............. 715/799 |
| 2009/0222765 A1 | 9/2009 | Ekstrand | |
| 2009/0249252 A1 | 10/2009 | Lundy et al. | |
| 2009/0254799 A1 | 10/2009 | Unger | |
| 2009/0288032 A1 | 11/2009 | Chang et al. | |
| 2009/0295753 A1 | 12/2009 | King et al. | |
| 2010/0095238 A1 | 4/2010 | Baudet | |
| 2010/0105454 A1 | 4/2010 | Weber et al. | |
| 2010/0169357 A1 | 7/2010 | Ingrassia et al. | |
| 2010/0179991 A1 | 7/2010 | Lorch et al. | |
| 2010/0283743 A1 | 11/2010 | Coddington | |
| 2010/0318709 A1 | 12/2010 | Bell et al. | |
| 2011/0007009 A1 | 1/2011 | Ishihara et al. | |
| 2014/0237360 A1 | 8/2014 | Chaudhri et al. | |
| 2015/0012853 A1 | 1/2015 | Chaudhri et al. | |

FOREIGN PATENT DOCUMENTS

| | | | |
|---|---|---|---|
| CA | 2349649 A1 | 1/2002 | |
| CN | 1257247 | 6/2000 | |
| CN | 1818843 A | 8/2006 | |
| CN | 1940833 A | 4/2007 | |
| EP | 322332 A2 | 6/1989 | |
| EP | 476972 A2 | 3/1992 | |
| EP | 0 626 635 A2 | 11/1994 | ................ G06F 3/00 |
| EP | 651544 A2 | 5/1995 | |
| EP | 689134 A1 | 12/1995 | |
| EP | 701220 A1 | 3/1996 | |
| EP | 0 844 553 A1 | 5/1998 | .............. G06F 3/023 |
| EP | 880090 A2 | 11/1998 | |
| EP | 1049305 A1 | 11/2000 | |
| EP | 1 143 334 A2 | 10/2001 | ................ G06F 9/44 |
| EP | 1 231 763 A1 | 8/2002 | ............ H04M 1/725 |
| EP | 1 517 228 A2 | 3/2005 | .............. G06F 3/033 |
| EP | 1632874 A2 | 3/2006 | |
| EP | 1 744 242 | 1/2007 | |
| EP | 1752880 A1 | 2/2007 | |
| EP | 1964022 B1 | 3/2010 | |
| FR | 2 819 675 A1 | 7/2002 | ................ H04Q 7/32 |
| GB | 2301217 A | 11/1996 | |
| GB | 2 329 813 A | 3/1999 | .............. G06F 3/033 |
| JP | 05225302 A | 9/1993 | |
| JP | 06051930 A | 2/1994 | |
| JP | 07225829 A | 8/1995 | |
| JP | 08221203 A | 8/1996 | |
| JP | 09 073381 | 3/1997 | |
| JP | 09097162 A | 4/1997 | |
| JP | 09101874 A | 4/1997 | |
| JP | 09138745 A | 5/1997 | |
| JP | 09258971 A | 10/1997 | |
| JP | 1096648 A | 4/1998 | |
| JP | 11143604 A | 5/1999 | |
| JP | 11242539 A | 9/1999 | |
| JP | 11327433 A | 11/1999 | |
| JP | 2000010702 A | 1/2000 | |
| JP | 2000105772 A | 4/2000 | |
| JP | 2000 163031 | 6/2000 | |
| JP | 2000163193 A | 6/2000 | |
| JP | 2000163444 A | 6/2000 | |
| JP | 2000181436 A | 6/2000 | |
| JP | 2000242390 A | 9/2000 | |
| JP | 2001142604 A | 5/2001 | |
| JP | 2001175386 A | 6/2001 | |
| JP | 2001265481 A | 9/2001 | |
| JP | 2001312347 A | 11/2001 | |
| JP | 2002041206 A | 2/2002 | |
| JP | 2002062966 A | 2/2002 | |
| JP | 2002099370 A | 4/2002 | |
| JP | 2002 149616 A | 5/2002 | |
| JP | 2002149312 A | 5/2002 | |
| JP | 2002244635 A | 8/2002 | |
| JP | 2002525705 A | 8/2002 | |
| JP | 2002323850 A | 11/2002 | |
| JP | 2003066941 A | 3/2003 | |
| JP | 2003139546 A | 5/2003 | |
| JP | 2003162356 A | 6/2003 | |
| JP | 2003248538 A | 9/2003 | |
| JP | 2003256142 A | 9/2003 | |
| JP | 2003271310 A | 9/2003 | |
| JP | 2004038310 A | 2/2004 | |
| JP | 2004062645 A | 2/2004 | |
| JP | 2004 070492 | 3/2004 | |
| JP | 2004118478 A | 4/2004 | |
| JP | 2004132741 A | 4/2004 | |
| JP | 2004 164242 | 6/2004 | |
| JP | 2004206230 A | 7/2004 | |
| JP | 2004227393 A | 8/2004 | |
| JP | 2004288208 A | 10/2004 | |
| JP | 2004318505 A | 11/2004 | |
| JP | 2004 341886 | 12/2004 | |
| JP | 2004343662 A | 12/2004 | |
| JP | 2005004396 A | 1/2005 | |
| JP | 2005018229 A | 1/2005 | |
| JP | 2005115896 A | 4/2005 | |
| JP | 2005515530 A | 5/2005 | |
| JP | 2005228088 A | 8/2005 | |
| JP | 2005234291 A | 9/2005 | |
| JP | 2005242669 A | 9/2005 | |
| JP | 2005267049 A | 9/2005 | |
| JP | 2005 309933 A | 11/2005 | ................ G06F 3/00 |
| JP | 2005 352924 | 12/2005 | |
| JP | 2005352943 A | 12/2005 | |
| JP | 2006018645 A | 1/2006 | |
| JP | 2007132676 A | 5/2007 | |
| JP | 2008123553 A | 5/2008 | |
| JP | 2008518330 A | 5/2008 | |
| JP | 2009051921 A | 3/2009 | |
| JP | 2009522666 A | 6/2009 | |
| JP | 2009151821 A | 7/2009 | |
| KR | 2002-0010863 | 2/2002 | |
| KR | 1020060085850 A | 7/2006 | |
| WO | WO 99/28815 | 6/1999 | |
| WO | WO 99/38149 A1 | 7/1999 | ............... G09G 5/00 |
| WO | 9954807 A1 | 10/1999 | |
| WO | WO 00/08757 A | 2/2000 | ............... H03J 1/00 |
| WO | 0116690 A2 | 3/2001 | |
| WO | WO 01/57716 A2 | 8/2001 | ............. G06F 17/00 |
| WO | WO 02/08881 A | 1/2002 | |
| WO | WO 02/13176 A2 | 2/2002 | |
| WO | 0246903 A1 | 6/2002 | |
| WO | 02082418 A2 | 10/2002 | |
| WO | 02093542 A1 | 11/2002 | |
| WO | 03052626 A1 | 6/2003 | |
| WO | 03060622 A2 | 7/2003 | |
| WO | 03107168 A1 | 12/2003 | |
| WO | 2004021166 A1 | 3/2004 | |
| WO | 2004040481 A1 | 5/2004 | |
| WO | WO 2004/063862 | 7/2004 | |
| WO | 2005036416 A2 | 4/2005 | |
| WO | WO 2005/041020 | 5/2005 | .............. G06F 3/033 |
| WO | 2005074268 A1 | 8/2005 | |
| WO | 2005106431 A1 | 11/2005 | |
| WO | 2006003591 A2 | 1/2006 | |
| WO | 2006019639 A2 | 2/2006 | |
| WO | WO 2006/020304 | 2/2006 | |
| WO | WO 2006/020305 A2 | 2/2006 | |
| WO | 2006037545 A2 | 4/2006 | |
| WO | WO 2006/036069 | 4/2006 | |
| WO | 2007031816 A1 | 3/2007 | |
| WO | WO 2007/032972 | 3/2007 | |
| WO | WO 2007/069835 A1 | 6/2007 | .............. G06F 3/041 |
| WO | 2007080559 A2 | 7/2007 | |
| WO | WO 2007/094894 A2 | 8/2007 | |
| WO | 2008030874 A1 | 3/2008 | |
| WO | 2008030976 A2 | 3/2008 | |

(56) References Cited

FOREIGN PATENT DOCUMENTS

| | | |
|---|---|---|
| WO | 2008086303 A1 | 7/2008 |
| WO | 2009089222 A2 | 7/2009 |

OTHER PUBLICATIONS

Apple, "Welcome to Tiger," copyright © 2005 Apple Computer, Inc., 32 pages, http://manuals.info.apple.com/en/Welcome_to_Mac_OS_X_v10.4_Tiger.pdf.
Cha, B., "HTC Touch (Sprint)," CNET Reviews, Nov. 6, 2007, http://web.archive.org/web/20071106065114/http://reviews.cnet.com/smartphones/htc-touch-sprint/4505-6452_7-3267123.html, 10 pages.
Chang et al., "Animation: From Cartoons to the User Interface," UIST '93 Conference Proceedings, Atlanta, GA, Nov. 1993, 12 pages.
Chartier, D., "iPhone 1.1.3 Video Brings the Proof," ars technics, Dec. 30, 2007, http://arstechnica.com/journals/apple.are/2007/12/30/iphone-1-1-3-video-brings-the-proof, 3 pages.
delltech, "Working with Graphics," Windows XP: The Complete Reference, Chapter 18, Apr. 5, 2005, 4 pages.
Dodge et al., "Microsoft Office Excel 2003 Office Manual," Microsoft Press, Jul. 12, 2004, vol. 1, p. 66-68, Unable to Locate English Translation.
Gade. L., "HTC Touch (Sprint)—MobileTechReview," Smartphone Reviews by Mobile Tech Review, Nov. 2, 2007, http://www.mobiletechreview.com/phones/HTC-Touch.htm, 7 pages.
SnapFiles, "Dexpot," SnapFiles.com, Oct. 10, 2007, 3 pages.
Tidwell, J., "Animated Transition," from Designing Interfaces, O'Reilly Media, Inc., Nov. 2005, pp. 84-85.
Widgipedia, "I Need a Bog and a Forum Please?" 2 pages, printed Oct. 19, 2006, http://www.widgipedia.com/widgets/details/adni18/hyalo-weather_27.html.
Zhang et al., "An Ergonomics Study of Menu-Operation on Mobile Phone Interface," In Proceedings of the Workshop on Intelligent Information Technology Application, Dec. 2007, 5 pages.
International Search Report and Written Opinion dated Jul. 8, 2008 for International Application No. PCT/US2007/077639, which corresponds to U.S. Appl. No. 11/850,010, 11 pages (Omernick).
Extended European Search Report dated Feb. 1, 2013, received in European Patent Application No. 12177813.8, which corresponds to U.S. Appl. No. 11/850,011, 6 pages (Forstall).
International Search Report and Written Opinion dated Nov. 27, 2009, received in International Application No. PCT/US2008/074341, which corresponds to U.S. Appl. No. 11/850,005, 25 pages (Chaudhri).
Office Action dated May 2, 2011, received in U.S. Appl. No. 11/850,010, 12 pages (Omernick).
Final Office Action dated Oct. 17, 2011, received in U.S. Appl. No. 11/850,010, 11 pages (Omernick).
Office Action dated May 16, 2012, received in U.S. Appl. No. 11/850,010, 12 pages (Omenick).
Final Office Action dated Feb. 15, 2013, received in U.S. Appl. No. 11/850,010, 21 pages (Omernick).
Office Action dated Jan. 18, 2012, received in Chinese Patent Application No. 200780041309.3, which corresponds to U.S. Appl. No. 11/850,011, 15 pages (Forstall).
Office Action dated Nov. 1, 2012, received in Chinese Patent Application No. 200780041309.3, which corresponds to U.S. Appl. No. 11/850,011, 5 pages (Forstall).
Office Action dated Mar. 4, 2011, received in European Application No. 07 814 689.1, which corresponds to U.S. Appl. No. 11/850,011, 6 pages (Forstall).
Summons to attend oral proceedings dated Dec. 1, 2011, received in European Patent Application No. 07814689.1, which corresponds to U.S. Appl. No. 11/850,011, 6 pages (Forstall).
Final Office Action dated Oct. 31, 2011, received in U.S. Appl. No. 11/969,912, 14 pages (Lemay).
Final Office Action dated Dec. 12, 2011, received in U.S. Appl. No. 12/242,851, 17 pages (Herz).
Office Action dated Sep. 20, 2012, received in U.S. Appl. No. 12/242,851, 21 pages (Herz).
Examiner's Report dated May 18, 2011, received in Australian Patent Application No. 2009204252, which corresponds to U.S. Appl. No. 12/242,851, 2 pages (Herz).
Notification of Acceptance dated Oct. 17, 2011, received in Australian Patent Application No. 2009204252, which corresponds to U.S. Appl. No. 12/242,851, 3 pages (Herz).
Office Action dated Oct. 21, 2011, received in Australian Patent Application No. 2011101194, which corresponds to U.S. Appl. No. 12/242,851, 2 pages (Herz).
Certification of Australian Innovation Patent No. 2011101194 dated Mar. 2, 2012, which correponds to U.S. Appl. No. 12/242,851, 4 pages (Herz).
Office Action dated Nov. 30, 2011, received in Chinese Patent Application No. 200980000229.2, which corresponds to U.S. Appl. No. 12/242,851, 24 pages (Herz).
Office Action dated Oct. 26, 2012, received in Chinese Patent Application No. 200980000229.2, which corresponds to U.S. Appl. No. 12/242,851, 22 pages (Herz).
Office Action dated Jun. 10, 2011, received in European Patent Application No. 09 700 333.9, which corresponds to U.S. Appl. No. 12/242,851, 5 pages (Herz).
Summons to oral proceedings dated Sep. 21, 2012, received in European Patent Application No. 09700333.9, which corresponds to U.S. Appl. No. 12/242,851, 4 pages (Herz).
Office Action dated Jan. 25, 2012, received in U.S. Appl. No. 12/217,029, 24 pages (Anzures).
Final Office Action dated Oct. 5, 2012, received in U.S. Appl. No. 12/217,029, 32 pages (Anzures).
Final Office Action dated Oct. 19, 2011, received in U.S. Appl. No. 12/364,470, 25 pages (van Os).
Office Action dated Dec. 14, 2011, received in U.S. Appl. No. 11/849,938, 30 pages (Chaudhri).
Final Office Action dated Jan. 30, 2013, received in U.S. Appl. No. 11/849,938, 38 pages (Chaudhri).
Notice of Acceptance dated Dec. 14, 2011, received in Australian Patent Application No. 2008296445, which corresponds to U.S. Appl. No. 11/849,938, 3 pages (Chaudhri).
Office Action dated Aug. 24, 2011, received in Chinese Patent Application No. 200880112570.2, which corresponds to U.S. Appl. No. 11/849,938, 6 pages (Chaudhri).
Office Action dated Feb. 20, 2013, received in Chinese Patent Application, which corresponds to U.S. Appl. No. 11/849,938, 5 pages (Chaudhri).
Office Action dated Feb. 13, 2013, received in Japanese Patent Application No. 2010-524102, which corresponds to U.S. Appl. No. 11/849,938, 2 pages (Chaudhri).
Office Action dated Oct. 26, 2012, received in Japanese Patent Application No. 2010-524102, which corresponds to U.S. Appl. No. 11/849,938, 4 pages (Chaudhri).
Office Action dated Aug. 8, 2011, received in Korean Patent Application No. 10-2010-7007258, which corresponds to U.S. Appl. No. 11/849,938, 2 pages (Chaudhri).
Office Action dated Jan. 30, 2013, received in Korean Patent Application No. 1020107007258, which corresponds to U.S. Appl. No. 11/849,938, 4 pages (Chaudhri).
Office Action dated Nov. 13, 2012, received in U.S. Appl. No. 13/104,903, 21 pages, (Forstall).
Office Action dated Feb. 20, 2013, received in U.S. Appl. No. 13/104,911, 25 pages (Forstall).
Final Office Action dated Sep. 14, 2012, received in U.S. Appl. No. 11/850,005, 22 pages (Chaudhri).
Decision to Grant dated Aug. 6, 2012, received in Chinese Patent Application No. 200880110709.X, which corresponds to U.S. Appl. No. 11/850,005, 2 pages (Chaudhri).
Agarawala et al, "Database Compendex/El," Engineering Information, Inc., Apr. 27, 2006, 1 page.
Agarawala et al., "Keepin' it Real: Pushing the Desktop Metaphor with Physics, Piles and the Pen," CHI Proceedings 2006, Apr. 22-27, 2006, Montréal, Québec, Canada, pp. 1283-1292.

(56) References Cited

OTHER PUBLICATIONS

Andrew's Widgets, "Developing Dashboard Widgets-What the Heck is a Widget," printed Jan. 25, 2008, 9 pages, http://andrew.hedges.name/widgets/dev/.
Anonymous, "Asus Eee PC Easy Mode Internet Tab Options," asuseeehacks.blogspot.com, Nov. 10, 2007, 33 pages, http://asuseeehacks.blogspot.com/2007/11/asus-eee-pc-user-interface-tour.html.
Anonymous, "Desktop Icon Toy—History," Oct. 8, 2009, 2 pages. http://www.idesksoft.com/history.html.
Apple.com, "Tiger Developer Overview Series—Developing Dashboard Widgets," printed Jun. 23, 2006, 9 pages, http://developer.apple.com/macosx/dashboard.html.
Apple Computer, Inc., "Dashboard Tutorial," Apple Computer, Inc. © 2004, 2006, 24 pages.
CNET, "Video:Create custom widgets with Web Clip," CNET News, Aug. 8, 2006, 3 pages, http://news.cnet.com/1606-2-103525.html.
Fondantfancies, "Dash Clipping: Don't wait for Mac OS X 10.5 Leopard," fondantfancies.com, Aug. 8, 2006, 9 pages, http://www.fondantfancies.com/blog/3001239/.
Hesseldahl, A., "An App the Mac can Brag About," Forbes.com, Dec. 15, 2003, 2 pages, http://www.forbes.com/2003/12/15/cx_ah_1215tentech_print.html.
Jazzmutant, "Jazzmutant Lemur," Nov. 16, 2005, 3 pages, http://64.233.167.104/search?q=cache:3g4wFSaZiXIJ:www.nuloop.c.
Jazzmutant, "The Lemur: Multitough Control Surface", printed Nov. 16, 2005, 3 pages http://64233.167.104/search?q=cache:j0_nFbNVzOcJ:www.cycling7.
Macworld, "Whip up a widget," Macworld.com., Sep. 23, 2005, 5 pages, http://www.macworld.com/article/46622/2005/09/octgeekfactor.html.
Macworld, "First Look: Leopard first looks: Dashboard," Aug. 9, 2006, 3 pages, http://www.macworld.com/article/52297/2005/08/leodash.html.
Mello, Jr., J. "Tiger's Dashboard Brings Widgets to New Dimension," MacNewsWorld, printed Jun. 23, 2006, 3 pages, http://www.macnewsworld.com/story/42630.html.
Opera Software, "Welcome to Widgetize," Copyright © 2006 Opera Software ASA, 1 page, http://widgets.opera.com/widgetize.
Wildarya, "iDesksoft Desktop Icon Toy v2.9," Oct. 16, 2007, 4 pages, http://www.dl4all.com/2007/10/16/idesksoft_desktop_icon_toy_v2.0.html.
International Search Report and Written Opinion dated May 8, 2008, received in International Application No. PCT/US2007/077543, which corresponds to U.S. Appl. No. 11/850,011.
International Search Report and Written Opinion dated Jun. 17, 2008, received in International Application No. PCT/US2008/050431, which corresponds to U.S. Appl. No. 11/969,912.
Invitation to Pay Additional Fees dated Nov. 16, 2009, received in International Patent Application No. PCT/US2009/030225, which corresponds to U.S. Appl. No. 12/242,851.
International Search Report and Written Opinion dated Feb. 25, 2010, received in International Application No. PCT/US2009/030225, which corresponds to U.S. Appl. No. 12/242,851.
Invitation to Pay Additional Fees dated Jun. 27, 2008, received in International Application No. PCT/US2008/050430, which corresponds to U.S. Appl. No. 11/969,809, 7 pages (Platzer).
International Search Report and Written Opinion dated Sep. 1, 2008, received in International Application No. PCT/US2008/050430, which corresponds to U.S. Appl. No. 11/969,809, 18 pages (Platzer).
International Preliminary Report on Patentability dated Jul. 15, 2010, received in International Application No. PCT/US2009/030225, which corresponds to U.S. Appl. No. 12/242,851.
International Preliminary Report on Patentability dated Mar. 18, 2010, received in International Application No. PCT/US2008/074625. which corresponds to U.S. Appl. No. 11/849,938, 7 pages.
Office Action dated Aug. 11, 2010, received in U.S Appl. No. 11/850,011.
Final Office Action dated Dec. 1, 2010, received in U.S Appl. No. 11/850,011.
Notice of Allowance dated Feb. 18, 2011, received in U.S. Appl. No. 11/850,011.
Office Action dated Apr. 13, 2011, received in U.S. Appl. No. 11/969,912.
Office Action dated Apr. 15, 2011, received in U.S. Appl. No. 12/242,851.
Examiner's Report dated Apr. 20, 2010, received in Australian Patent Application No. 2009204252, which corresponds to U.S. Appl. No. 12/242,851.
Office Action dated Nov. 26, 2010, received in European Patent Application No. 09 700 333.9, which corresponds to U.S. Appl. No. 12/242,851.
Office Action dated Apr. 18, 2011, received in U.S. Appl. No. 12/217,029.
Office Action dated Nov. 13, 2009 received in U.S. Appl. No. 12/364,470.
Final Office Action dated May 5, 2010, received in U.S. Appl. No. 12/364,470.
Office Action dated Sep. 2, 2010, received in U.S. Appl. No. 12/364,470.
Office Action dated Mar. 4, 2011, received in U.S. Appl. No. 12/364,470.
Office Action dated Oct. 12, 2010, received in U.S. Appl. No. 11/849,938.
Final Office Action dated May 27, 2011, received in U.S. Appl. No. 11/849,938.
Office Action dated Oct. 29, 2010, received in Australian Patent Application No. 2008296445, which corresponds to U.S. Appl. No. 11/849,938.
Office Action dated Oct. 15, 2010, received in European Application No. 08 829 660.3, which corresponds to U.S. Appl. No. 11/849,938.
European Search Report dated Jan. 16, 2013, received in European Patent Application No. 12194312.0, which corresponds to U.S. Appl. No. 12/242,851, 8 pages (Herz).
European Search Report dated Jan. 16, 2013, received in European Patent Application No. 12194315.3, which corresponds to U.S. Appl. No. 12/242,851, 7 pages (Herz).
Office Action dated Jul. 2, 2013, received in Chinese Patent Application No. 200780041309.3, which corresponds to U.S. Appl. No. 11/850,011. 12 pages (Forstall).
Office Action dated Mar. 14, 2011, received in U.S. Appl. No. 11/969,809, 25 pages (Platzer).
Final Office Action dated Jul. 14, 2011, received in U.S. Appl. No. 11/969,803, 31 pages (Platzer).
Notice of Allowance dated Apr. 26, 2013, received in U.S. Appl. No. 11/969,809, 23 pages (Platzer).
Office Action dated Sep. 10, 2013, received in U.S. Appl. No. 11/969,912, 20 pages (Lemay).
Final Office Action dated May 10, 2013, received in U.S. Appl. No. 12/242,851, 33 pages (Herz).
Examination Report dated Nov. 28, 2013, received in Australian Patent Application No. 2009204252, which corresponds to U.S. Appl. No. 12/242,851, 7 pages (Herz).
Office Action dated Nov. 19, 2013, received in Australian Patent Application No. 2012200475, which corresponds to U.S. Appl. No. 12/242,851, 4 pages (Herz).
Office Action dated Jul. 2, 2013, received in Chinese Patent Application No. 200980000229.2, which corresponds to U.S. Appl. No. 12/242,851, 4 pages (Herz).
Grant Notice dated Jun. 20, 2013, received in European Patent Application No. 09 700 333.9, which corresponds to U.S. Appl. No. 12/242,851, 7 pages (Herz).
Office Action dated Oct. 8, 2013, received in European Patent Application No. 12 194 312.0, which corresponds to U.S. Appl. No. 12/242,851, 5 pages (Herz).
Office Action dated Oct. 8, 2013, received in European Patent Application No. 12 194 315.3, which corresponds to U.S. Appl. No. 12/242,851, 5 pages, (Herz).
Office Action dated Aug. 19, 2013, received in U.S. Appl. No. 12/217,029, 10 pages (Anzures).
Notice of Allowance dated Oct. 10, 2013, received in U.S. Appl. No. 11/849,938, 35 pages (Chaudhri).

(56) References Cited

OTHER PUBLICATIONS

Office Action dated Aug. 12, 2013, received in Australian Patent No. 2012202140, which corresponds to U.S. Appl. No. 11/849,938, 2 pages (Chaudhri).
Office Action dated Aug. 2, 2013, received in European Patent Application No. 08 829 660.3, which corresponds to U.S. Appl. No. 11/849,938, 7 pages (Chaudhri).
Decision to Grant dated May 31, 2013, received in Japanese Patent Application No. 2010-524102, which corresponds to U.S. Appl. No. 11/849,938, 3 pages (Chaudhri).
Notice of Allowance dated Nov. 20, 2013, received in Korean Patent Application No. 2010 7007258, which corresponds to U.S. Appl. No. 11/849,938, 2 pages (Chaudhri).
Office Action dated Oct. 25, 2013, received in Korean Patent Application No. 20107007258, which corresponds to U.S. Appl. No. 11/849,938, 4 pages (Chaudhri).
Notice of Allowance dated Apr. 29, 2013, received in U.S. Appl. No. 13/104,903, 8 pages (Forstall).
Notice of Allowance dated Jun. 10, 2013, received in U.S. Appl. No. 13/104,911, 6 pages (Forstall).
Office Action dated Oct. 24, 2013, received in U.S. Appl. No. 11/850,005, 12 pages (Chaudhri).
Autocomplete Plugin, Emesene Forum, available at <http://emeseme.org/smf/index.olm?topic=1276.0>, Jun. 20, 2008, 5 pages.
ImageShack—Hosting, available at <http://img129.imageshack.us/mv.php?image=autocompleteemoticonprexw0.jpg>, Nov. 10, 2008, 1 page.
"ISO 9241-10:1996 Ergonomic Requirements for Office Work with Visual Display Terminals (VDTs)—Part 10", Dialogue Principles, International Standard—ISO, Zuerich, CH, vol. 9241-10, May 1, 1996, 17 pages.
"ISO 9241-11:1998 Ergonomic requirements for office work visual display terminals (VDTs)—Part 11", Guidance on usability, International Standard—ISO, Zuerich, CH, vol: 9241-11, Jan. 1, 1998, 27 pages.
"ISO 9241-12:1998 Ergonomic requirements for office work with visual display terminals (VDTs)—Part 12", Presentation of Information, International Standard—ISO, Zuerich, CH, vol: 9241-12, Dec. 1, 1998, 52 pages.
"Smiley Conversion Table", available at <http://surf-style.us/manual3.htm>, Dec. 5, 2008, 8 pages.
Decision to refuse a European Patent application received for European Patent Application No. 06846840.4, mailed on Mar. 4, 2010, 10 Pages.
Office Action received from European Patent Application No. 06846840.4, mailed on Oct. 13, 2008, 3 pages.
Summons To Attend Oral proceedings received for European Patent Application No. 06846840.4, mailed on May 18, 2009, 7 Pages.
Decision To Refuse Patent Application received for European Patent Application No. 07814689.1, mailed on May 11, 2012, 15 Pages.
Office Action received for European Patent Application No. 07814690.9, mailed on Jun. 21, 2010, 5 pages.
Office Action received for European Patent Application No. 07814690.9, mailed on Oct. 19, 2010, 8 pages.
Summons to Attend Oral Proceedings received for European Patent Application No. 07814690.9, mailed on Nov. 22, 2011, 4 pages.
Office Action received for European Patent Application No. 07841980.1, mailed on Feb. 23, 2012, 5 pages.
Summons to Attend Oral Proceedings received for European Patent Application No. 07841980.1, mailed on Sep. 28, 2012, 8 pages.
Office Action received for European Patent Application No. 07869929.5, mailed on Dec. 27, 2010, 6 pages.
Summons to Attend Oral Proceedings received for European Patent Application No. 07869929.5, Dec. 13, 2011, 6 pages.
Summons to Attend Oral Proceedings received for European Patent Application No. 07869929.5, mailed on Jan. 23, 2012, 1 page.
Communication received for European Patent Application No. 08798713.7, mailed on Apr. 28, 2010, 2 pages.
Office Action received for European Patent Application No. 08798713.7, mailed on Feb. 9, 2012, 7 pages.
Office Action received for European Patent Application No. 08798713.7, mailed on Jul. 29, 2014, 18 pages.
Office Action received for European Patent Application No. 08798713.7, mailed on Jun. 22, 2011, 10 pages.
Summons to Attend Oral Proceedings received for European Patent Application No. 08798713.7, mailed on Aug. 30, 2013, Aug. 30, 2013, 15 pages.
Decision To Refuse Application received for European Patent Application No. 09170697.8, mailed on Oct. 23, 2013, 12 Pages.
Extended European Search Report (includes Partial European Search Report and European Search Opinion) received for European Patent Application No. 09170697.8, mailed on Apr. 28, 2010, 3 pages.
Office Action received for European Patent Application No. 09170697.8 mailed on Dec. 13, 2011, Dec. 13, 2011, 4 pages.
Summons to attend oral proceedings received for European Application No. 09170697.8 mailed on Apr. 22, 2013, Apr. 22, 2013, 6 pages.
Decision to Refusal received for European Patent Application No. 09171787.6, mailed on Dec. 14, 2011, Dec. 14, 2011, 22 pages.
Extended European Search Report (includes Partial European Search Report and European Search Opinion) received for European Patent Application No. 09171787.6, Jan. 26, 2010, 6 pages.
Office Action received for European Patent Application No. 09171787.6, mailed on Jul. 12, 2011, Jul. 12, 2011, 5 pages.
Decision To Grant received for European Patent Application No. 09700333.9, mailed on Nov. 7, 2013, 2 pages.
Office Action received for Taiwan Patent Application No. 097100075, mailed on Dec. 29, 2011, 5 pages. (English Translation only).
Notice of Allowance received for Korean Patent Application No. 10-2009-7007064, mailed on Sep. 30, 2011, 2 pages. (See Communication under 37 CFR § 1.98(a) (3)).
Notice of Allowance received for Korean Patent Application No. 10-2009-7007067, mailed on Dec. 1, 2011, 2 pages. (See Communication under 37 CFR § 1.98(a) (3)).
Office Action received for Korean Patent Application No. 10-2009-7007067, mailed on Aug. 30, 2011, 2 pages. (English Translation only).
Office Action received for Korean Patent Application No. 10-2009-7007067, mailed on Nov. 12, 2010, 3 pages. (English Translation only).
Notice of Allowance received for Korean Patent Application No. 10-2011-7014104, mailed on Aug. 29, 2013, 2 pages. (See Communication under 37 CFR § 1.98(a) (3)).
Office Action received for Korean Patent Application No. 10-2011-7014104, mailed on Jan. 17, 2013, 4 pages. (1 page of English Translation).
Notice of Allowance received for Korean Patent Application No. 10-2011-7019633, mailed on May 18, 2012, 2 pages. (See Communication under 37 CFR § 1.98(a) (3)).
Notice of Allowance received for Korean Patent Application No. 10-2011-7026583, mailed on Apr. 29, 2015, 3 pages (1 page of English Translation).
Office Action received for Korean Patent Application No. 10-2011-7026583, mailed on Aug. 14, 2014, 6 pages (2 pages of English Translation).
Notice of Allowance received for Korean Patent Application No. 10-2014-7011273, mailed on Apr. 28, 2015, 3 pages (1 page of English Translation).
Office Action received for Korean Patent Application No. 10-2014-7011273, mailed on Aug. 14, 2014, 5 pages (2 pages of English Translation).
Final Office Action received for U.S. Appl. No. 11/620,647, mailed on Dec. 23, 2010, 21 pages.
Non-Final Office Action received for U.S. Appl. No. 11/620,647, mailed on Jun. 24, 2010, 19 pages.
Non-Final Office Action received for U.S. Appl. No. 11/620,647 mailed on Nov. 17, 2009, 20 pages.
Non-Final Office Action received for U.S. Appl. No. 11/620,647, mailed on Oct. 13, 2011, 23 pages.
Notice of Allowance received for U.S. Appl. No. 11/620,647 mailed on Mar. 2, 2012, 8 pages.
Notice of Allowance received for U.S. Appl. No. 11/849,938, mailed on Nov. 27, 2013, 2 pages.

(56) References Cited

OTHER PUBLICATIONS

Final Office Action received for U.S. Appl. No. 11/850,005, mailed on Jul. 8, 2011, 9 pages.
Final Office Action received for U.S. Appl. No. 11/850,005, mailed on May 22, 2014, 13 pages.
Final Office Action received for U.S. Appl. No. 11/850,005, mailed on Nov. 16, 2015, 13 pages.
Non Final Office Action received for U.S. Appl. No. 11/850,005, mailed on May 29, 2015, 12 pages.
Non-Final Office Action received for U.S. Appl. No. 11/850,005, mailed on Mar. 18, 2011, 10 pages.
Non-Final Office Action received for U.S. Appl. No. 11/850,005, mailed on Nov. 10, 2011, 11 pages.
Final Office Action received for U.S. Appl. No. 11/850,008, Dec. 29, 2010, 14 pages.
Non-Final Office Action received for U.S. Appl. No. 11/850,008, Aug. 2, 2010, 14 pages.
Notice of Allowance received for U.S. Appl. No. 11/850,008, Mar. 11, 2011, 7 pages.
Final Office Action received for U.S. Appl. No. 11/850,010, mailed on May 8, 2014, 11 pages.
Non Final Office Action received for U.S. Appl. No. 11/850,010, mailed on Dec. 17, 2014, 10 pages.
Non-Final Office Action received for U.S. Appl. No. 11/850,010, Oct. 24, 2013, 13 pages.
Non-Final Office Action received for U.S. Appl. No. 11/850,010, mailed on Jun. 25, 2015, 10 pages.
Notice of Allowance received for U.S. Appl. No. 11/850,011, mailed on Feb. 11, 2011, 5 pages.
Supplemental Notice of Allowance received for U.S. Appl. No. 11/850,011, mailed on Feb. 24, 2011, 6 pages.
Non-Final Office Action received for U.S. Appl. No. 11/850,013, mailed on Jun. 11, 2010, Jun. 11, 2010, 32 pages.
Notice of Allowance received for U.S. Appl. No. 11/850,013, mailed on Oct. 20, 2010, 20 pages.
Final Office Action received for U.S. Appl. No. 11/850,638, Feb. 8, 2011, 14 pages.
Final Office Action received for U.S. Appl. No. 11/850,638, May 15, 2012, 16 pages.
Non-Final Office Action received for U.S. Appl. No. 11/850,638, Jan. 17, 2012, 15 pages.
Non-Final Office Action received for U.S. Appl. No. 11/850,638, Oct. 26, 2010, 17 pages.
Final Office Action received for U.S. Appl. No. 11/961,773, mailed on Nov. 2, 2011, 12 pages.
Final Office Action received for U.S. Appl. No. 11/961,773, mailed on Nov. 29, 2012, 15 pages.
Non-Final Office Action received for U.S. Appl. No. 11/961,773, mailed on Apr. 15, 2011, 21 pages.
Non-Final Office Action received for U.S. Appl. No. 11/961,773, mailed on May 10, 2012, 14 pages.
Notice of Allowance received for U.S. Appl. No. 11/969,912, mailed on Jun. 11, 2014, 4 pages.
Notice of Allowance received for U.S. Appl. No. 11/969,912, mailed on Mar. 6, 2014, 12 pages.
Office Action received from German Patent Application No. 112006003600.9, mailed on Aug. 9, 2011, 4 pages (English Translation only).
Office Action received from German Patent Application No. 112006003600.9, mailed on Oct. 27, 2009, 9 pages (4 pages of English Translation).
Office Action received for German Patent Application No. 112007002107.1, mailed on Jun. 7, 2010, Jun. 7, 2010, 3 pages (English Translation only).
Final Office Action received for U.S. Appl. No. 12/217,029, mailed on May 22, 2014, 12 pages.
Non-Final Office Action received for U.S. Appl. No. 12/217,029, mailed on Oct. 28, 2015, 23 pages.
Advisory Action received for U.S. Appl. No. 12/242,851, mailed on Nov. 15, 2013, 4 pages.
Non-Final Office Action received for U.S. Appl. No. 12/242,851, mailed on Jun. 26, 2015, 33 pages.
Non-Final Office Action received for U.S. Appl. No. 12/242,851, mailed on Oct. 6, 2014, 27 pages.
Final Office Action received for U.S. Appl. No. 12/274,346, mailed on Mar. 14, 2012, Mar. 14, 2012, 39 pages.
Non-Final Office Action received for U.S. Appl. No. 12/274,346, mailed on Aug. 26, 2011, 26 pages.
Notice of Allowance received for U.S. Appl. No. 12/274,346, mailed on Jul. 17, 2013, 10 pages.
Notice of Allowance received for U.S. Appl. No. 12/274,346, mailed on Mar. 12, 2013, 18 pages.
Final Office Action received for U.S. Appl. No. 12/365,887, mailed on Feb. 29, 2012, 15 pages.
Non-Final Office Action received for U.S. Appl. No. 12/365,887, mailed on Aug. 31, 2011, 22 pages.
Notice of Allowance received for U.S. Appl. No. 12/365,887, mailed on May 23, 2012, 5 pages.
Non-Final Office Action received for U.S. Appl. No. 12/365,888, mailed on Nov. 10, 2011, 8 pages.
Non-Final Office Action received for U.S. Appl. No. 12/981,433, mailed on Oct. 11, 2012, 29 pages.
Extended European Search Report (includes Partial European Search Report and European Search Opinion) received for European Patent Application No. 12169786.6, Jul. 11, 2012, 10 pages.
European Search Report received for European Patent Application No. 12189764.9, Jan. 4, 2013, 6 pages.
Office Action received for European Patent Application No. 12194312.0, mailed on Jan. 13, 2014, 4 pages.
Office Action received for European Patent Application No. 12194315.3, mailed on Jan. 13, 2014, 4 pages.
Non-Final Office Action received for U.S. Appl. No. 13/155,304, mailed on Sep. 5, 2012, Sep. 5, 2012, 11 pages.
Extended European Search Report (includes Partial European Search Report and European Search Opinion) received for European Patent Application No. 13174706.5, mailed on Jan. 8, 2015, 8 pages.
Non Final Office Action received for U.S. Appl. No. 14/142,640, mailed on Jun. 5, 2015, 29 pages.
Advisory Action received for U.S. Appl. No. 14/261,112, mailed on Apr. 23, 2015, 3 pages.
Final Office Action received for U.S. Appl. No. 14/261,112, mailed on Oct. 9, 2014, 29 pages.
Non-Final Office Action received for U.S. Appl. No. 14/261,112, mailed on Jul. 8, 2015, 29 pages.
Non-Final Office Action received for U.S. Appl. No. 14/261,112, mailed on Jun. 18, 2014, 25 pages.
Notice of Allowance received for Canadian Patent Application No. 2,633,759, mailed on Sep. 9, 2013, 1 page.
Office Action received for Canadian Patent Application No. 2,633,759, Aug. 12, 2010, 8 pages.
Office Action received from Canadian Patent Application No. 2,633,759, Apr. 18, 2013, 2 pages.
Notice of Allowance received for Canadian Patent Application No. 2,845,297, mailed on Nov. 10, 2014, 1 page.
Office Action received for Canadian Patent Application No. 2,845,297, mailed on Apr. 23, 2014, 2 pages.
Grant for Invention Patent Received in Chinese Patent Application No. 200680053441.1, Jan. 28, 2011, 1 page (See Communication under 37 CFR § 1.98(a) (3)).
Office Action received for Chinese Patent Application No. 200680053441.1, mailed on Nov. 12, 2010, 4 pages (English Translation only).
Office Action received for Australian Patent Application No. 2007289019, mailed on Jul. 2, 2009, 3 pages.
Office Action received for Australian Patent Application No. 2007289019, mailed on Oct. 7, 2009, 2 pages.
Notice of Acceptance received for Australian Patent Application No. 2007292383, mailed on Jan. 4, 2012, 3 pages.
Office Action received for Australian Patent Application No. 2007292383, mailed on Dec. 22, 2011, 2 pages.
Office Action received for Australian Patent Application No. 2007292383, mailed on Mar. 24, 2010, 2 pages.

(56) References Cited

OTHER PUBLICATIONS

Office Action received for Australian Patent Application No. 2007292383, mailed on May 12, 2011, 2 pages.
Decision to Grant received for Chinese Patent Application No. 200780001140.9, mailed on Feb. 3, 2012, 4 pages (2 pages of English Translation).
Office Action received for Chinese Patent Application No. 200780001140.9, mailed on Jan. 15, 2010, 5 pages (English Translation only).
Office Action received for Chinese Patent Application No. 200780001140.9, mailed on Jun. 10, 2011, 7 pages (English Translation only).
Office Action received for Chinese Patent Application No. 200780041222.6, mailed on Feb. 29, 2012, 6 pages (3 pages of English Translation).
Office Action received for Chinese Patent Application No. 200780041222.6, mailed on Jul. 25, 2012, 3 pages (English Translation only).
Office Action received for Chinese Patent Application No. 200780041222.6, mailed on Oct. 13, 2010, 10 pages (English Translation only).
Office Action received for Chinese Patent Application No. 200780052019.9, Feb. 29, 2012, 6 pages (3 pages of English Translation).
Office Action received from Japanese Patent Application No. 2008-548858 mailed on May 30, 2011, 3 pages (English Translation only).
Office Action received from Japanese Patent Application No. 2008-548858, mailed on Jan. 20, 2012, 5 pages (English Translation only).
Patent Grant received for Japanese Patent Application No. 2008-548858, mailed on Sep. 24, 2012, 3 pages (See Communication under 37 CFR § 1.98(a) (3)).
Office Action received for Chinese Patent Application No. 200880110709.X, mailed on Nov. 24, 2011, 10 pages (6 pages of English Translation).
Office Action received from Japanese Patent Application No. 2009-51921 mailed on Jan. 20, 2012, 5 pages (English Translation only).
Notice of Allowance received for Japanese Patent Application No. 2009-051921, mailed on Jan. 20, 2014, 2 pages (See Communication under 37 CFR § 1.98(a) (3)).
Office Action received for Japanese Patent Application No. 2009-051921, mailed on May 31, 2013, 7 pages (3 pages of English Translation).
Office Action received from Japanese Patent Application No. 2009-051921, mailed on Jun. 27, 2011, 6 pages (English Translation only).
Office Action received from Japanese Patent Application No. 2009-051921, mailed on Sep. 24, 2012, 3 pages (English Translation only).
Office Action received for Australian Patent Application No. 2009100760, mailed on Sep. 28, 2009, 2 pages.
Office Action received for Australian Patent Application No. 2009100812, mailed on Sep. 14, 2009, 2 pages.
Office Action received for Australian Patent Application No. 2009100813, mailed on Sep. 14, 2009, 2 pages.
Intention to Grant received for Chinese Patent Application No. 200910173272.0, mailed on Oct. 23, 2012, 1 page (English Translation Only).
Office Action received from Chinese Patent Application No. 200910173272.0, mailed on Nov. 30, 2011, 8 pages (5 pages of English Translation).
Office Action received for Chinese Patent Application No. 200910175852.3, mailed on Apr. 24, 2012, 10 pages (6 pages of English Translation).
Office Action received for Chinese Patent Application No. 200910175852.3, mailed on Jun. 2, 2011, 6 pages (English Translation only).
Office Action received for Australian Patent Application No. 2009204252, issued on Sep. 16, 2014, 6 pages.
Response to Notice of Opposition filed for Australian Patent Application No. 2009204252, on Apr. 28, 2014, 4 pages.
Office Action received for Japanese Patent Application No. 2009-527541, mailed on May 21, 2012, 3 pages (English Translation only).
Office Action received for Japanese Patent Application No. 2009-527541, mailed on Sep. 26, 2011, Sep. 26, 2011, 3 pages (English Translation only).
Office Action received for Japanese Patent Application No. 2009-527566, mailed on Aug. 15, 2011, 3 pages (English Translation only).
Office Action received for Japanese Patent Application No. 2009-527566, mailed on Sep. 21, 2012, 3 pages (English Translation only).
Notice of Allowance received for Chinese Patent Application No. 200980000229.2, mailed on Oct. 24, 2014, 4 pages (2 pages of English Translation).
Office Action received for Chinese Patent Application No. 200980000229.2, issued on Jan. 6, 2014, 6 pages (3 pages of English Translation).
Office Action received for Chinese Patent Application No. 200980000229.2, mailed on Jun. 27, 2014, 7 pages (4 pages of English Translation).
Office Action received for Chinese Patent Application No. 200980152822.9, mailed on Dec. 5, 2012, 10 pages (English Translation only).
Office Action received for Chinese Patent Application No. 200980152822.9, mailed on Oct. 21, 2013, 2 pages (English Translation Only).
Notice of Acceptance received for Australian Patent Application No. 2010200763, mailed on Aug. 21, 2012, 1 page.
Office Action received for Australian Patent Application No. 2010200763, mailed on Jul. 28, 2011, 2 pages.
Certificate of Examination received for Australian Patent Application No. 2011101190, mailed on Nov. 23, 2011, 1 page.
Notice of Allowance received for Japanese Patent Application No. 2011-537452, mailed on Jun. 14, 2013, 3 pages (See Communication under 37 CFR § 1.98(a) (3)).
Office Action received for Japanese Patent Application No. 2011-537452, mailed on Jan. 25, 2013, 7 pages (3 pages of English Translation).
Office Action received for Chinese Patent Application No. 201210399033.9, mailed on Nov. 27, 2014, 7 pages (See Communication under 37 CFR § 1.98(a) (3)).
Office Action received for Chinese Patent Application No. 201210399033.9, mailed on Oct. 8, 2015, 8 pages (3 pages of English Translation).
Notice of Acceptance received for Australian Patent Application No. 2012200475, mailed on Aug. 24, 2015, 2 pages.
Office Action received for Australian Patent Application No. 2012200475, issued on Aug. 4, 2015, 3 pages.
Office Action received for Australian Patent Application No. 2012200475, issued on Jun. 29, 2015, 3 pages.
Notice of Acceptance received for Australian Patent Application No. 2012202140, mailed on May 28, 2014, 2 pages.
Notice of Acceptance received for Australia Patent Application No. 2012261534, mailed on Jan. 6, 2015, 2 pages.
Office Action received for Australian Patent Application No. 2012261534, issued on Dec. 3, 2013, 3 pages.
Office Action received for Japanese Patent Application No. 2013-011209, mailed on Feb. 7, 2014, 3 pages (See Communication under 37 CFR § 1.98(a) (3)).
Office Action received for Japanese Patent Application No. 2013-011209, mailed on Oct. 27, 2014, 3 pages (See Communication under 37 CFR § 1.98(a) (3)).
Notice of Allowance received for Japanese Patent Application No. 2013-127963, mailed on Oct. 9, 2015, 3 pages (1 page of English Translation).
Office Action received for Japanese Patent Application No. 2013-127963, mailed on Aug. 15, 2014, 8 pages (6 pages of English Translation).
Office Action received for Japanese Patent Application No. 2013-127963, mailed on Mar. 10, 2014, 7 pages (4 pages of English translation).
Office Action received for Japanese Patent Application No. 2013-252338, mailed on Jan. 30, 2015, 4 pages (See Communication under 37 CFR § 1.98(a) (3)).
Office Action received for Australian Patent Application No. 2014204422, issued on Aug. 7, 2015, 3 pages.

(56) References Cited

OTHER PUBLICATIONS

Agarwal Amit., "iTunesInlineVideo", Digital Inspiration—The Tech Guide, available online at <http://labnol.blogspot.com/2006_09_17_labnol_archive.html>, 2006, 27 pages.

Ahmad et al., "Content-Based Image Retrieval on Mobile Devices", Proceedings of SPIE-IS&T Electronic Imaging, vol. 5684, 2005, pp. 255-264.

Alam et al., "Web Document Manipulation for Small Screen Devices: A Review", Available at <http://www.csc.liv.ac.uk/~wda2003/Papers/Section_II/Paper_8.pdf>, 2003, pp. 33-36.

Alejandre Suzanne., "Graphing Linear Equations", Available at <http://mathforum.org/alejandre/palm/times.palm.html>, retrieved on Jun. 12, 2006, 2006, 3 pages.

Apparao et al., "Level 1 Document Object Model Specification", W3C Working Draft, available at <http://www.w3.org/TR/WD-DOM/>, Jul. 20, 1998, 3 pages.

Apple,"Iphone User Guide", iPhone first generation, Available at: <http://pocketpccentral.net/iphone/products/1 g_iphone.htm> Retrieved on Sep. 25, 2013, Jun. 29, 2007, 124 pages.

Apple, "iPhone Users Guide", Available at <http://mesnotices.20minutes.fr/manuel-notice-mode-emploi/APPLE/IPHONE%2D%5FE#>, Retrieved on Mar. 27, 2008, Jun. 2007, 137 pages.

Apple Iphone School., "Customize 1.19 Update for the iPhone", 4:02 minutes video, available at <http://www.youtube.com/watch?v=5ogDzOM89oc>, uploaded on Dec. 8, 2007, 2 pages.

Apple Iphone School., "SummerBoard 3.0a9 for iPhone", 4:50 minutes video, available at <http://www.youtube.com/watch?v=s_P_9mrZTKs>, uploaded on Oct. 21, 2007, 2 pages.

Barsch Bill, "3D Desktop! TouchScreen and XGL on Linux!", 2:42 minutes video, available at <http://www.youtube.com/watch?v=Yx9FgLr9oTk>, uploaded on Aug. 15, 2006, 2 pages.

Baudisch et al., "Collapse-to-Zoom: Viewing Web Pages on Small Screen Devices by Interactively Removing Irrelevant Content", Microsoft Research, Available at <http://www.patrickbaudisch.com/publications/2004-Baudisch-UIST04-CollapseToZoom.pdf>, Oct. 27, 2004, 4 pages.

Berka, "iFuntastic 3 Opens Up New iPhone Functionality", ars technical, Available at: <http://arstechnica.com/journals/apple.ars/2007/08/30/ifuntastic-3-opens-up-new-iphone-functionality>, Aug. 30, 2007, 2 pages.

Bitstream®., "ThunderHawk Pocket PC Edition for End Users", Available at <http://www.bitstream.com/wireless/products/pocketpc/faq_using.html>, retrieved on Jun. 12, 2006, 2006, 4 pages.

Blickenstorfer Conrad H., "NeoNode N1 Can a Unique Interface Put this Compelling Smart Phone on the Map?", available at <http://pencomputing.com/WinCE/neonode-n1-review.html>, retrieved on Sep. 1, 2014, 5 pages.

Bos et al., "3 Conformance: Requirements and Recommendations", Cascading Style Sheets, level 2 CSS2 Specification, W3C Recommendation, available at <http://www.w3.org/TR/CSS21/conform.html#doctree>, May 12, 1998, 6 pages.

Buyukkokten et al., "Power Browser: Efficient Web Browsing for PDAs", Proceedings of the SIGCHI conference on Human Factors in Computing Systems, Dec. 27, 2000, 8 pages.

Office Action received for Canadian Patent Application No. 2,633,759, Apr. 2, 2009, 5 pages.

Office Action received for Canadian Patent Application No. 2,633,759 mailed on Dec. 10, 2009, 6 pages.

Cerulean Studios, "Trillian Online User Manual", available at <http://www.ceruleanstudios.com/support/manuaLphp?hchap=4&hsub=1&hsect=5>, 2006, 11 pages.

Chen et al., "A Novel Navigation and Transmission Technique for Mobile Handheld Devices", Technical Report CSE-2003-1, Department of Computer Science, University of California at Davis, 2003, 8 pages.

Chen et al., "Detecting Web Pages Structure for Adaptive Viewing on Small Form Factor Devices", Proceedings of the 12th international conference on World Wide Web, 2003, 9 pages.

Chen et al., "Dress: A Slicing Tree Based Web Page Representation for Various Display Sizes", Microsoft Research, Technical Report, Nov. 16, 2002, 9 pages.

Office Action received from Chinese Patent Application No. 200680053441.1, mailed on Mar. 30, 2010, 5 pages (English Translation only).

CNET, "Bounding Box", available at <http://www.cnet.com/Resources/Info/Glossary/Terms/boundingbox.html>, retrieved on Dec. 29, 2008, 1 page.

CNET, "Fujitsu LifeBook B6110D", Reviews, Nov. 24, 2005, 2 pages.

Cooper Alan, "The Inmates Are Running the Asylum", Sams Publishing, Mar. 23, 1999, pp. 138-147.

Dearman, et al., "Rendezvousing with Location-Aware Devices: Enhancing Social Coordination", Interacting with Computers, vol. 17, Issue 5, available at <http://www.dgp.toronto.edu/~dearman/publications/dearman_IWC05.pdf>, Sep. 2005, pp. 542-566.

Domshlak et al., "Preference-Based Configuration of Web Page Content", Proceedings of the 17th Int'l Joint Conf. on Artificial Intelligence (IJCAI), Seattle, WA, Aug. 4-10, 2001, pp. 1451-1456.

Edwards., "iPhone 1.1.3 Firmware Feature Gallery", Gear Live, Available at: <http://www.gearlive.com/news/article/q407-iphone-113-firmware-feature-gallery/>, Dec. 28, 2007, 7 pages.

Elo., "Touchscreen User Manual, Elo Projected Capacitance Driver Software Version 1.00 (Serial)", Elo TouchSystems, Inc, Dec. 30, 2005, 37 pages.

Expansystv., "HTC Touch Dual Demonstration by eXpansys", 5:26 minutes video, available at <http://www.youtube.com/watch?v=Tupk8MYLhMk>, uploaded on Oct. 1, 2007, 2 pages.

Eyemodule Springboard Compatible., "Turn Your Handspring™ Visor™ Handheld into a Digital Camera", User's Manual, 2000, 9 pages.

Farber Dan., "Jobs: Today Apple is Going To Reinvent The Phone", ZDNet, available at <http://www.zdnet.com/blog/btl/jobs-today-apple-is-going-to-reinvent-the-phone/4249>, Jan. 9, 2007, 3 pages.

Fingerworks Forums., "Is the Multitouch Lemur?", Available at <http://64233.167.104/search?q=cache:sjVdtyFBvRMJ:forums.finger>, retrieved on Nov. 16, 2005, Dec. 24, 2004, 2 pages.

Fingerworks, Inc., "Installation and Operation Guide for the TouchStream and TouchStream LP", available at <http://www.fingerworks.com>, 2002, pp. 1-25.

Fingerworks, Inc., "Quick Reference Guide for iGesture Products", available at <http://www.fingerworks.com>, 1999-2002, 2 pages.

Fingerworks, Inc., "Quick Reference Guide for TouchStream ST/LP", available at <http://www.fingerworks.com>, 2001-2003, 4 pages.

Fingerworks, Inc., "TouchStream LP Silver", available at <http://www.fingerworks.com>, Apr. 27, 2005, 18 pages.

Forsberg et al., "Aperture Based Selection for Immersive Virtual Environments", Proceedings of the ACM Symposium on User Interface Software and Technology, 1996, 2 pages.

Foxit., "Foxit Reader v. 1.3 Feature Description", available at <http://www.foxitsoftware.com/pdf/reader 2/verhistory.htm>, 2008, 4 pages.

Gears Leigh., "Orange SPV C600 Review", Available at <http://www.coolsmartphone.com/article569.html>, retrieved on Apr. 14, 2006, 57 pages.

Getgreg., "Jeff Han's Multiple Touch Point Display, the Stuff Dreams are Made of", Available at <http://www.theyshoulddothat.com/2006/08/jeff_hanns_multiple_touch_poin.html>, retrieved on Aug. 16, 2006, Aug. 16, 2006, 2 pages.

GSM, Arena., "Neonode N2 User Interface", 3:06 minutes video, available at <https://www.youtube.com/watch?v=MfDMHmIZRLc>, uploaded on Feb. 13, 2007, 2 pages.

Gsmarena Team., "HTC Touch Review: Smart to Touch the Spot", available at <http://www.gsmarena.com/htc_touch-review-189.php>, Nov. 28, 2007, 18 pages.

Guan et al., "Zoom Selector: A Pen-based Interaction Technique for Small Target Selection", Transactions of the Information Processing Society of Japan, vol. 45, No. 8, Aug. 2004, pp. 2087-2097.

Han Jeff., "Unveiling the Genius of Multi-touch Interface Design", Ted Ideas Worth Spreading, available at <http://www.ted.com/index.php/talks/view/id/65>, Aug. 2006, 1 page.

(56) References Cited

OTHER PUBLICATIONS

Hart Kim., "Rewriting the Web for Mobile Phones", washingtonpost.com, available at <http://www.washingtonpost.com/wpdyn/content/article/2006/07/25/AR2006072501517_pf.html>, Jul. 26, 2006, 2 pages.

Hinckley et al., "Input/Output Devices and Interaction Techniques", CRC Press, Nov. 2004, pp. 1-79.

Holmquist Lars E., "The Zoom Browser Showing Simultaneous Detail and Overview in Large Documents", Available at<http://www.hb.se/bhs/ith/3-98/leh.htm> retrieved Dec. 19, 2007, Human IT, 1998, pp. 1-12.

Infoworld Video., "Two Geeks and an iPhone: Part 3", available at <http://web.archive.org/web/20080124065641/http:/www.infoworld.com/video/interviews/Mobile-Tech-Apple-iPhone/Two-Geeks-and-an-iPhone-Part-3/video_1966.html>, Dec. 18, 2007, 2 pages.

Iphone Dev Wiki., "IPhone Customization", Available at: <http://iphone.fivefony.net/wiki/index.php/Iphone_Customization>, Dec. 13, 2007, 7 pages.

Iphone Hacks., "iPhone Firmware 1.1.1: Multi-Page SpringBoard Hack", Available at: <http://www.iphonehacks.com/2007/10/springboardhack.html>, Oct. 9, 2007, 4 pages.

Iphone Hacks., "SummerBoard for iPhone OS v1.1.1: iPhone Hack Enables Scrolling of iPhone's Home Screen", Available at: <http://www.iphonehacks.com/2007/10/summerboard-v3.html>, Dec. 2007, 3 pages.

Iphone Info., "ModifYing the iPhone SpringBoard", Available at: <http://iphoneinfo.ca/modifying-the-iphone-springboard>, Dec. 2007, 6 pages.

Joire Myriam., "Neonode N1m Review", 9:55 minutes video, available at <http://www.youtube.com/watch?v=Tj-KS2kflr0>, uploaded on Jun. 29, 2007, 3 pages.

Karlson et al., "AppLens and LaunchTile: Two Designs for One-Handed Thumb Use on Small Devices", Powerpoint Presentation, CHI 2005, 17 pages.

Karlson et al., "AppLens and LaunchTile: Two Designs for One-Handed Thumb Use on Small Devices", CHI 2005, Papers: Small Devices 1, Apr. 2-7, 2005, pp. 201-210.

Khella et al., "Pocket PhotoMesa: A Zoomable Image Browser for PDAs", Proceedings of the 3rd International Conference on Mobile and Ubiquitous Multimedia, available at <http://delivery.acm.org/10.1145/1060000/1052384/p19-khella.pdf?key1=1052384&key2=2419987911&coll=GUIDE&dl=GUIDE&CFID=470 73625&CFTOKEN=65767142>, Oct. 29, 2004, pp. 19-24.

Kinoma., "Kinoma Player 4 EX Documentation", Available at <http://replay.waybackmachine.org/20061101175306/http://www.kinoma.com/index/pd-player-4>, archived on Nov. 1, 2006, Nov. 1, 2006, 28 pages.

Laakko et al., "Adapting Web Content to Mobile User Agents", IEEE Internet Computing, vol. 9, No. 2, Mar./Apr. 2005, pp. 46-53.

Landragin Frédéric., "The Role of Gesture in Multimodal Referring Actions", Proceedings of the 4th IEEE International Conference on Multimodal Interfaces, available at <http://ieeexplore.iee.org/ie15/8346/26309/01166988pdf?arnumber=1166988>, 2002, 6 pages.

Lie Håkon W., "Cascading Style Sheets", University of Osloensis, MDCCCXI, 2005, pp. 243-247.

Microsoft Word., "Example of Scrolling Pages in Word 2003", 2003, 3 pages.

microsoft.com., "Right-Clicking with a Pen", Microsoft, Available at: http://www.microsoft.com/windowsxp/using/tabletpc/learnmore/rightclick.mspx, Nov. 7, 2002, 3 pages.

Milic-Frayling et al., "SmartView: Enhanced Document Viewer for Mobile Devices", Microsoft Technical Report, available at <ftp://ftp.research.microsoft.com/pub/tr/tr-2002-114.pdf>, retrieved on Dec. 17, 2007, Nov. 15, 2002, 9 pages.

Milic-Frayling et al., "SmartView: Flexible Viewing of Web Page Contents", Proceedings of the Eleventh International World Wide Web Conference, available at <http://www2002.org/CDROM/poster/172/>, May 11, 2002, 4 pages.

Miller Matthew., "HTC Touch and TouchFLO Interface", 7:53 minutes video, available at <http://www.youtube.com/watch?v=6oUp4wOcUc4>, uploaded on Jun. 6, 2007, 2 pages.

Mountfocus Information Systems., "An Onscreen Virtual Keyboard: touchscreen, kiosk and Windows compatible", Available at: http://www.virtual-kevboard.com, Dec. 19, 2007, 3 pages.

Neonode Inc., "Welcome to the N1 Guide", available at <http://www.ebookspdf.com/gadget/2818/neonode-n1m-manual/>, Jul. 2004, pp. 1-42.

Neonode.Com., "N1 Quick Start Guide", Version 0.5, Apr. 5, 2005, pp. 1-24.

NTT Docomo., "I-mode Compatible Pictograms", available at <http://www.nttdocomo.co.jp/english/service/imode/make/content/pictograph/index.html>, 2008, 2 pages.

O'Hara., "Absolute Beginners Guide to Microsoft Window XP", Que Publishing, 2003, 1 page.

Oliver Dick., "Adding Multimedia to Your Web Site", Chapter 22, Web Publishing Professional Reference Edition, Available online at <http://www.ssuet.edu.pk/taimoor/books/1-57521-198-X/index.htm>, 1997, 14 pages.

Opera Software., "Download the Opera Mobile™ Browser", Available at <http://www.opera.com/products/mobile/products/>, retrieved on Oct. 19, 2006, 5 pages.

Opera Software., "Opera 7.60 for Series 60 Mobile", Available at <http://jp.opera.com/support/tutorials/s60/760/O760manual.pdf>, 2009, 14 pages.

Opera Software., "Opera 8.5 Beta 2 for Windows Mobile, Pocket PC", Available at <http://www.opera.com/products/mobile/products/winmobileppc>, retrieved on Apr. 5, 2006, 2 pages.

Opera Software., "Opera 8.5 for S60 Phones—Get the Full Internet Experience on Your Mobile Phone", Available at <http://www.symbian-freak.com/news/1105/opera.htm>, Oct. 14, 2005, 3 pages.

Opera Software., "Opera for Mobile, The Full Web Anytime, Anywhere", Available at <www.opera.com/mobile>, Jan. 2006, 7 pages.

Opera Software., "Opera for S60 Tutorial", Available at <http://www.xmarks.com/site/www.opera.com/support/tutorials/s60/>, retrieved on Apr. 5, 2006, 5 pages.

Opera Software., "Opera for Windows Mobile Smartphone 2003 Tutorial", Available at <http://www.opera.com/support/tutorials/winmobile>, retrieved on Apr. 5, 2005, 4 pages.

Opera Software., "The New Opera Browser for Series 60 Features Zoom and Password Manager", Press Releases Database, Available at <http://pressreleases.techwhack.com/1334/1411-opera-browser-features-zoom-and-password>, Nov. 14, 2005, 3 pages.

Palme et al., "MIME Encapsulation of Aggregate Documents, such as HTML", Network Working Group, 1999, 24 pages.

Palmone., "Your Mobile Manager", Chapter 2, LifeDrive™ User's Guide, available at <http://www.palm.com/us/support/handbooks/lifedrive/en/lifedrive_handbook.pdf>, 2005, 23 pages.

Park Will., "Apple iPhone v1.1.1 SpringBoard Hacked to Display Multiple Pages", available at <http://www.intomobile.com/2007/10/09/apple-iphone-v111-springboard-hacked-to-display-multiple-pages/>, Oct. 9, 2007, 5 pages.

Park Will., "Neonode N2 Unboxing Pics!", available at <http://www.intomobile.com/2007/07/18/neonode-n2-unboxing-pics/>, Jul. 18, 2007, 7 pages.

PCFAN., "Boot Camp Introduction/Data Transition/Operability/Ability Truth Derived from Gap Mac&Win Dual Boot Hard Verification", Daily Communications, vol. 13, No. 14, Jun. 15, 2006, p. 57 (Japanese Language only).

International Preliminary Report on Patentability received for PCT Patent Application No. PCT/US2006/062685, mailed on Jul. 1, 2008, 6 pages.

International Search Report and Written Opinion received for PCT Patent Application No. PCT/US2007/077638, mailed on Feb. 19, 2008, Feb. 19, 2008, 9 pages.

International Preliminary Report on Patentability received for PCT Patent Application No. PCT/US2007/077639, issued on Mar. 10, 2009, 6 pages.

International Preliminary Report on Patentability received for PCT Patent Application No. PCT/US2007/077643, issued on Mar. 10, 2009, 7 pages.

(56) References Cited

OTHER PUBLICATIONS

International Search Report and Written Opinion received for PCT Patent Application No. PCT/US2007/077644, mailed on May 30, 2008, May 30, 2008, 18 pages.
Invitation to pay additional fees received for PCT Patent Application No. PCT/US2007/077644, mailed on Jan. 23, 2008, 10 pages.
International Search Report and Written Opinion received for PCT Patent Application No. PCT/US2007/077773, mailed on Jan. 15, 2008, Jan. 15, 2008, 8 pages.
International Search Report and Written Opinion received for PCT Patent Application No. PCT/US2007/088879, mailed on Jun. 30, 2008, Jun. 30, 2008, 8 pages.
International Search Report and Written Opinion received for PCT Patent Application No. PCT/US2007/088893, mailed on Jul. 11, 2008, Jul. 11, 2008, 10 pages.
International Preliminary Report on Patentability received for PCT Patent Application No. PCT/US2008/050431, issued on Jul. 7, 2009, 8 pages.
International Preliminary Report on Patentability received for PCT Patent Application No. PCT/US2008/074341, mailed on Mar. 9, 2010, 8 pages.
International Search Report and Written Opinion received for PCT Patent Application No. PCT/US2008/074625, mailed on Jan. 8, 2009, 8 pages.
pocketgear.com., "Software Keyboards: Efzy-Japanese (Eng/Jp) 4.0", TimeSpacesystem Co. Ltd, available at <http://classic.pocketgear.com/softwaredetail.asp?id=9115>, updated on Sep. 23, 2008.
Potter., "Graffiti Smilies", PalmInfocenter Forums, available at <http://www.palminfocenter.com/forum/viewtopic.php?t=11307>, Feb. 9, 2003, 6 pages.
Raman et al., "Application-Specific Workload Shaping in Multimedia-Enabled Personal Mobile Devices", CODES+ISSS, Oct. 22-25, 2006, pp. 4-9.
Realnetworks., "Transition Effects", RealNetworks Production Guide, Available at: <http://service.real.com/help/library/guides/productionguidepreview/HTML/htmflles/transit.htm>, 2001, 21 pages.
Robie Jonathan., "What is the Document Object Model?", Texcel Research, available at <http://www.w3.org/TR-DOM/introduction.html>, 2006, 5 pages.
Rohrer Tim., "Metaphors We Compute by: Bringing Magic into Interface Design", Available online at <http://www.uoregon.edu/-uophil/metaphor/gui4web.htm>, retrieved on Jun. 13, 2006, 7 pages.
Roto et al., "Minimap—A Web Page Visualization Method for Mobile Phones", Proceedings of the SIGCHI Conference on Human Factors in Computing Systems, Apr. 22-27, 2006, pp. 35-44.
Sadun., "Erica's Documentation: Applications and Utilities for the iPhone and iPod Touch", Copyright 2007, Available at: <http://ericasadun.com/ftp/Deprecated/Documentation/Manual-0.04.pdf>, 2007.
Sadun Erica., "1.1.1 iPhone Multipage Springboard Hack", Available at: <http://www.tuaw.com/2007/10/09/1-1-1-iphone-multipage-springboard-hack/>, on Oct. 9, 2007, Oct. 9, 2007, 3 pages.
Sadun Erica., "Found Footage: Scrolling iPhone Dock Smashes Through 16-icon Home Screen Limit", The Unofficial Apple Weblog, available at <http://www.tuaw.com/2007/08/30/found-footage-scrolling-iphone-dock-smashes-through-16-icon-hom/>, Aug. 30, 2007, 3 pages.
Salmre I., "Characteristics of Mobile Applications", Chapter 2, Salmre_02.fm, Dec. 20, 2004, pp. 19-36.
Schreiner Tony., "High DPI in IE: Tip & Mystery Solved", Tony Schreiner's Blog, available at <http://blogs.msdn.com/tonyschr/archive/2004/05/05/126305.aspx>, May 2004, 2 pages.
Sharewareconnection., "Handy Animated Emoticons", available at <http://www.sharewareconnection.com/handy-animated-emoticons.htm>, Jul. 2007, 3 pages.
Stampfli Tracy., "Exploring Full-Screen Mode in Flash Player 9", Available online at <http://www.adobe.com/devnet/flashplayer/articles/full_screen_mode.html>, Nov. 14, 2006, 2 pages.
Stanek et al., "Video and Animation Plug-Ins", Chapter 9, Web Publishing Professional Reference Edition, available online at <http://www.ssuet.edu.pk/taimoor/books/1-57521-198-X/index.htm>, 1997, 18 pages.
Surfin'Safari., "XUL", Available online at <http://weblogs.mozillazine.org/hyatt.archives/2003_10.html>, Oct. 2003, 7 pages.
Thomas, et al., "Applying Cartoon Animation Techniques to Graphical User Interfaces", ACM Transactions on Computer-Human Interaction, vol. 8, No. 3, Sep. 2001, pp. 198-222.
Tooeasytoforget., "iPhone—Demo of SummerBoard & Its Features", 5:05 minutes video, available at <http://www.youtube.com/watch?v=CJOb3ftQLac>, uploaded on Sep. 24, 2007, 2 pages.
tuaw.com., "1.1.1 iPhone Multi page Springboard Hack", Available at <http://www.tuaw.com/2007l10/09/l-1-l-iohone-multioaoe-sorinQ"board-hack/>, Oct. 9, 2007, 5 pages.
tuaw.com., "Springboard Scrolling", mid-scroll, Available at: <http://www.tuaw.com/photos/springboard-scrolling/431348/>, Oct. 9, 2007.
tuaw.com, "Springboard Scrolling", new page dot feature, Available at: <http://www.tuaw.com/gallerv/soringboard-scrolling/431347/>, Oct. 9, 2007.
tuaw.com, "Springboard Scrolling", mostly unpopulated page, Available at: <http://www.tuaw.com/photos/springboard-scrolling/431349/>, Oct. 9, 2007, 3 pages.
tuaw.com., "TUAW Hack: Mess with Your iPhone Settings", Available at: http://www/tuaw.com/tag/SpringBoard/, Dec. 18, 2007, 1 page.
Versiontracker., "Photogather-7.2.6. Hi-res Image Viewer & Editor for Palm", Available online at <http://www.versiontracker.com/dyn/moreinfo/palm/4624>, retrieved on Jun. 12, 2006, 2006, 5 pages.
Vrba, J., "iPhone Customizations and Applications", Ezine Articles, Available at: <http://ezinearticles.com/?iPhone-Customizations-and-Applications&id=815807&opt=print>, Nov. 2007, 2 pages.
w3schools.com., "Playing Videos On The Web", Available online at <http://www.w3schools.com/media/media_browservideos.asp?out=print>, 2006, 3 pages.
w3schools.com., "Multimedia Video Formats", Available online at <http://www.w3sschools.com/media/media_videoformats.asp?output=print>, 2006, 2 pages.
w3schools.com., "Playing QuickTime Movies", Available online at <http://www.3schools.com/media/media_quicktime.asp?output=print>, 2006, 2 pages.
Warabino et al., "Video Transcoding Proxy for 3Gwireless Mobile Internet Access", IEEE Communications Magazine, vol. 38, No. 10, Oct. 2000, pp. 66-71.
Wave Technologies, International Inc. , "Certified Internet Webmaster Foundations Study Guide", A Thomson Learning Company, CIWF-SGMN-0101A, copyright 1988-2000, 88 pages.
Weblogs., "An Overview of WebCore", Chapter 2, WebCore Documentation, available at <http:/lweblogs.mozillazine.org/hyatt/WebCore/chapter2.html>, 2006, 3 pages.
Weblogs., "Downloading and Building WebCore", Chapter 1, WebCore Documentation, available at <http://weblogs.mozillazine.org/hyatt/WebCore/chapter1.html>, 2006, 2 pages.
webmasterworld.com, "Page Zooming with IE-Hidden Feature!", Available at <http://www.webmasterworld.com/forum83/4179.htm>, Jul. 2004, 7 pages.
Wikipedia., "Comparison of Layout Engines", The free encyclopedia, available at <http://en.wikipedia.org/wiki/Comparison_of_layout_engines>, 2006, 3 pages.
Wikipedia., "History of YouTube", The Free Encyclopedia, available at <http://en.wikipedia.org/wiki/History_of_YouTube>, retrieved on Mar. 15, 2011, 4 pages.
Wikipedia., "KDE", The free encyclopedia, available at <http://en.wikipedia.org/wiki/KDE>, 2006, 9 pages.
Wikipedia.., "KHTML", The free encyclopedia, available at <http://en.wikipedia.org/wiki/KHTML>, 2006, 3 pages.
Wikipedia., "List of Layout Engines", The Free Encyclopedia, available at <http://en.wikipedia.org/wiki/List_of_layout_engines>, 2006, 1 page.
Williams Martyn., "LG's Cell Phone Can Pause Live TV", PC World, Oct. 11, 2005, 2 pages.

(56) References Cited

OTHER PUBLICATIONS

Wobbrock et al., "WebThumb: Interaction Techniques for Small-Screen Browsers", UIST'02, Paris France, Oct. 27-30, 2002, pp. 205-208.

Xiao et al., "Slicing*-Tree Based Web Page Transformation for Small Displays", International Conference on Information and Knowledge Management, Oct. 31-Nov. 5, 2005, 2 pages.

Xie et al., "Efficient Browsing of Web Search Results on Mobile Devices Based on Block Importance Model", Microsoft Research Asia, 2005, 10 pages.

Yin et al., "Using Link Analysis to Improve Layout on Mobile Devices", Proceedings of the 13th international conference on World Wide Web, available at <http://www.iw3c2.org/WWW2004/docs/1p338.pdf>, May 17-22, 2004, pp. 338-344.

Youtube., "Broadcast Yourself", Available at <www.youtube.com>, Nov. 1, 2005, 2 pages.

Youtube., "Broadcasting Ourselves", The Official Youtube blog Available at <http://youtube-global.blogspot.In/2005_11_01_archive.html>, Nov. 15, 2005, 5 pages.

Zytronic., "Touchscreen User Manual Zytronic X-Y Controller (Serial and USB)", XP007916436, Nov. 17, 2006, pp. 1-51.

* cited by examiner

PORTABLE MULTIFUNCTION DEVICE, METHOD, AND GRAPHICAL USER INTERFACE SUPPORTING USER NAVIGATIONS OF GRAPHICAL OBJECTS ON A TOUCH SCREEN DISPLAY

RELATED APPLICATIONS

This application is a continuation of U.S. application Ser. No. 11/969,809, filed Jan. 4, 2008, now U.S. Pat. No. 8,519, 964, which claims priority to U.S. Provisional Patent Application Nos. 60/937,993, "Portable Multifunction Device," filed Jun. 29, 2007; 60/937,990, "Portable Multifunction Device, Method, and Graphical User Interface Supporting User Navigations of Graphical Objects on a Touch Screen Display," filed Jun. 29, 2007; 60/879,469, "Portable Multifunction Device," filed Jan. 8, 2007; and 60/879,253, "Portable Multifunction Device," filed Jan. 7, 2007. All of these applications are incorporated by reference herein in their entirety.

This application is related to the following applications: (1) U.S. patent application Ser. No. 10/188,182, "Touch Pad For Handheld Device," filed Jul. 1, 2002; (2) U.S. patent application Ser. No. 10/722,948, "Touch Pad For Handheld Device," filed Nov. 25, 2003; (3) U.S. patent application Ser. No. 10/643,256, "Movable Touch Pad With Added Functionality," filed Aug. 18, 2003; (4) U.S. patent application Ser. No. 10/654,108, "Ambidextrous Mouse," filed Sep. 2, 2003; (5) U.S. patent application Ser. No. 10/840,862, "Multipoint Touchscreen," filed May 6, 2004; (6) U.S. patent application Ser. No. 10/903,964, "Gestures For Touch Sensitive Input Devices," filed Jul. 30, 2004; (7) U.S. patent application Ser. No. 11/038,590, "Mode-Based Graphical User Interfaces For Touch Sensitive Input Devices" filed Jan. 18, 2005; (8) U.S. patent application Ser. No. 11/057,050, "Display Actuator," filed Feb. 11, 2005; (9) U.S. Provisional Patent Application No. 60/658,777, "Multi-Functional Hand-Held Device," filed Mar. 4, 2005; (10) U.S. patent application Ser. No. 11/367, 749, "Multi-Functional Hand-Held Device," filed Mar. 3, 2006; and (11) U.S. Provisional Patent Application No. 60/824,769, "Portable Multifunction Device," filed Sep. 6, 2006. All of these applications are incorporated by reference herein in their entirety.

TECHNICAL FIELD

The disclosed embodiments relate generally to portable electronic devices, and more particularly, to portable devices that support user navigations of graphical objects on a touch screen display.

BACKGROUND

As portable electronic devices become more compact, and the number of functions performed by a given device increase, it has become a significant challenge to design a user interface that allows users to easily interact with a multifunction device. This challenge is particular significant for handheld portable devices, which have much smaller screens than desktop or laptop computers. This situation is unfortunate because the user interface is the gateway through which users receive not only content but also responses to user actions or behaviors, including user attempts to access a device's features, tools, and functions. Some portable communication devices (e.g., mobile telephones, sometimes called mobile phones, cell phones, cellular telephones, and the like) have resorted to adding more pushbuttons, increasing the density of push buttons, overloading the functions of pushbuttons, or using complex menu systems to allow a user to access, store and manipulate data. These conventional user interfaces often result in complicated key sequences and menu hierarchies that must be memorized by the user.

Many conventional user interfaces, such as those that include physical pushbuttons, are also inflexible. This is unfortunate because it may prevent a user interface from being configured and/or adapted by either an application running on the portable device or by users. When coupled with the time consuming requirement to memorize multiple key sequences and menu hierarchies, and the difficulty in activating a desired pushbutton, such inflexibility is frustrating to most users.

On the other hand, a touch-sensitive screen supports more user-friendly and intuitive means for a user to interact with graphical objects on the screen, such as dragging and dropping an object from one position to another using finger tip.

Accordingly, there is a need for portable multifunction devices with more transparent and intuitive user interfaces supporting user navigation of graphical objects on a touch screen display, e.g., swapping two objects, which are easy to use, configure, and/or adapt. Such interfaces increase the effectiveness, efficiency and user satisfaction with portable multifunction devices.

SUMMARY

The above deficiencies and other problems associated with user interfaces for portable devices are reduced or eliminated by the disclosed portable multifunction device. In some embodiments, the device has a touch-sensitive display (also known as a "touch screen") with a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive display. In some embodiments, the functions may include telephoning, video conferencing, e-mailing, instant messaging, blogging, digital photographing, digital videoing, web browsing, digital music playing, and/or digital video playing. Instructions for performing these functions may be included in a computer program product configured for execution by one or more processors.

One aspect of the invention involves a computer-implemented method performed by a portable multifunction device with a touch screen display. In response to a finger-down event on the touch screen display, the device identifies a first user interface object at which the finger-down event occurs. In response to one or more finger-dragging events on the touch screen display, the device then moves the first user interface object on the touch screen display in accordance with the finger-dragging events. In response to a finger-up event on the touch screen display, the device identifies a second user interface object at which the finger-up event occurs and visually replaces the second user interface object with the first user interface object.

Another aspect of the invention involves a computer-implemented method performed by a portable multifunction device with a touch screen display. The device displays a first user interface object and a second user interface object on the touch screen display. In response to a finger-down event at the first user interface object and one or more finger-dragging events on the touch screen display, the device moves the first user interface object on the touch screen display along a path determined by the finger-dragging events until the first user interface object at least in part overlaps the second user interface object. In response to a finger-up event at the second user interface object, the device visually replaces the second user interface object with the first user interface object.

Another aspect of the invention involves a portable electronic device with a touch screen display for displaying a plurality of user interface objects. The device includes one or more processors, memory, and a program stored in the memory and configured to be executed by the one or more processors. The program includes: instructions for displaying a first user interface object and a second user interface object on the touch screen display; instructions for detecting a finger-down event at the first user interface object; instructions for detecting one or more finger-dragging events on the touch screen display; instructions for moving the first user interface object on the touch screen display along a path determined by the finger-dragging events until the first user interface object at least in part overlaps the second user interface object; instructions for detecting a finger-up event at the second user interface object; and instructions for visually replacing the second user interface object with the first user interface object.

Another aspect of the invention involves a computer readable storage medium that stores one or more programs. The one or more programs include instructions, which when executed by the device, cause the device to: display a first user interface object and a second user interface object on the touch screen display; detect a finger-down event at the first user interface object; detect one or more finger-dragging events on the touch screen display; move the first user interface object on the touch screen display along a path determined by the finger-dragging events until the first user interface object at least in part overlaps the second user interface object; detect a finger-up event at the second user interface object; and visually replace the second user interface object with the first user interface object.

Another aspect of the invention involves a portable electronic device with a touch screen display with a plurality of user interface objects. The device includes: means for displaying a first user interface object and a second user interface object on the touch screen display; means for detecting a finger-down event at the first user interface object; means for detecting one or more finger-dragging events on the touch screen display; means for moving the first user interface object on the touch screen display along a path determined by the finger-dragging events until the first user interface object at least in part overlaps the second user interface object; means for detecting a finger-up event at the second user interface object; and means for visually replacing the second user interface object with the first user interface object.

Another aspect of the invention involves a computer-implemented method performed by a portable multifunction device with a touch screen display. The device displays a series of ratings indicia on the touch screen display. The series of ratings indicia include a lowest rating indicia and one or more progressively higher rating indicia. In response to a finger gesture by a user on one or more of the ratings indicia, the device determines a last rating indicia contacted by the finger gesture immediately prior to the finger breaking contact with the touch screen display. A rating corresponding to the last rating indicia contacted by the finger gesture is used as input to a function or application in the device.

Another aspect of the invention involves a graphical user interface on a portable electronic device with a touch screen display. The graphical user interface includes a series of ratings indicia on the touch screen display. The ratings indicia include a lowest rating indicia and one or more progressively higher rating indicia. In response to a finger gesture on one or more of the ratings indicia, the graphical user interface displays on the touch screen a graphical object using as input the last rating indicia contacted by the finger gesture before the finger gesture breaks contact with the touch screen display.

Another aspect of the invention involves a portable electronic device with a touch screen display. The device includes one or more processors, memory, and one or more programs stored in the memory and configured to be executed by the processors. The programs include: instructions for displaying a series of ratings indicia on the touch screen display, wherein the ratings indicia comprise a lowest rating indicia and one or more progressively higher rating indicia; instructions for detecting a finger gesture by a user on one or more of the ratings indicia, wherein the finger gesture contacts a last rating indicia immediately prior to breaking contact with the touch screen display; and instructions for using a rating corresponding to the last rating indicia contacted by the finger gesture as input to a function or application in the device.

Another aspect of the invention involves a computer readable storage medium that stores one or more programs. The one or more programs include instructions, which when executed by a portable multifunction device with a touch screen display, cause the device to: display a series of ratings indicia on the touch screen display, wherein the ratings indicia comprise a lowest rating indicia and one or more progressively higher rating indicia; detect a finger gesture by a user on one or more of the ratings indicia, wherein the finger gesture contacts a last rating indicia immediately prior to breaking contact with the touch screen display; and use a rating corresponding to the last rating indicia contacted by the finger gesture as input to a function or application in the device.

Another aspect of the invention involves a portable electronic device with a touch screen display. The device includes: means for displaying a series of ratings indicia on the touch screen display, wherein the ratings indicia comprise a lowest rating indicia and one or more progressively higher rating indicia; means for detecting a finger gesture by a user on one or more of the ratings indicia, wherein the finger gesture contacts a last rating indicia immediately prior to breaking contact with the touch screen display; and means for using a rating corresponding to the last rating indicia contacted by the finger gesture as input to a function or application in the device.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1A:
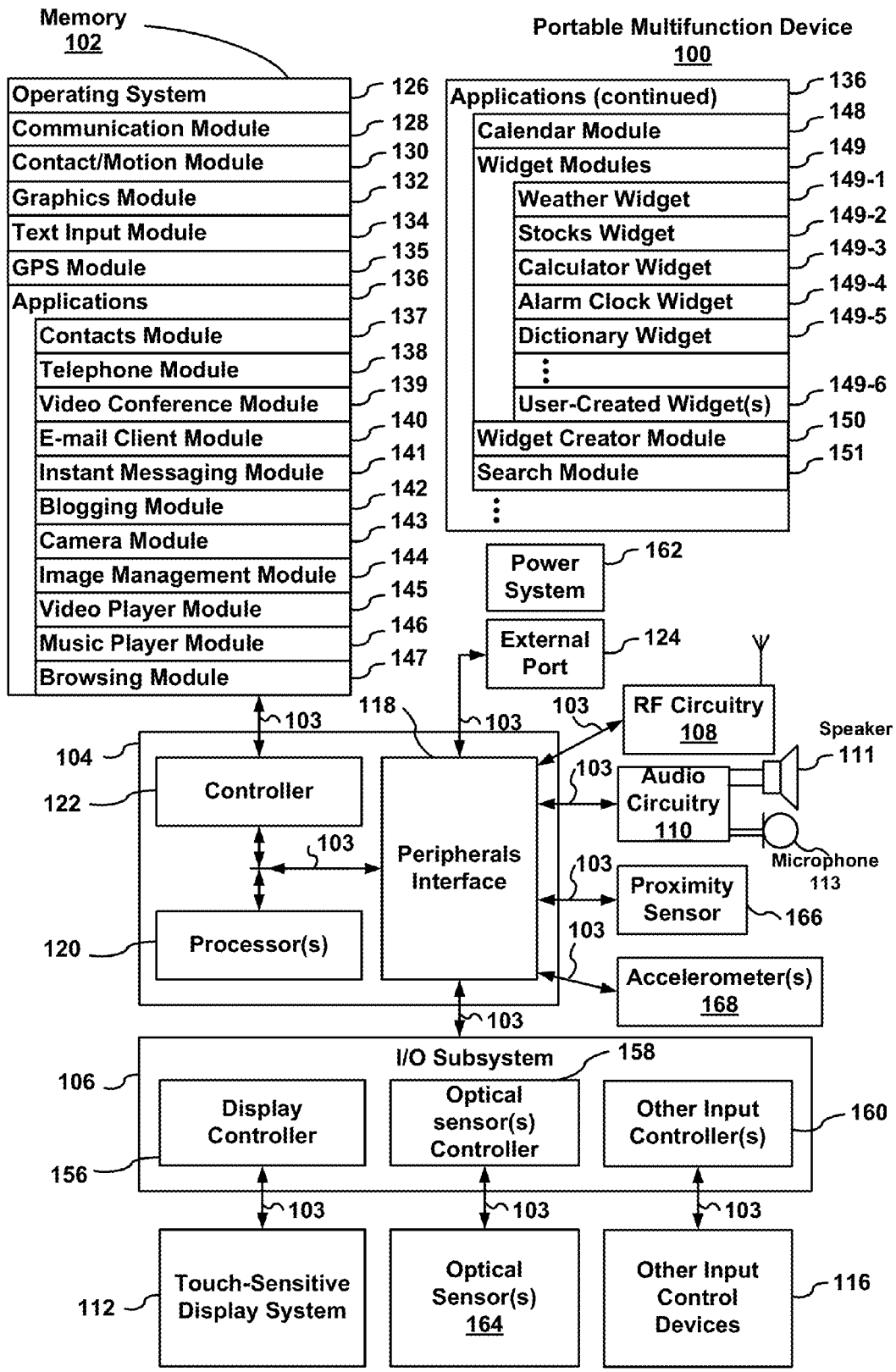
FIGS. 1A and 1B are block diagrams illustrating portable multifunction devices with touch-sensitive displays in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first gesture could be termed a second gesture, and, similarly, a second gesture could be termed a first gesture, without departing from the scope of the present invention.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of a portable multifunction device, user interfaces for such devices, and associated processes for using such devices are described. In some embodiments, the device is a portable communications device such as a mobile telephone that also contains other functions, such as PDA and/or music player functions.

The user interface may include a physical click wheel in addition to a touch screen or a virtual click wheel displayed on the touch screen. A click wheel is a user-interface device that may provide navigation commands based on an angular displacement of the wheel or a point of contact with the wheel by a user of the device. A click wheel may also be used to provide a user command corresponding to selection of one or more items, for example, when the user of the device presses down on at least a portion of the wheel or the center of the wheel. Alternatively, breaking contact with a click wheel image on a touch screen surface may indicate a user command corresponding to selection. For simplicity, in the discussion that follows, a portable multifunction device that includes a touch screen is used as an exemplary embodiment. It should be understood, however, that some of the user interfaces and associated processes may be applied to other devices, such as personal computers and laptop computers, which may include one or more other physical user-interface devices, such as a physical click wheel, a physical keyboard, a mouse and/or a joystick.

The device supports a variety of applications, such as a telephone application, a video conferencing application, an e-mail application, an instant messaging application, a blogging application, a digital camera application, a digital video camera application, a web browsing application, a digital music player application, and/or a digital video player application.

The various applications that may be executed on the device may use at least one common physical user-interface device, such as the touch screen. One or more functions of the touch screen as well as corresponding information displayed on the device may be adjusted and/or varied from one application to the next and/or within a respective application. In this way, a common physical architecture (such as the touch screen) of the device may support the variety of applications with user interfaces that are intuitive and transparent.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006, and Ser. No. 11/459,615, "Touch Screen Keyboards For Portable Electronic Devices," filed Jul. 24, 2006, the contents of which are hereby incorporated by reference in their entirety. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the portable device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Figure 1B:
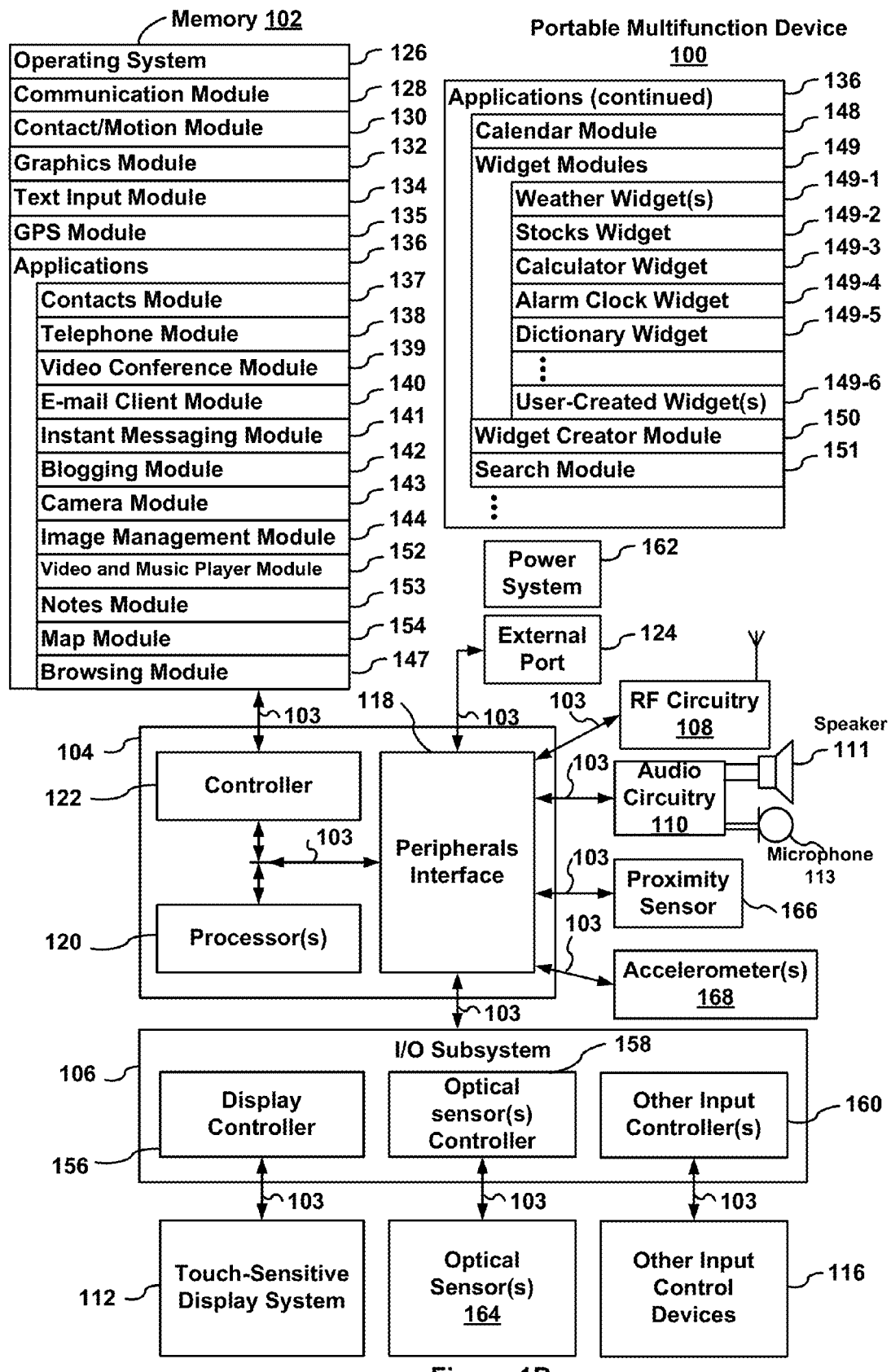

Attention is now directed towards embodiments of the device. FIGS. 1A and 1B are block diagrams illustrating portable multifunction devices 100 with touch-sensitive displays 112 in accordance with some embodiments. The touch-sensitive display 112 is sometimes called a "touch screen" for convenience, and may also be known as or called a touch-sensitive display system. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. The device 100 may include one or more optical sensors 164. These components may communicate over one or more communication buses or signal lines 103.

It should be appreciated that the device 100 is only one example of a portable multifunction device 100, and that the device 100 may have more or fewer components than shown, may combine two or more components, or a may have a different configuration or arrangement of the components. The various components shown in FIGS. 1A and 1B may be implemented in hardware, software or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (e.g. 212, FIG. 2). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the touch screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of the speaker 111 and/or the microphone 113. The one or more buttons may include a push button (e.g., 206, FIG. 2). A quick press of the push button may disengage a lock of the touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button (e.g., 206) may turn power to the device 100 on or off. The user may be able to customize a functionality of one or more of the buttons. The touch screen 112 is used to implement virtual or soft buttons and one or more soft keyboards.

The touch-sensitive touch screen 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user-interface objects, further details of which are described below.

A touch screen 112 has a touch-sensitive surface, sensor or set of sensors that accepts input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user-interface objects (e.g., one or more soft keys, icons, web pages or images) that are displayed on the touch screen. In an exemplary embodiment, a point of contact between a touch screen 112 and the user corresponds to a finger of the user.

The touch screen 112 may use LCD (liquid crystal display) technology, or LPD (light emitting polymer display) technology, although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112.

A touch-sensitive display in some embodiments of the touch screen 112 may be analogous to the multi-touch sensitive tablets described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, a touch screen 112 displays visual output from the portable device 100, whereas touch sensitive tablets do not provide visual output.

A touch-sensitive display in some embodiments of the touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

The touch screen 112 may have a resolution in excess of 100 dpi. In an exemplary embodiment, the touch screen has a resolution of approximately 160 dpi. The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

In some embodiments, the device 100 may include a physical or virtual click wheel as an input control device 116. A user may navigate among and interact with one or more graphical objects (henceforth referred to as icons) displayed in the touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the touch screen 112 and the display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The device 100 may also include one or more optical sensors 164. FIGS. 1A and 1B show an optical sensor coupled to an optical sensor controller 158 in I/O subsystem 106. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143 (also called a camera module), the optical sensor 164 may capture still images or video. In some embodiments, an optical sensor is located on the back of the device 100, opposite the touch screen display 112 on the front of the device, so that the touch screen display may be used as a viewfinder for either still and/or video image acquisition. In some embodiments, an optical sensor is located on the front of the device so that the user's image may be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and/or video image acquisition.

The device 100 may also include one or more proximity sensors 166. FIGS. 1A and 1B show a proximity sensor 166 coupled to the peripherals interface 118. Alternately, the proximity sensor 166 may be coupled to an input controller 160 in the I/O subsystem 106. The proximity sensor 166 may perform as described in U.S. patent application Ser. Nos. 11/241,839, "Proximity Detector In Handheld Device," filed Sep. 30, 2005; Ser. No. 11/240,788, "Proximity Detector In Handheld Device," filed Sep. 30, 2005; 11/620,702, "Using Ambient Light Sensor To Augment Proximity Sensor Output," filed Jan. 7, 2007 11/586,862, "Automated Response To And Sensing Of User Activity In Portable Devices," filed Oct. 24, 2006 11/638,251, "Methods And Systems For Automatic Configuration Of Peripherals," filed Dec. 12, 2006, which are hereby incorporated by reference in their entirety. In some embodiments, the proximity sensor turns off and disables the touch screen 112 when the multifunction device is placed near the user's ear (e.g., when the user is making a phone call). In some embodiments, the proximity sensor keeps the screen off when the device is in the user's pocket, purse, or other dark area to prevent unnecessary battery drainage when the device is a locked state.

The device 100 may also include one or more accelerometers 168. FIGS. 1A and 1B show an accelerometer 168 coupled to the peripherals interface 118. Alternately, the accelerometer 168 may be coupled to an input controller 160 in the I/O subsystem 106. The accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are which are incorporated herein by reference in their entirety. In some embodiments, information is displayed on the touch screen display in a portrait view or a landscape view based on an analysis of data received from the one or more accelerometers.

In some embodiments, the software components stored in memory 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, and applications (or set of instructions) 136.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Computer, Inc.) devices.

The contact/motion module 130 may detect contact with the touch screen 112 (in conjunction with the display controller 156) and other touch sensitive devices (e.g., a touchpad or physical click wheel). The contact/motion module 130 includes various software components for performing various operations related to detection of contact, such as determining if contact has occurred, determining if there is movement of the contact and tracking the movement across the touch screen 112, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 130 and the display controller 156 also detects contact on a touchpad. In some embodiments, the contact/motion module 130 and the controller 160 detects contact on a click wheel.

The graphics module 132 includes various known software components for rendering and displaying graphics on the touch screen 112, including components for changing the intensity of graphics that are displayed. As used herein, the term "graphics" includes any object that can be displayed to a user, including without limitation text, web pages, icons (such as user-interface objects including soft keys), digital images, videos, animations and the like.

The text input module 134, which may be a component of graphics module 132, provides soft keyboards for entering text in various applications (e.g., contacts 137, e-mail 140, IM 141, blogging 142, browser 147, and any other application that needs text input).

The GPS module 135 determines the location of the device and provides this information for use in various applications (e.g., to telephone 138 for use in location-based dialing, to camera 143 and/or blogger 142 as picture/video metadata, and to applications that provide location-based services such as weather widgets, local yellow page widgets, and map/navigation widgets).

The applications 136 may include the following modules (or sets of instructions), or a subset or superset thereof:
- a contacts module 137 (sometimes called an address book or contact list);
- a telephone module 138;
- a video conferencing module 139;
- an e-mail client module 140;
- an instant messaging (IM) module 141;
- a blogging module 142;
- a camera module 143 for still and/or video images;
- an image management module 144;
- a video player module 145;
- a music player module 146;
- a browser module 147;
- a calendar module 148;
- widget modules 149, which may include weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which merges video player module 145 and music player module 146;
- notes module 153;
- map module 154; and/or
- online video module 155.

Examples of other applications 136 that may be stored in memory 102 include other word processing applications, JAVA-enabled applications, encryption, digital rights management, voice recognition, and voice replication.

In conjunction with touch screen 112, display controller 156, contact module 130, graphics module 132, and text input module 134, the contacts module 137 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, the telephone module 138 may be used to enter a sequence of characters corresponding to a telephone number, access one or more telephone numbers in the address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, the videoconferencing module 139 may be used to initiate, conduct, and terminate a video conference between a user and one or more other participants.

In conjunction with RF circuitry 108, touch screen 112, display controller 156, contact module 130, graphics module 132, and text input module 134, the e-mail client module 140 may be used to create, send, receive, and manage e-mail. In conjunction with image management module 144, the e-mail module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 may be used to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, image management module 144, and browsing module 147, the blogging module 142 may be used to send text, still images, video, and/or other graphics to a blog (e.g., the user's blog).

In conjunction with touch screen 112, display controller 156, optical sensor(s) 164, optical sensor controller 158, contact module 130, graphics module 132, and image management module 144, the camera module 143 may be used to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, the image management module 144 may be used to arrange, modify or otherwise manipulate, label, delete, present (e.g., in a digital slide show or album), and store still and/or video images.

In conjunction with touch screen 112, display controller 156, contact module 130, graphics module 132, audio circuitry 110, and speaker 111, the video player module 145 may be used to display, present or otherwise play back videos (e.g., on the touch screen or on an external, connected display via external port 124).

In conjunction with touch screen 112, display system controller 156, contact module 130, graphics module 132, audio circuitry 110, speaker 111, RF circuitry 108, and browser module 147, the music player module 146 allows the user to download and play back recorded music and other sound files stored in one or more file formats, such as MP3 or AAC files. In some embodiments, the device 100 may include the functionality of an MP3 player, such as an iPod (trademark of Apple Computer, Inc.).

In conjunction with RF circuitry 108, touch screen 112, display system controller 156, contact module 130, graphics module 132, and text input module 134, the browser module 147 may be used to browse the Internet, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail module 140, and browser module 147, the calendar module 148 may be used to create, display, modify, and store calendars and data associated with calendars (e.g., calendar entries, to do lists, etc.).

In conjunction with RF circuitry 108, touch screen 112, display system controller 156, contact module 130, graphics module 132, text input module 134, and browser module 147, the widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, the search module 151 may be used to search for text, music, sound, image, video, and/or other files in memory 102 that match one or more search criteria (e.g., one or more user-specified search terms).

In conjunction with touch screen 112, display controller 156, contact module 130, graphics module 132, and text input module 134, the notes module 153 may be used to create and manage notes, to do lists, and the like.

In conjunction with RF circuitry 108, touch screen 112, display system controller 156, contact module 130, graphics module 132, text input module 134, GPS module 135, and browser module 147, the map module 154 may be used to receive, display, modify, and store maps and data associated with maps (e.g., driving directions; data on stores and other points of interest at or near a particular location; and other location-based data).

In conjunction with touch screen 112, display system controller 156, contact module 130, graphics module 132, audio circuitry 110, speaker 111, RF circuitry 108, text input module 134, e-mail client module 140, and browser module 147, the online video module 155 allows the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Embodiments of user interfaces and associated processes using online video module 155 are described further below.

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, the device 100 is a device where operation of a predefined set of functions on the device is performed exclusively through a touch screen 112 and/or a touchpad. By using a touch screen and/or a touchpad as the primary input/control device for operation of the device 100, the number of physical input/control devices (such as push buttons, dials, and the like) on the device 100 may be reduced.

The predefined set of functions that may be performed exclusively through a touch screen and/or a touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

Figure 2:
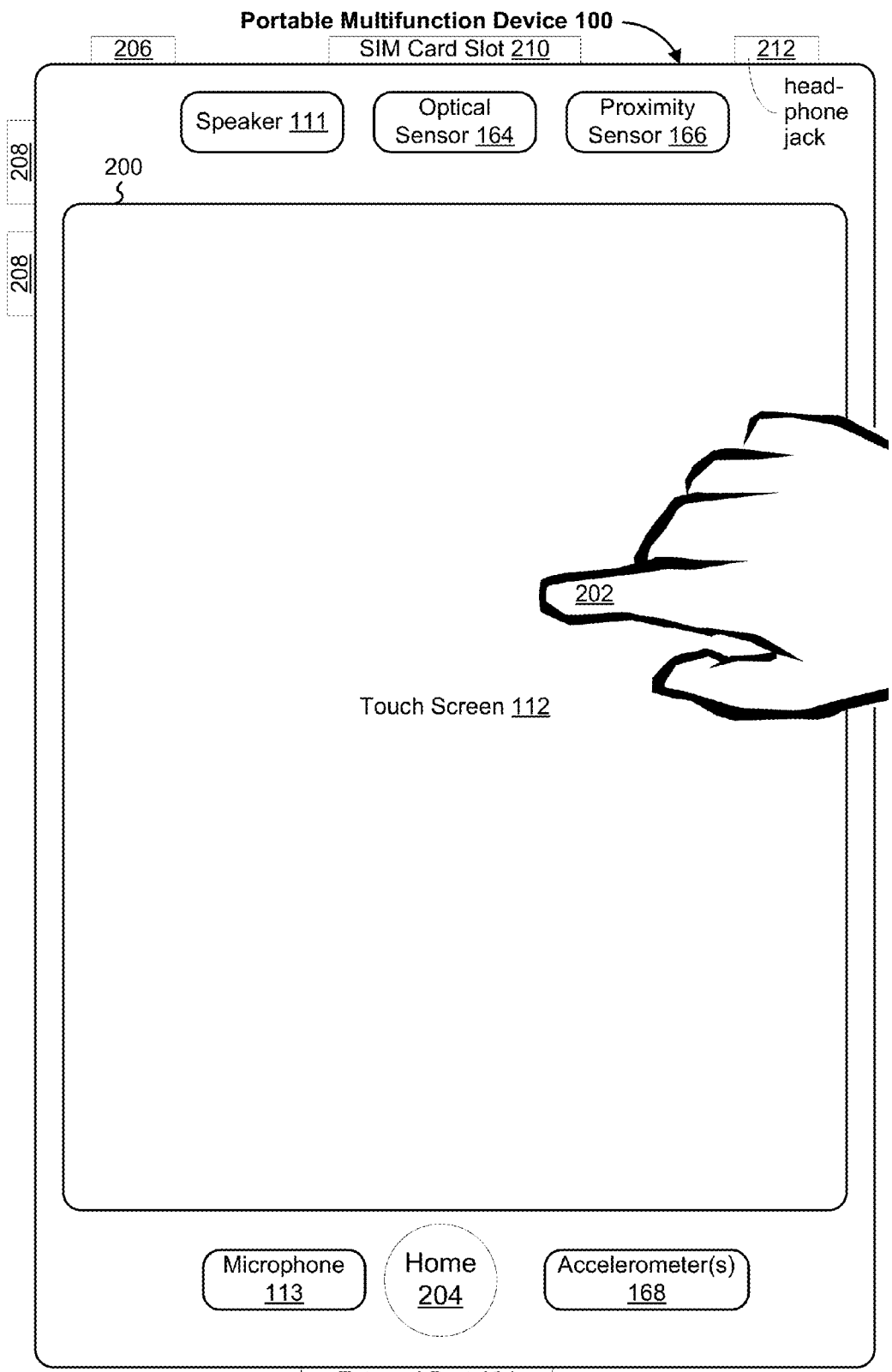
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with the device 100. In some embodiments, inadvertent contact with a graphic may not select the graphic. For example, a swipe gesture that sweeps over an application icon may not select the corresponding application when the gesture corresponding to selection is a tap.

The device 100 may also include one or more physical buttons, such as "home" or menu button 204. As described previously, the menu button 204 may be used to navigate to any application 136 in a set of applications that may be executed on the device 100. Alternatively, in some embodiments, the menu button is implemented as a soft key in a GUI in touch screen 112.

In one embodiment, the device 100 includes a touch screen 112, a menu button 204, a push button 206 for powering the device on/off and locking the device, volume adjustment button(s) 208, a Subscriber Identity Module (SIM) card slot 210, a head set jack 212, and a docking/charging external port 124. The push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, the device 100 also may accept verbal input for activation or deactivation of some functions through the microphone 113.

Attention is now directed towards embodiments of user interfaces ("UI") and associated processes that may be implemented on a portable multifunction device 100.

Figure 3:
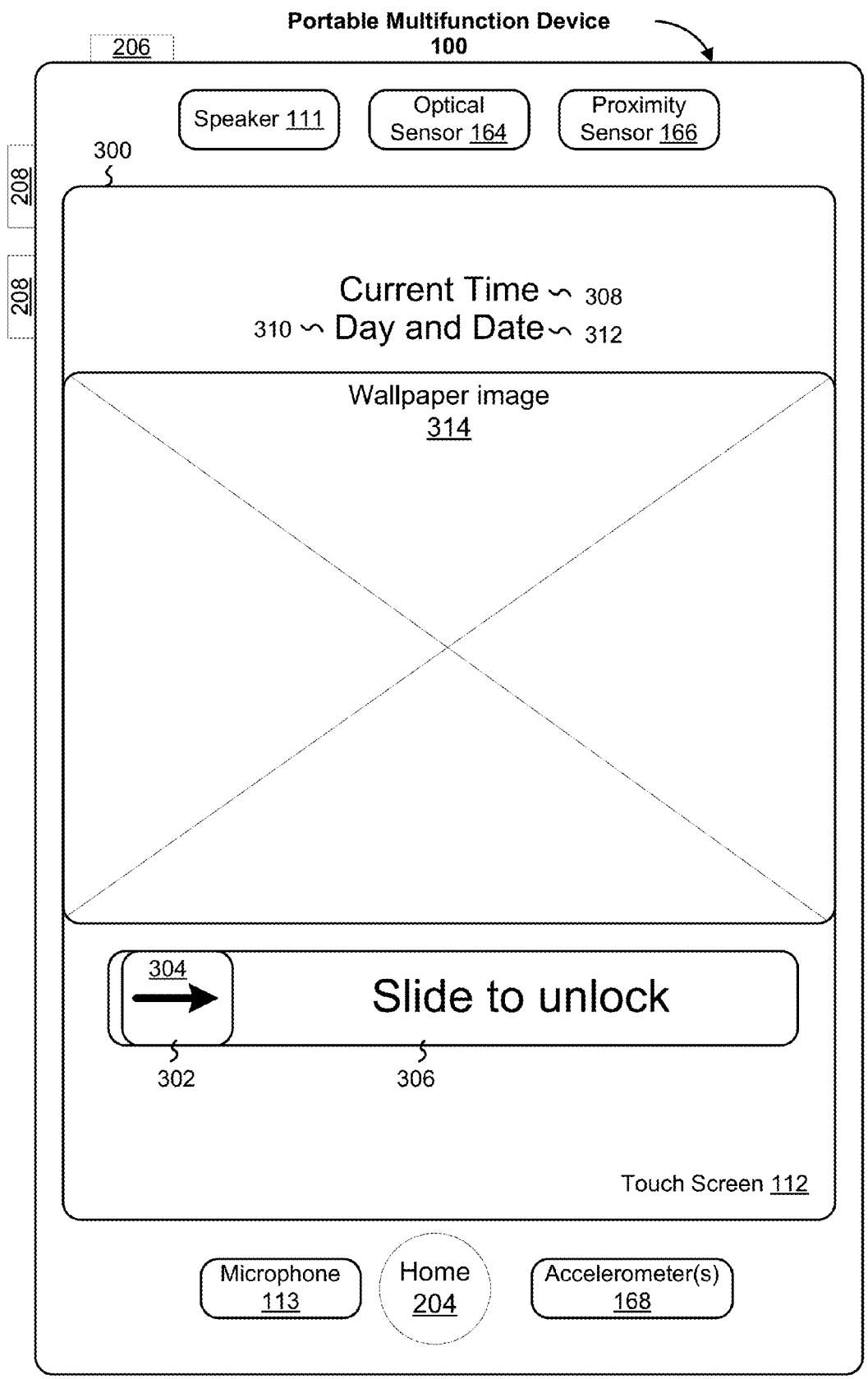
FIG. 3 illustrates an exemplary user interface for unlocking a portable electronic device in accordance with some embodiments.

FIG. 3 illustrates an exemplary user interface for unlocking a portable electronic device in accordance with some embodiments. In some embodiments, user interface 300 includes the following elements, or a subset or superset thereof:

Unlock image 302 that is moved with a finger gesture to unlock the device;
Arrow 304 that provides a visual cue to the unlock gesture;
Channel 306 that provides additional cues to the unlock gesture;
Time 308;
Day 310;
Date 312; and
Wallpaper image 314.

In some embodiments, the device detects contact with the touch-sensitive display (e.g., a user's finger making contact on or near the unlock image 302) while the device is in a user-interface lock state. The device moves the unlock image 302 in accordance with the contact. The device transitions to a user-interface unlock state if the detected contact corresponds to a predefined gesture, such as moving the unlock image across channel 306. Conversely, the device maintains the user-interface lock state if the detected contact does not correspond to the predefined gesture. As noted above, processes that use gestures on the touch screen to unlock the device are described in U.S. patent application Ser. No. 11/322,549, "Unlocking A Device By Performing Gestures On An Unlock Image," filed Dec. 23, 2005, and Ser. No. 11/322,550, "Indication Of Progress Towards Satisfaction Of A User Input Condition," filed Dec. 23, 2005, which are hereby incorporated by reference in their entirety.

Figure 4A:
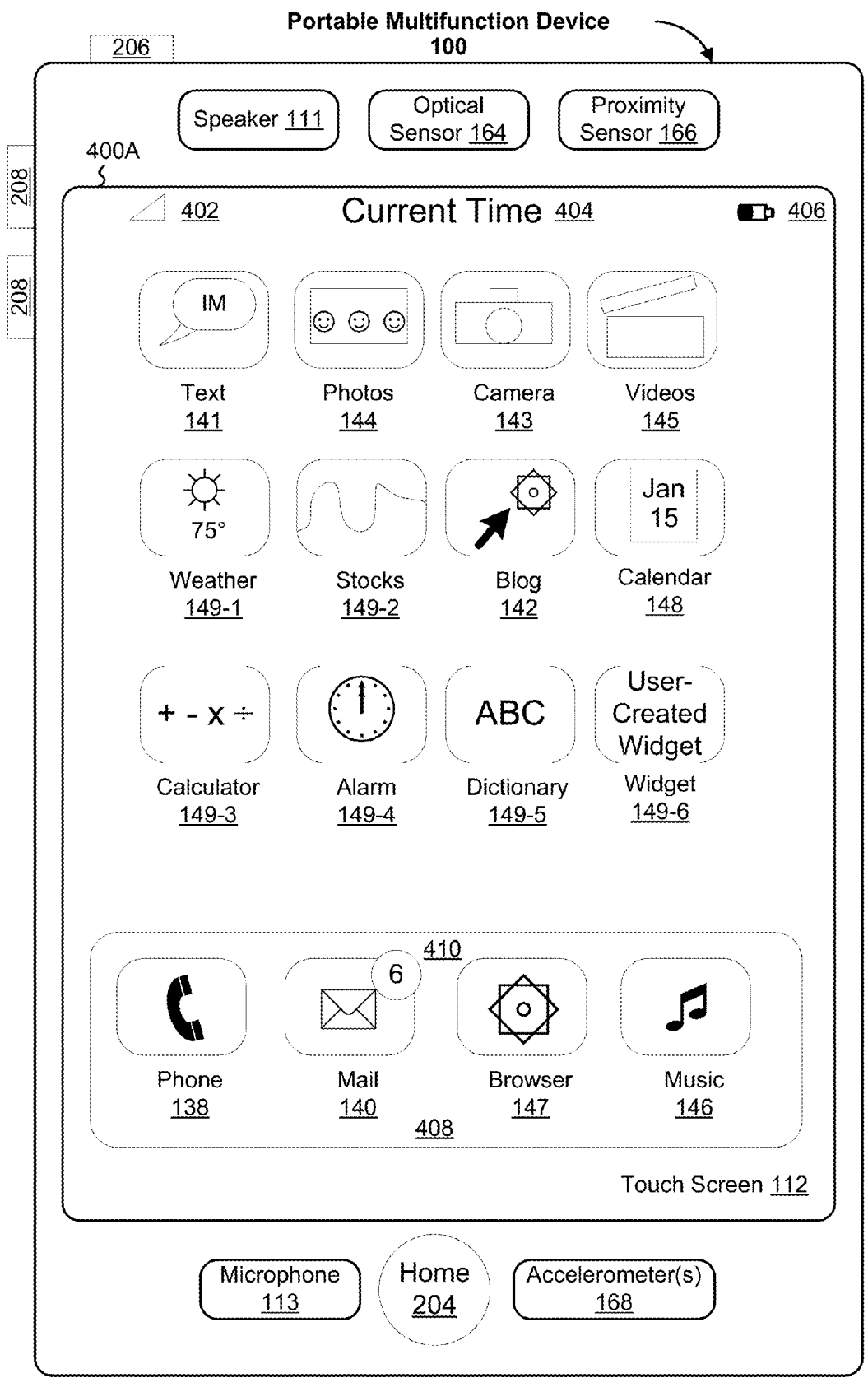
FIGS. 4A and 4B illustrate exemplary user interfaces for a menu of applications on a portable multifunction device in accordance with some embodiments.
Figure 4B:
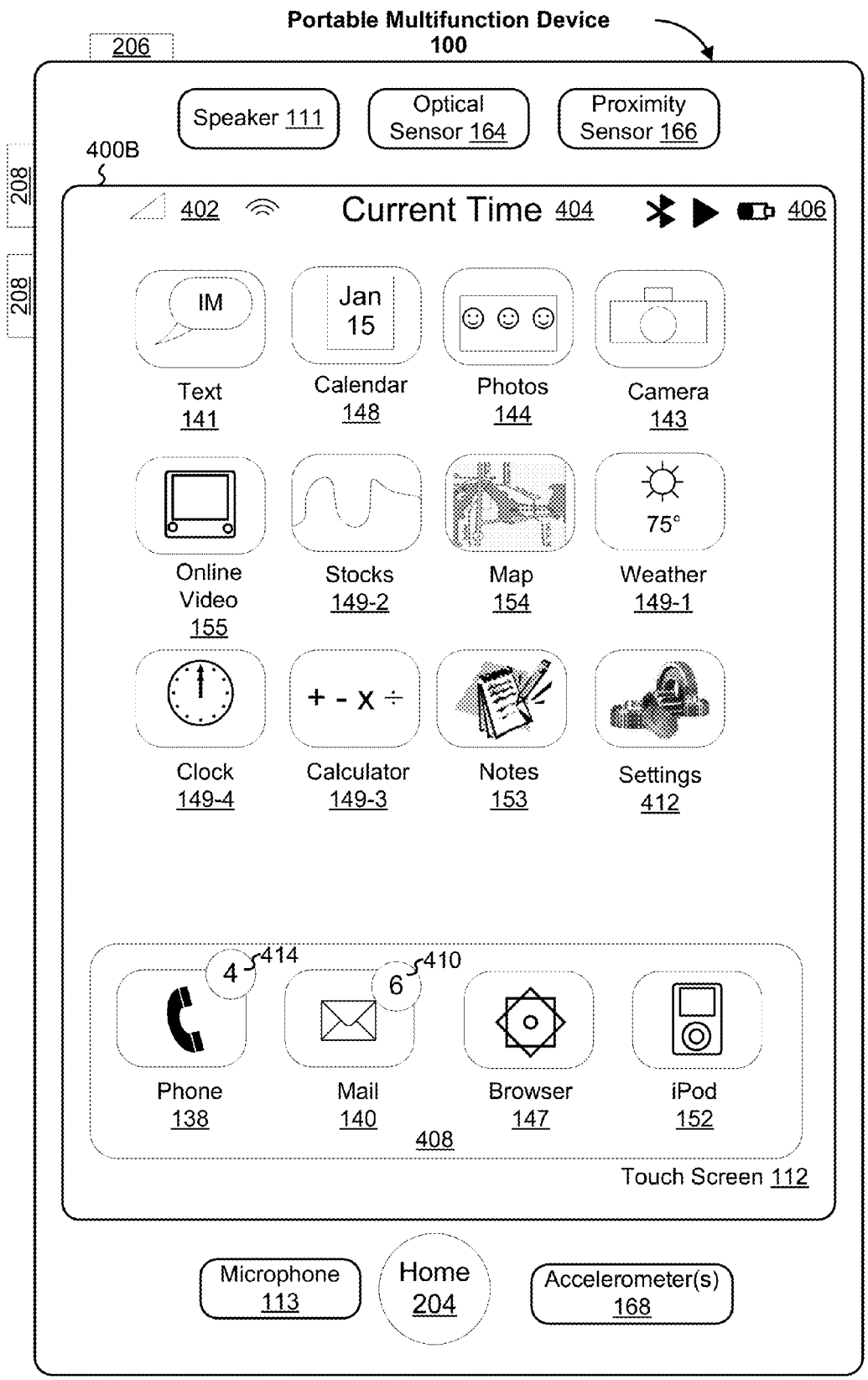

FIGS. 4A and 4B illustrate exemplary user interfaces for a menu of applications on a portable multifunction device in accordance with some embodiments. In some embodiments, user interface 400A includes the following elements, or a subset or superset thereof:

Signal strength indicator(s) 402 for wireless communication(s), such as cellular and Wi-Fi signals;
Time 404;
Battery status indicator 406;
Tray 408 with icons for frequently used applications, such as one or more of the following:
Phone 138, which may include an indicator 414 of the number of missed calls or voicemail messages;
E-mail client 140, which may include an indicator 410 of the number of unread e-mails;
Browser 147; and
Music player 146; and
Icons for other applications, such as one or more of the following:
IM 141;
Image management 144;
Camera 143;
Video player 145;

Weather 149-1;

Stocks 149-2;

Blog 142;

Calendar 148;

Calculator 149-3;

Alarm clock 149-4;

Dictionary 149-5; and

User-created widget 149-6.

In some embodiments, user interface 400B includes the following elements, or a subset or superset thereof:

402, 404, 406, 141, 148, 144, 143, 149-3, 149-2, 149-1, 149-4, 410, 414, 138, 140, and 147, as described above;

Map 154;

Notes 153;

Settings 412, which provides access to settings for the device 100 and its various applications 136;

Video and music player module 152, also referred to as iPod (trademark of Apple Computer, Inc.) module 152; and Online video module 155, also referred to as YouTube (trademark of Google, Inc.) module 155.

In some embodiments, UI 400A or 400B displays all of the available applications 136 on one screen so that there is no need to scroll through a list of applications (e.g., via a scroll bar). In some embodiments, as the number of applications increase, the icons corresponding to the applications may decrease in size so that all applications may be displayed on a single screen without scrolling. In some embodiments, having all applications on one screen and a menu button enables a user to access any desired application with at most two inputs, such as activating the menu button 204 and then activating the desired application (e.g., by a tap or other finger gesture on the icon corresponding to the application).

In some embodiments, UI 400A or 400B provides integrated access to both widget-based applications and non-widget-based applications. In some embodiments, all of the widgets, whether user-created or not, are displayed in UI 400A or 400B. In other embodiments, activating the icon for user-created widget 149-6 may lead to another UI that contains the user-created widgets or icons corresponding to the user-created widgets.

In some embodiments, a user may rearrange the icons in UI 400A or 400B, e.g., using processes described in U.S. patent application Ser. No. 11/459,602, "Portable Electronic Device With Interface Reconfiguration Mode," filed Jul. 24, 2006, which is hereby incorporated by reference in its entirety. For example, a user may move application icons in and out of tray 408 using finger gestures.

In some embodiments, UI 400A or 400B includes a gauge (not shown) that displays an updated account usage metric for an account associated with usage of the device (e.g., a cellular phone account), as described in U.S. patent application Ser. No. 11/322,552, "Account Information Display For Portable Communication Device," filed Dec. 23, 2005, which is hereby incorporated by reference in its entirety.

As noted in the background section, many user-friendly GUI features cannot be implemented because of the limitations with the conventional graphical user interfaces. But these limitations can be overcome by a portable device with a touch screen display as described in the present application. For example, it is possible to use finger gestures to drag and drop a user interface object such as an icon from one position to another position on the touch screen display for swapping two objects. It is also possible for a user to rank information or services rendered by the portable device using such finger gestures.

The term "user interface object" (which is interchangeable with "graphical object") generally refers to a graphical icon on the touch screen display, which may be associated with an entertainment item, an application configuration option, an email message, a photo, a data file, or the like depending on the specific application that employs the schemes.

FIGS. 8A through 8I illustrate exemplary user interfaces for a music and video player in accordance with some embodiments. Note that these user interfaces are only examples illustrating the processes mentioned above. One skilled in the art may apply these user navigation schemes to other applications that provide or require similar user experience.

Figure 8A:
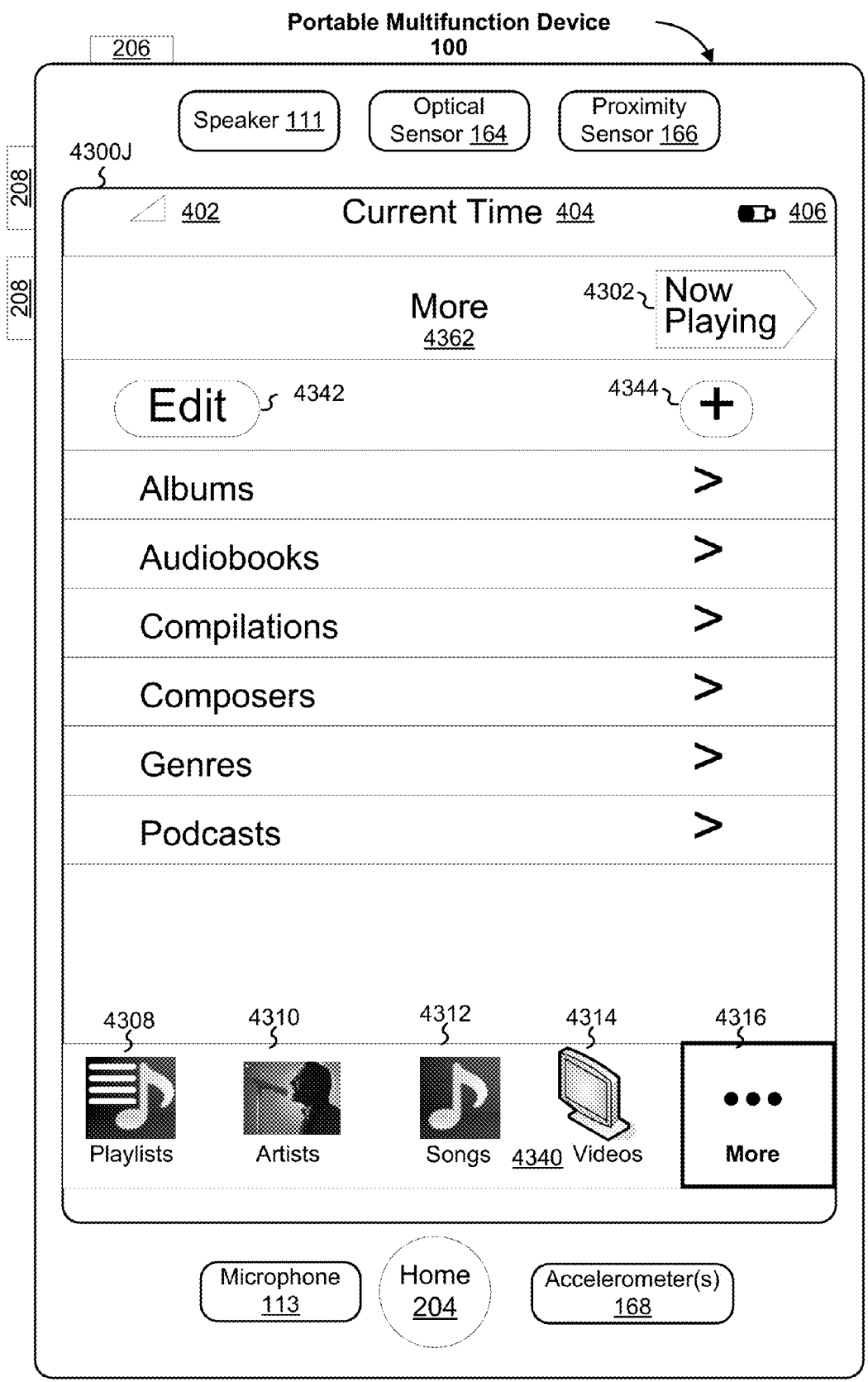
FIGS. 8A through 8I illustrate exemplary user interfaces for a music and video player in accordance with some embodiments.

In some embodiments, icons for major content categories (e.g., playlists 4308, artists 4310, songs 4312, and video 4314, FIG. 8A) are displayed in a first area of the display (e.g., 4340, FIG. 8A). In some embodiments, the first area also includes an icon (e.g., more icon 4316) that when activated (e.g., by a finger tap on the icon) leads to additional content categories (e.g., albums, audiobooks, compilations, composers, genres, and podcasts in FIG. 8A).

In some embodiments, the major content categories that are displayed in the first area 4340 of the display can be rearranged by a user to correspond to the user's preferred (favorite) categories (e.g., as illustrated in FIGS. 8A-8G). In some embodiments, activation of add category icon 4344 (e.g., by a finger tap on the icon) initiates display of a UI with a soft keyboard for adding user specified categories (not shown). In some embodiments, activation of edit icon 4342 in FIG. 8A (e.g., by a finger tap on the icon) initiates display of UI 4300K (FIG. 8B) with delete icons 4348 (which operate like delete icons 702, FIG. 7, as described above) and moving affordance icons 4360. As described below, moving affordance icons 4360 may be used as control icons that assist in rearranging categories or other UI objects.

Figure 5:
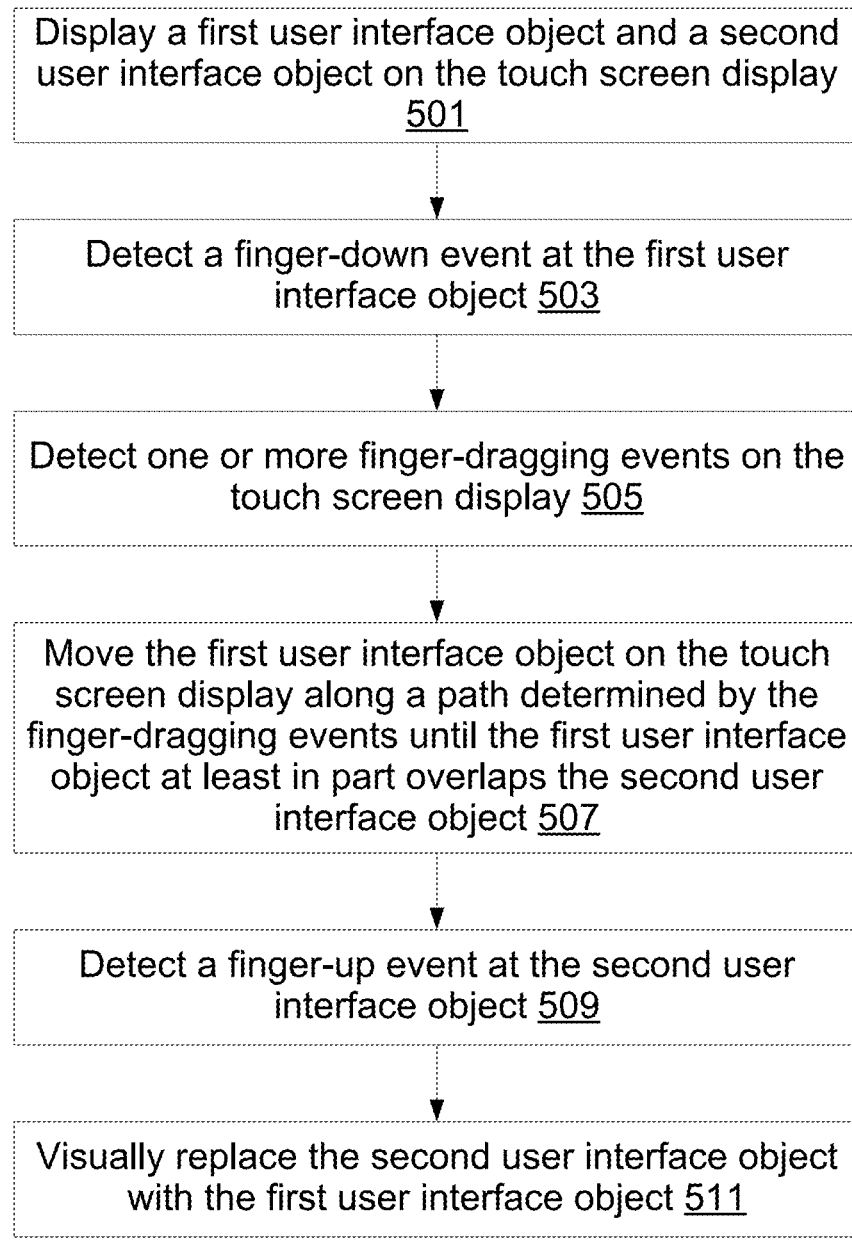
FIG. 5 is a flow diagram illustrating a first process for swapping first and second user interface objects in accordance with some embodiments.

FIG. 5 is a flow diagram illustrating a first process for swapping first and second user interface objects in accordance with some embodiments. In some embodiments, a portable multifunction device with a touch screen display with a plurality of user interface objects displays a first user interface object (e.g., genres icon 4350, FIG. 8B) and a second user interface object (e.g., artists icon 4310, FIG. 8B) on the touch screen display (501). In some embodiments, the first user interface object is one of a group of candidate icons (e.g., icons in the more list 4362, FIG. 8B, which are candidates for rearrangement) and the second user interface object is one of a group of user favorite icons (e.g., icons in area 4340).

Figure 8B:
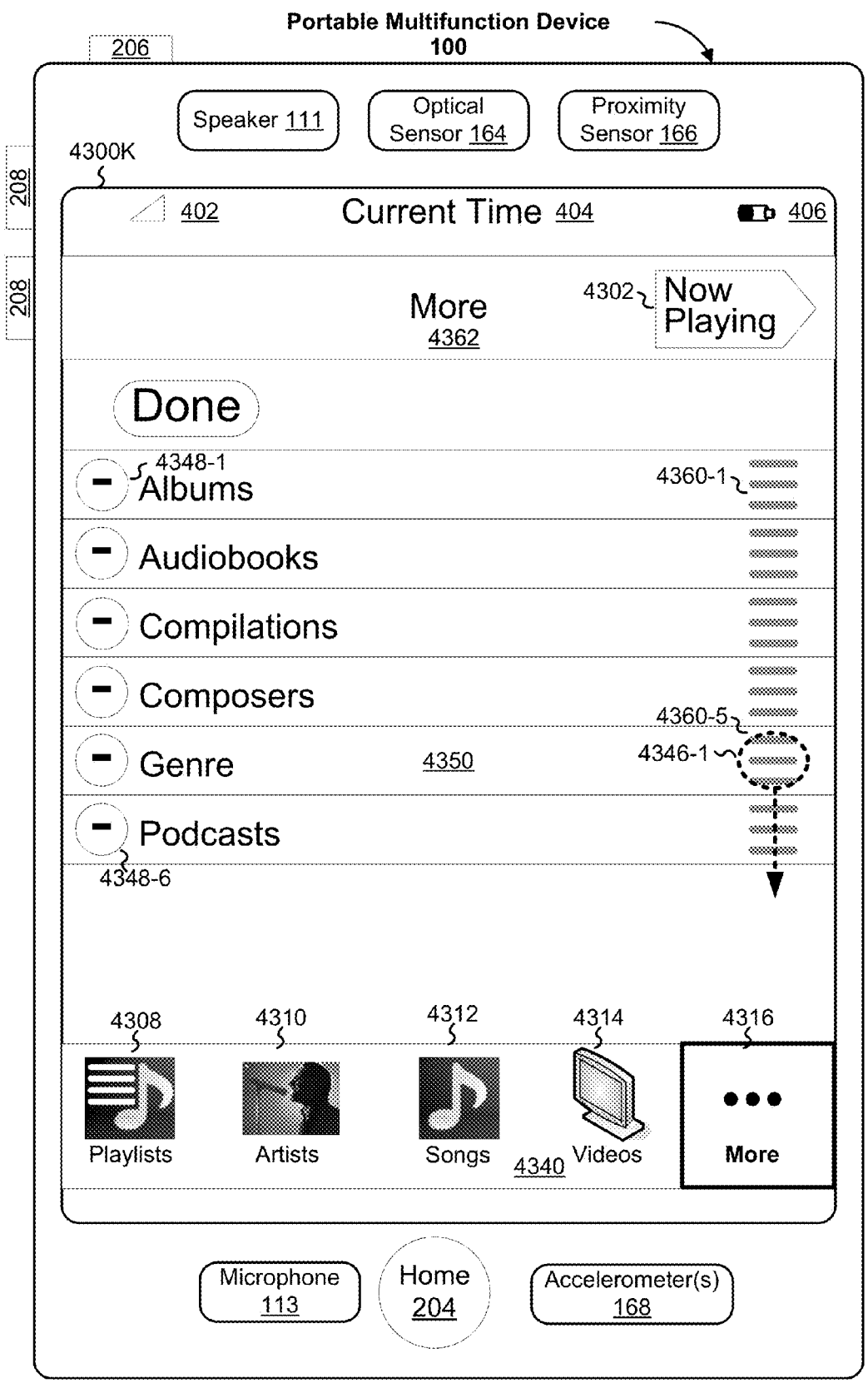

A finger-down event is detected at the first user interface object (503) (e.g., contact 4346-1, FIG. 8B). In some embodiments, the first user interface object includes a control icon (e.g., the horizontal bars comprising a moving affordance icon 4360 in genres icon 4350) and the finger-down event occurs at or near the control icon.

One or more finger-dragging events are detected on the touch screen display (505) (e.g., the finger drag from 4346-1 (FIG. 8B) to 4346-2 (FIG. 8C) to 4346-3 via 4365 (FIG. 8C)).

The first user interface object is moved on the touch screen display along a path determined by the finger-dragging events until the first user interface object at least in part overlaps the second user interface object (507).

Figure 8C:
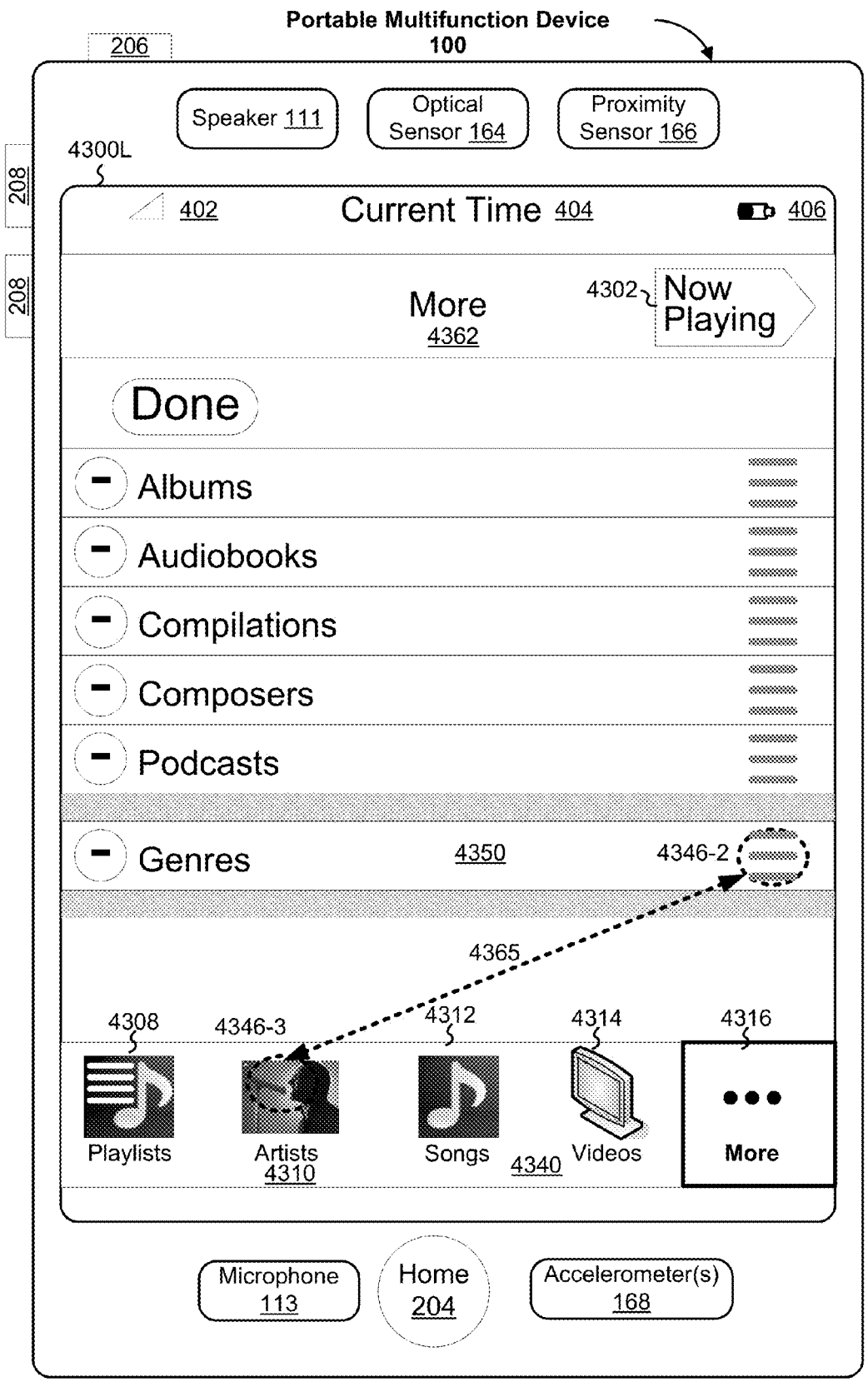

In some embodiments, while moving the first user interface object on the touch screen display, the first user interface object is displayed in a manner visually distinguishable from other user interface objects on the touch screen display (e.g., the shading around genres icon 4350 in FIG. 8C).

A finger-up event is detected at the second user interface object (509) (e.g., ending contact at 4346-3, FIG. 8C). The second user interface object (e.g., artists icon 4310, FIG. 8C) is visually replaced with the first user interface object (511) (e.g., genres icon 4350, FIG. 8D).

Figure 8D:

In some embodiments, in response to the finger-up event, the first user interface object is displayed at a location formerly occupied by the second user interface object, and a movement of the second user interface object to a location formerly occupied by the first user interface object is animated (e.g., in FIG. 8D, artists 4310 is now part of the list that used to include genres 4350).

In some embodiments, the first user interface object is displayed in a first form before the finger-up event and in a second form after the finger-up event, and the second form is visually different from the first form. In some embodiments, the first form is a row including characters and at least one control icon (e.g., 4350, FIG. 8B) and the second form is an image or other graphic (e.g., 4350, FIG. 8D).

In some embodiments, the second user interface object is displayed in a first form before the finger-up event and in a second form after the finger-up event, and the second form is visually different from the first form. In some embodiments, the first form is an image or other graphic (e.g., 4310, FIG. 8B) and the second form is a row (e.g., 4310, FIG. 8D) including characters associated with at least one control icon (e.g., 4360-2, FIG. 8D). In some embodiments, the second form is a row including characters near, or within a predefined distance, corresponding to a hit region for the control icon.

In some embodiments, the first user interface object is one of a group of candidate icons and the second user interface object is one of a group of user favorite icons. In some embodiments, the remaining group of candidate icons is rearranged after moving the first user interface object away from its original location. The remaining group of candidate icons is the group of candidate icons excluding the first user interface object. Upon detecting the finger-up event, the first user interface object is displayed at a location formerly occupied by the second user interface object and a movement of the second user interface object to a location formerly occupied by one of the remaining group of candidate icons is animated.

Figure 6:
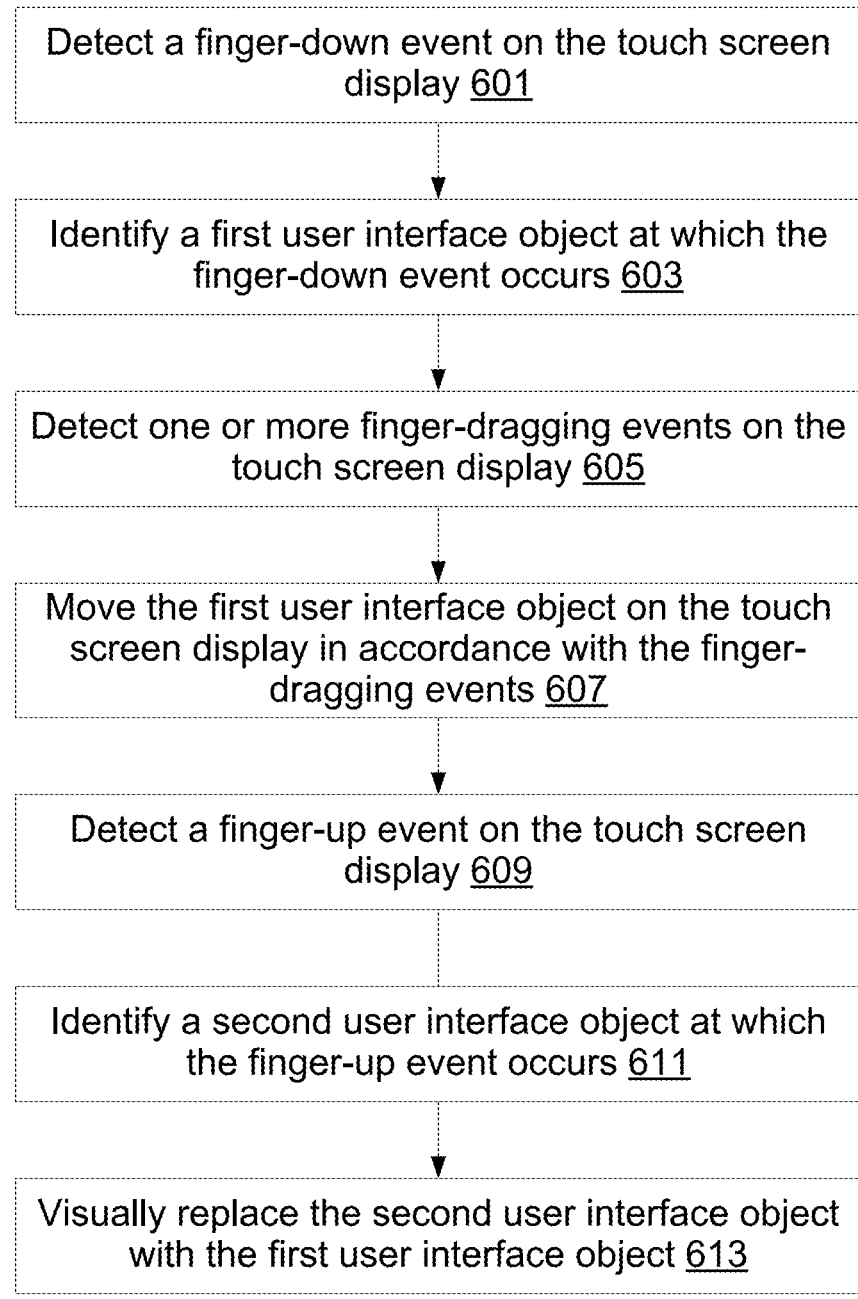
FIG. 6 is a flow diagram illustrating a second process for swapping first and second user interface objects in accordance with some embodiments.
Figure 8E:
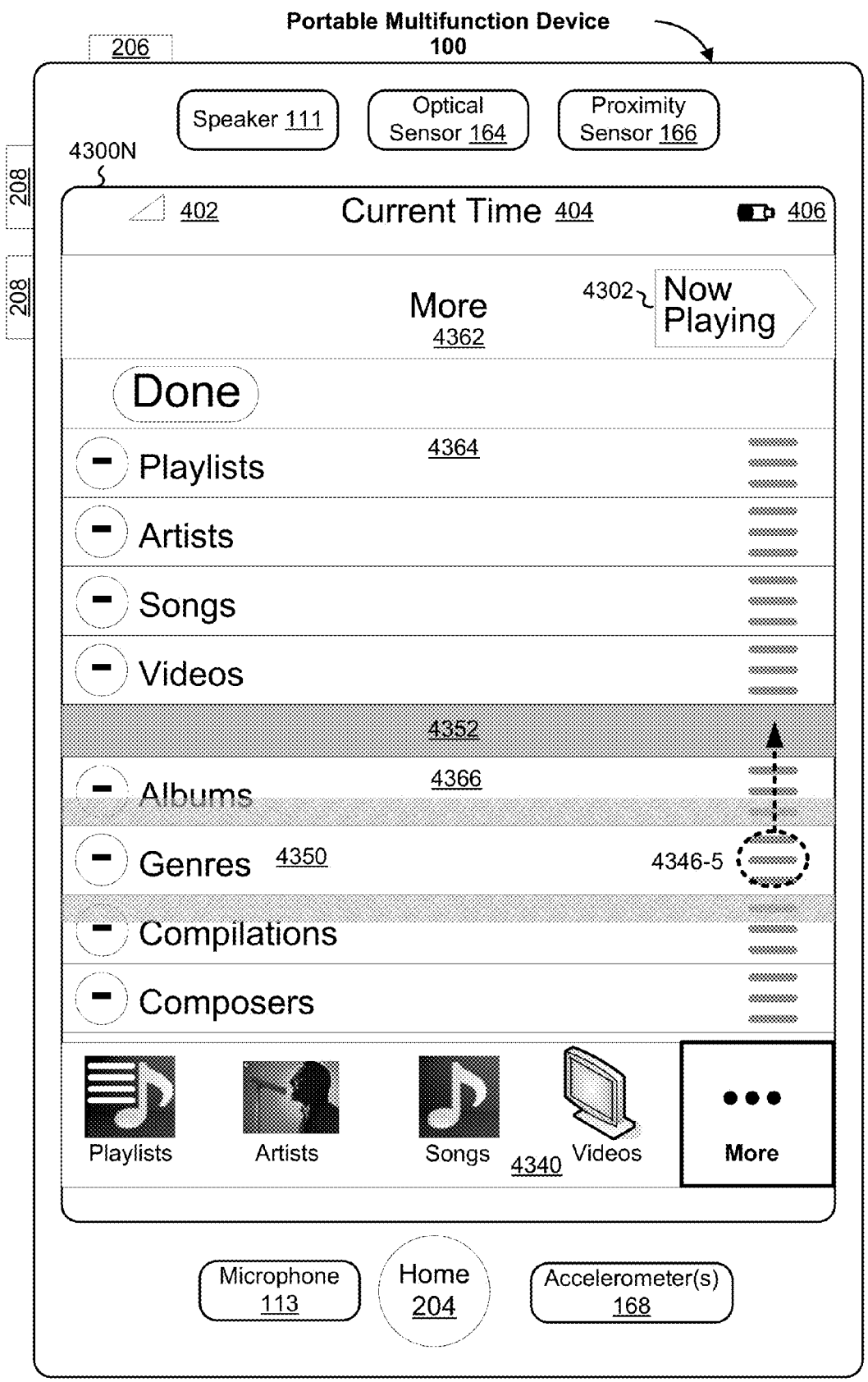
Figure 8F:
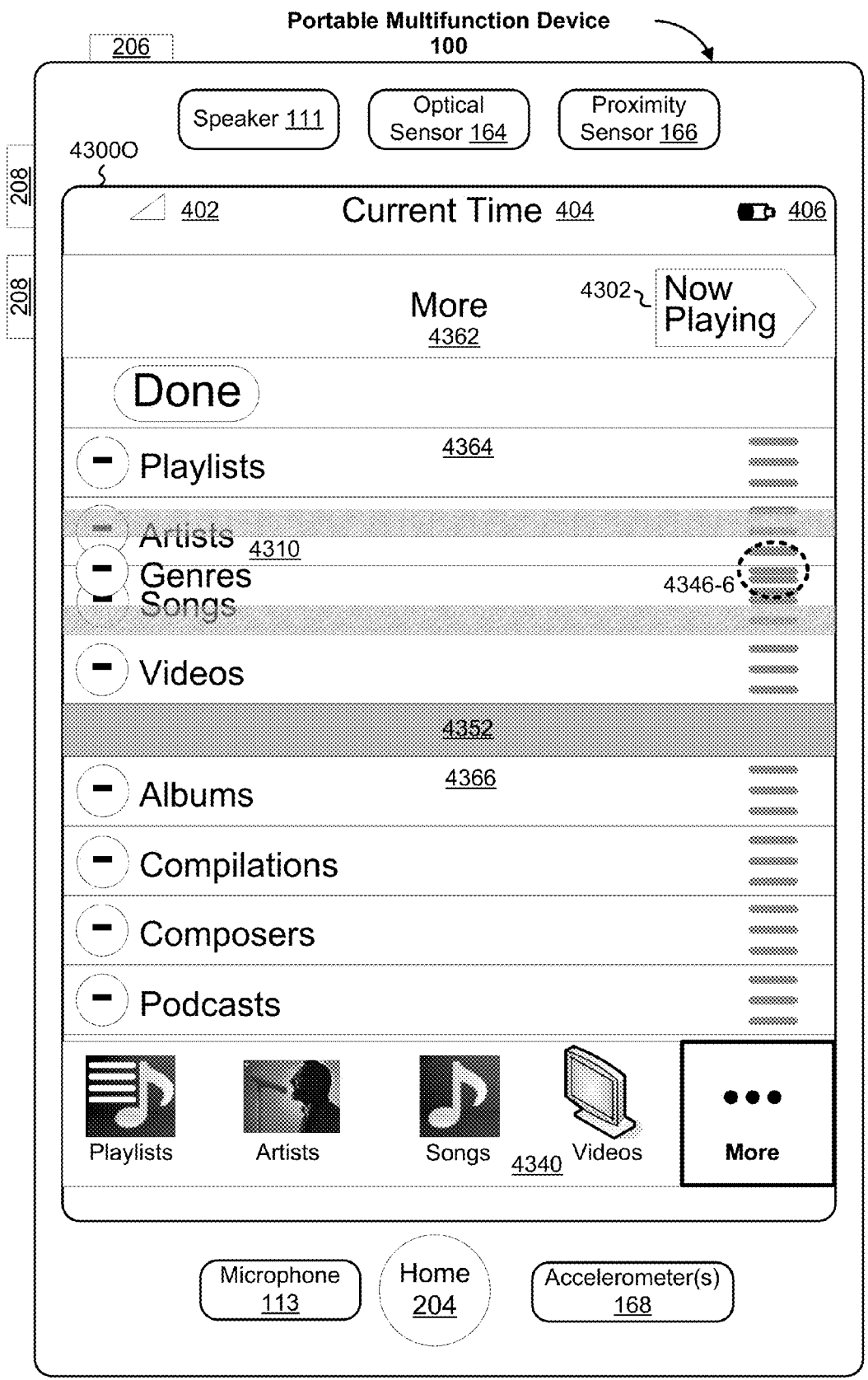
Figure 8G:
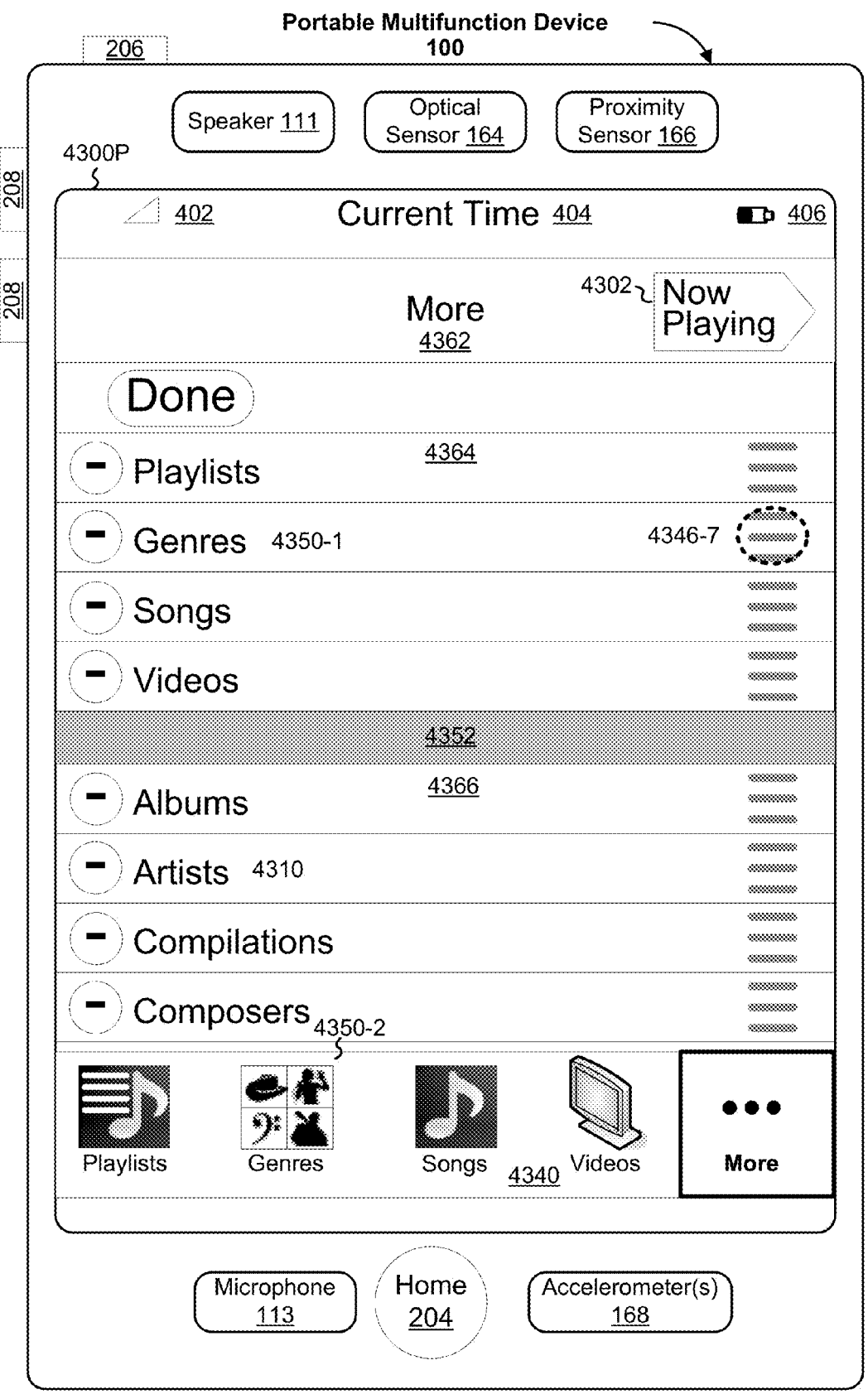

FIG. 6 is a flow diagram illustrating a second process for swapping first and second user interface objects in accordance with some embodiments. FIGS. 8E through 8G illustrate another way the major content categories that are displayed in the first area 4340 of the display can be rearranged by a user to correspond to the user's preferred (favorite) categories. The categories that are included in area 4340 may also be listed in a first list area 4364 in the more list 4362 (e.g., above separator 4352 in the more list 4362), with the candidate categories listed in a second list area 4366 in the more list 4362 (e.g., below separator 4352 in the more list 4362). Upon detection of a finger down event (601) (e.g., 4346-5, FIG. 8E), a first user interface object is identified at which the finger-down event occurs (603) (e.g., genres icon 4350). In response to one or more finger dragging events (605) (e.g., from 4346-5 to 4346-6 (FIG. 8F) to 4346-7 (FIG. 8G)), the first user interface object is moved on the touch screen display in accordance with the finger-dragging event (607). Upon detecting a finger up event (609) (e.g., at 4346-7), the portable device identifies a second user interface object at which the finger-up event occurs (611) and then visually replaces the second user interface object with the first user interface object (613) (e.g., artists icon 4310) in both the first list area 4364 and in area 4340 (e.g., 4350-1 and 4350-2, FIG. 8G), with the second user interface object moving to the second list area 4366 (e.g., 4310, FIG. 8G).

In some embodiments, a portable multifunction device displays a first group of user interface objects on the touch screen display (e.g., icons in the more list 4362, FIG. 8B, which are candidates for rearrangement). A second group of user interface objects is displayed on the touch screen display (e.g., icons in area 4340). A finger-down event is detected on the touch screen display (e.g., contact 4346-1, FIG. 8B). A first user interface object (e.g., genres icon 4350, FIG. 8B) in the first group at which the finger-down event occurs is identified. One or more finger-dragging events are detected on the touch screen display (e.g., the finger drag from 4346-1 (FIG. 8B) to 4346-2 (FIG. 8C) to 4346-3 via 4365 (FIG. 8C)). The first user interface object on the touch screen display is moved in accordance with the finger-dragging events. A finger-up event is detected on the touch screen display (e.g., ending contact at 4346-3, FIG. 8C). A second user interface object (e.g., artists icon 4310, FIG. 8B) in the second group at which the finger-up event occurs is identified. The second user interface object is visually replaced with the first user interface object (e.g., artists icon 4310 in FIG. 8C is visually replaced with genres icon 4350 in FIG. 8D).

Figure 7:
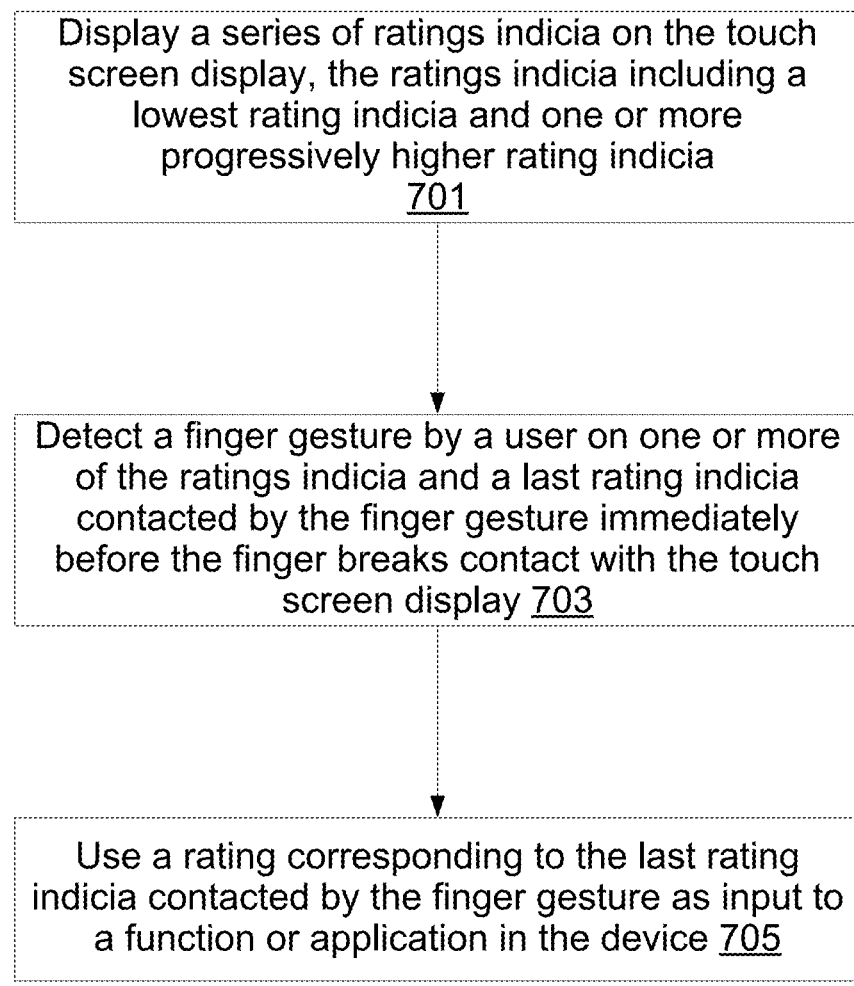
FIG. 7 is a flow diagram illustrating a third process for displaying a ratings icon using as input a finger swipe gesture on the touch screen display in accordance with some embodiments.
Figure 8H:
Figure 8I:

In some embodiments, the set of finger movements described above can be employed to represent a user's feedback on information or services provided by the portable device. FIG. 7 is a flow diagram illustrating a third process for displaying a ratings icon using as input a finger swipe gesture on the touch screen display in accordance with some embodiments. As illustrated in FIG. 8H and FIG. 8I, a user rating may be applied to an item of content with a finger gesture.

In some embodiments, a portable multifunction device displays a series of ratings indicia (e.g., 4382, FIGS. 8H and 8I) on a touch screen display (701). The ratings indicia comprise a lowest rating indicia and one or more progressively higher rating indicia. In some embodiments, the ratings indicia comprise stars (e.g., 4382-2, FIG. 8I). In some embodiments, the series of ratings indicia consists of five stars.

A finger gesture (e.g., 4384, FIG. 8I) by a user is detected on one or more of the ratings indicia (703). The finger gesture contacts a last rating indicia immediately prior to breaking contact with the touch screen display (e.g., the third rating indicia in FIG. 8I). In some embodiments, the finger gesture contacts the lowest rating indicia prior to contacting one or more of the progressively higher rating indicia. In some embodiments, the finger gesture is a swipe gesture.

A rating corresponding to the last rating indicia contacted by the finger gesture is used as input to a function or application in the device (705). For example, the three-star rating for the song "Come Together" in FIG. 8I may be used to sort this content versus other content in the device and/or to determine how often this content is heard when content is played in a random order.

In some embodiments, the rating corresponding to the last rating indicia contacted by the finger gesture is used to give a rating for an item of content that is playable with a content player application on the device. In some embodiments, the item of content is an item of music and the content player application is a music player application. In some embodiments, the item of content is a video and the content player application is a video player application.

In some embodiments, the rating corresponding to the last rating indicia contacted by the finger gesture is used to give a rating for content on a web page that is viewable with a browser application on the device.

A graphical user interface on a portable multifunction device with a touch screen display comprises a series of ratings indicia 4382 on the touch screen display. The ratings indicia comprise a lowest rating indicia and one or more progressively higher rating indicia. In response to detecting a finger gesture by a user on one or more of the ratings indicia, wherein the finger gesture contacts a last rating indicia immediately prior to breaking contact with the touch screen display, a rating corresponding to the last rating indicia contacted by the finger gesture is used as input to a function or an application in the device.

Figure 9A:
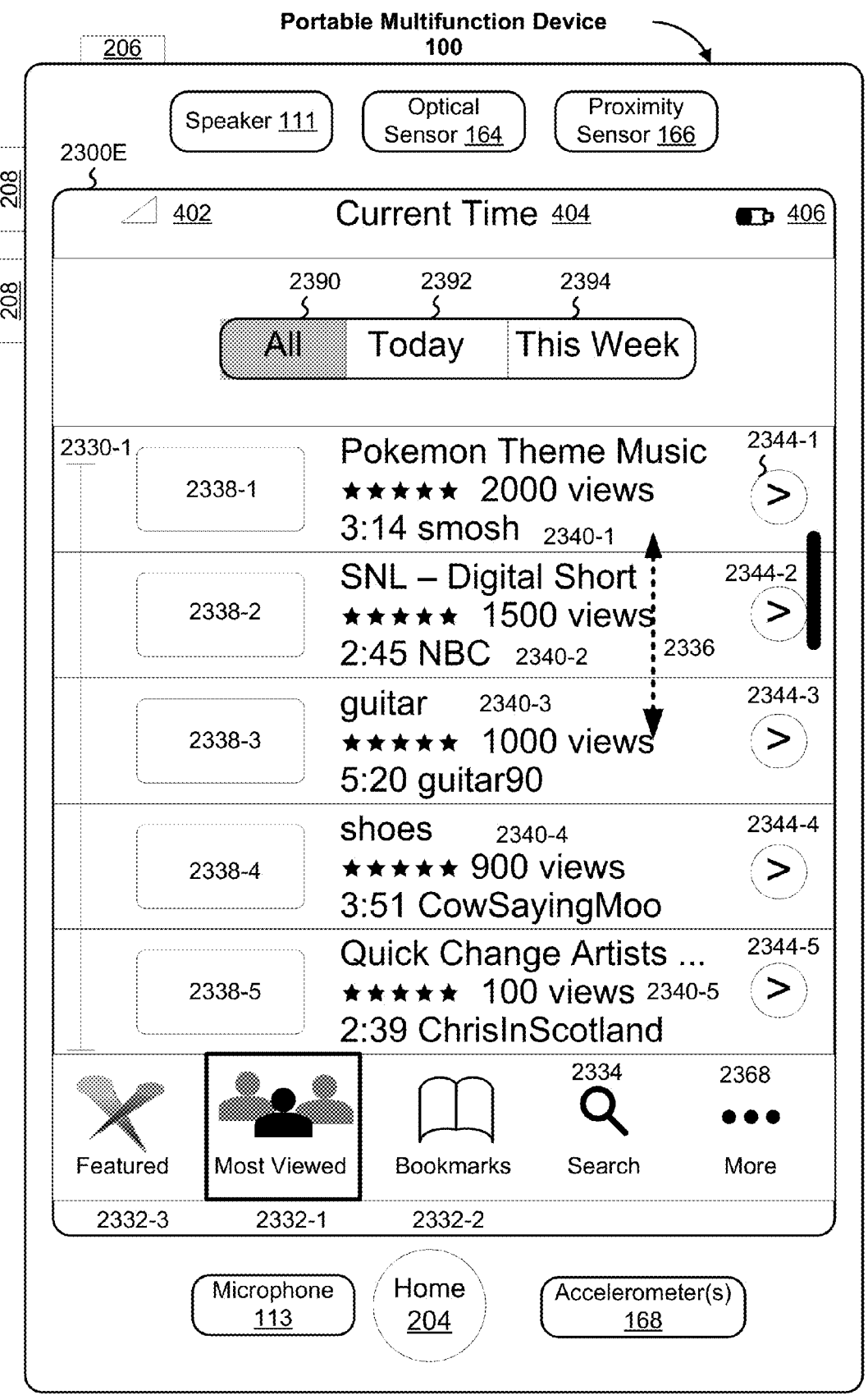
FIGS. 9A-9P illustrate exemplary user interfaces for an online video application for a portable multifunction device in accordance with some embodiments.
Figure 9B:
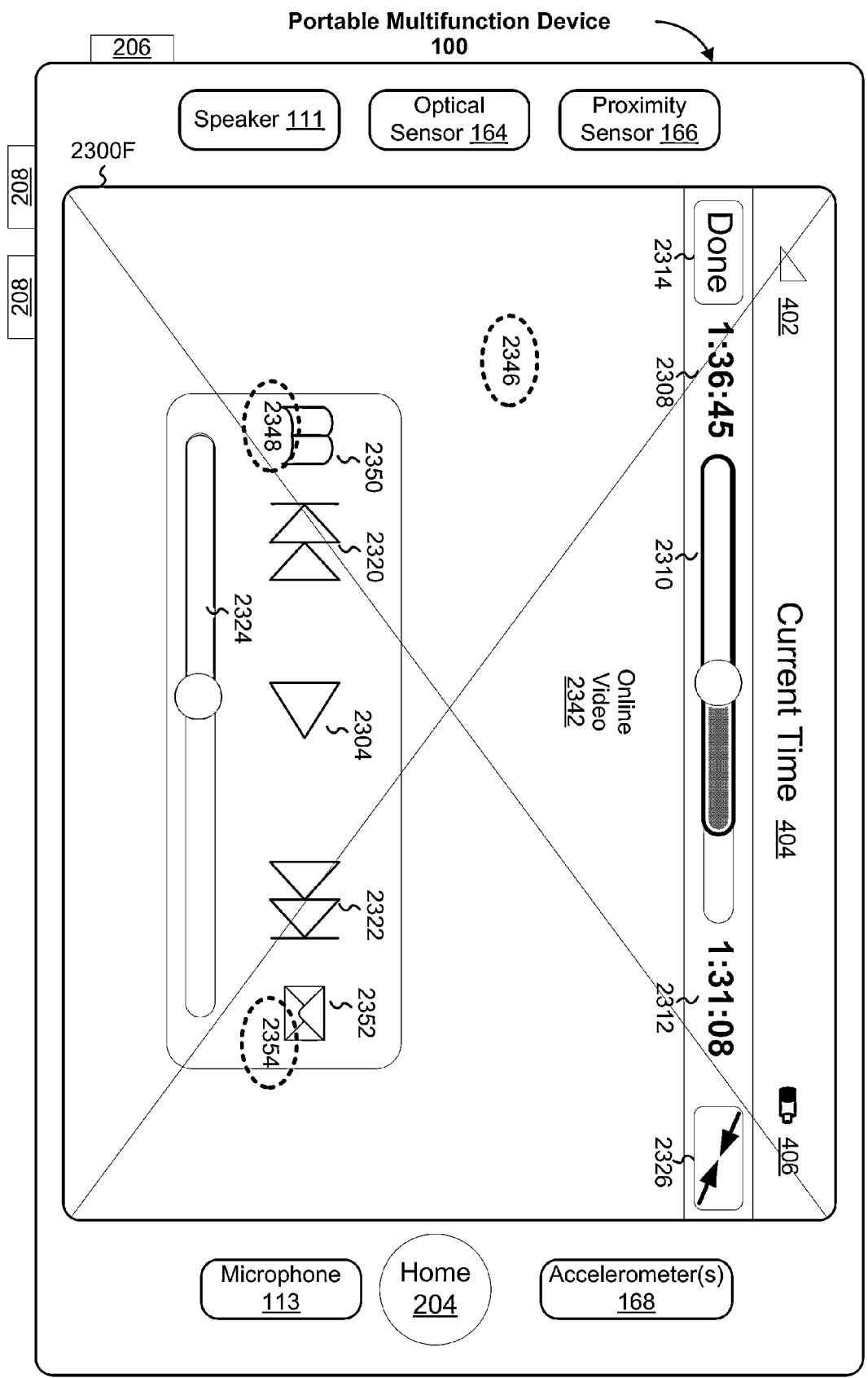
Figure 9C:
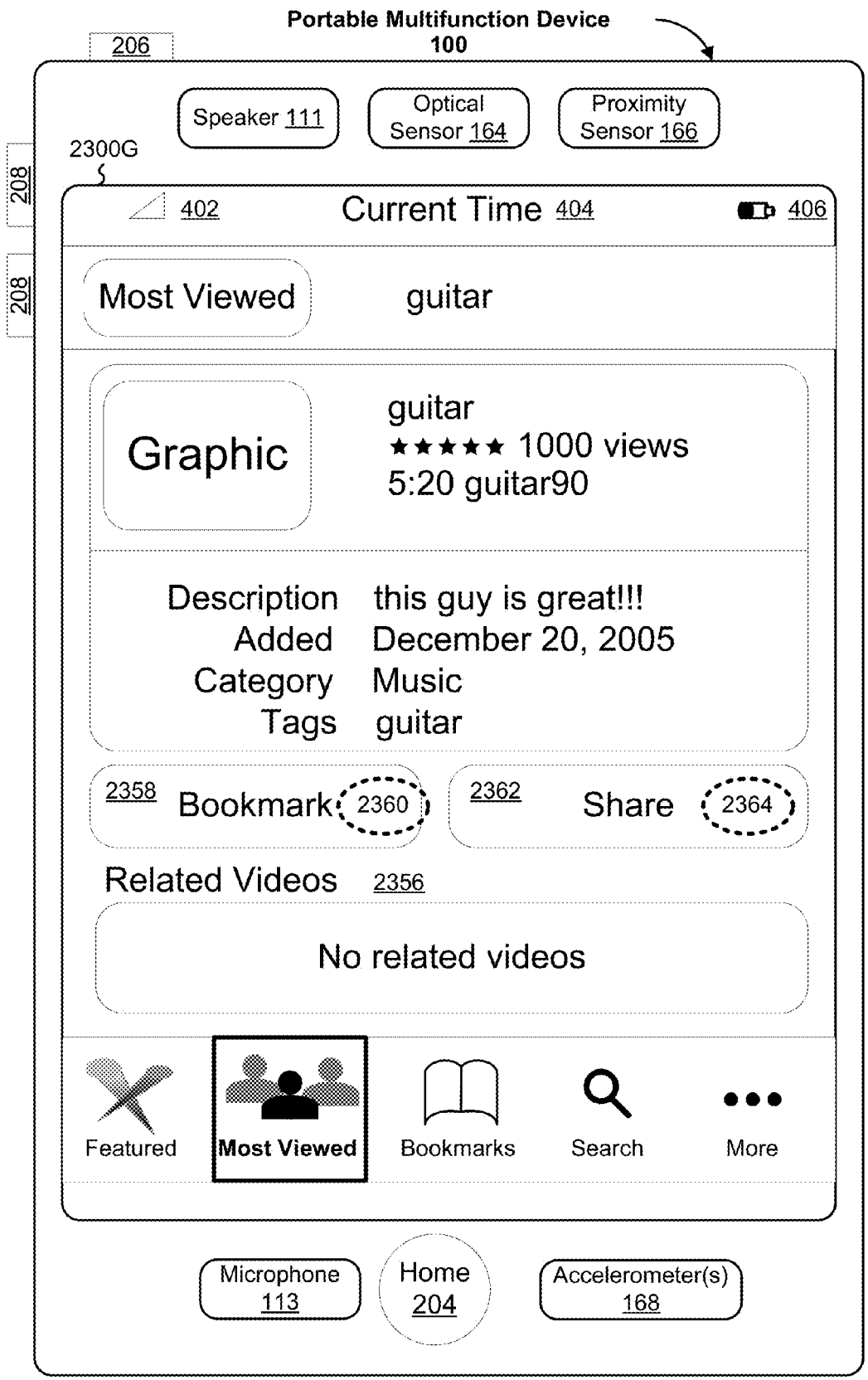
Figure 9D:
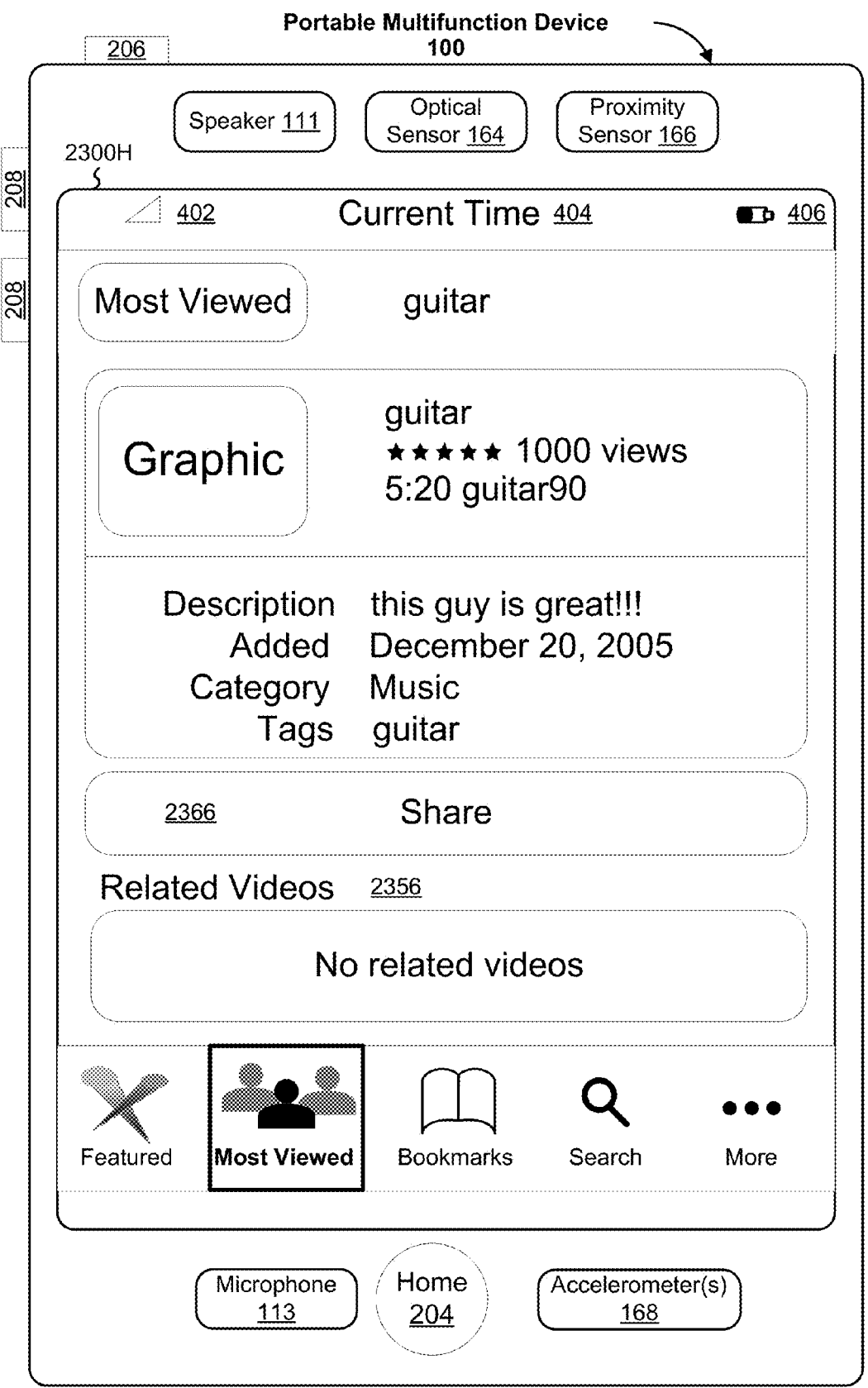
Figure 9E:
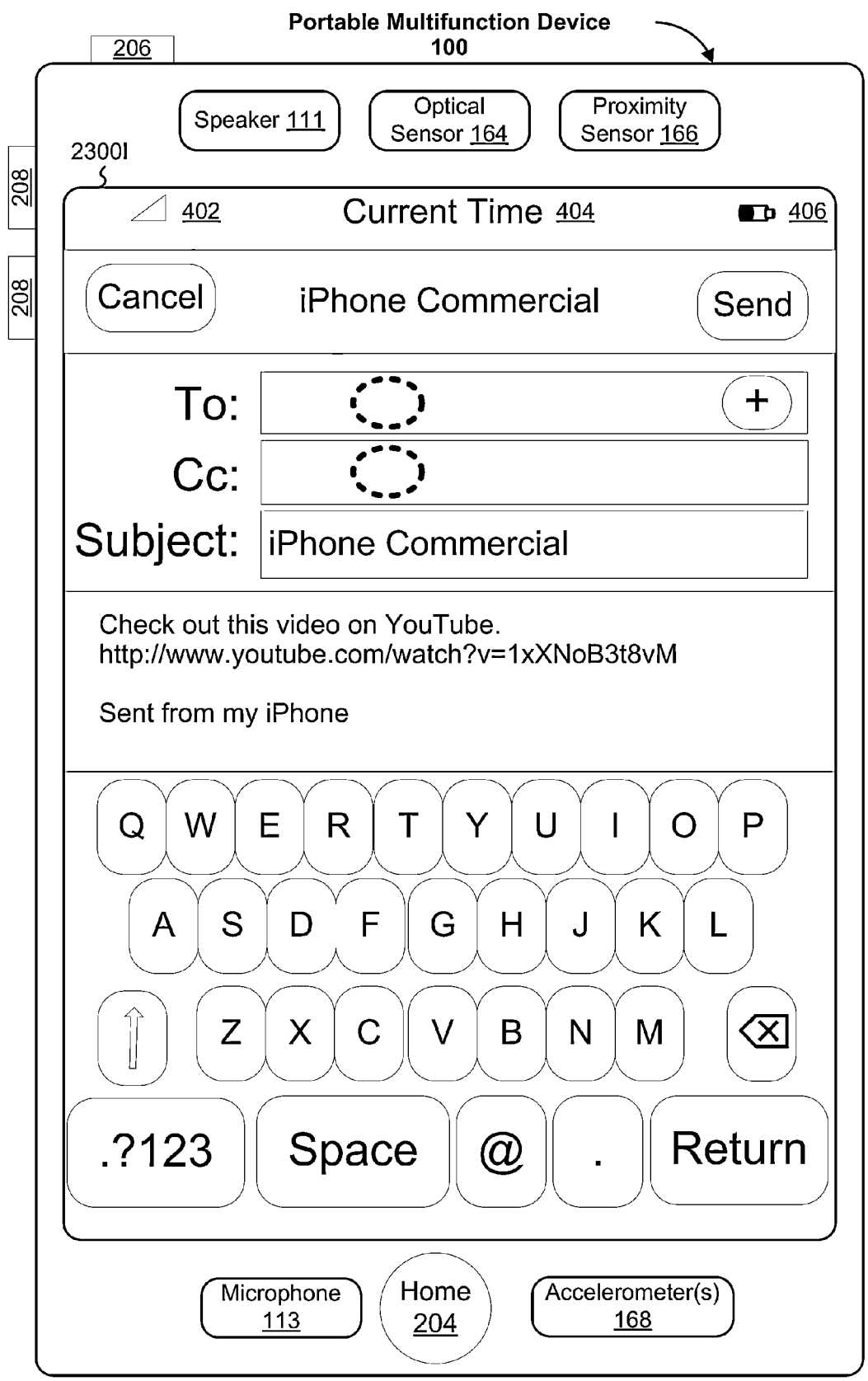
Figure 9F:
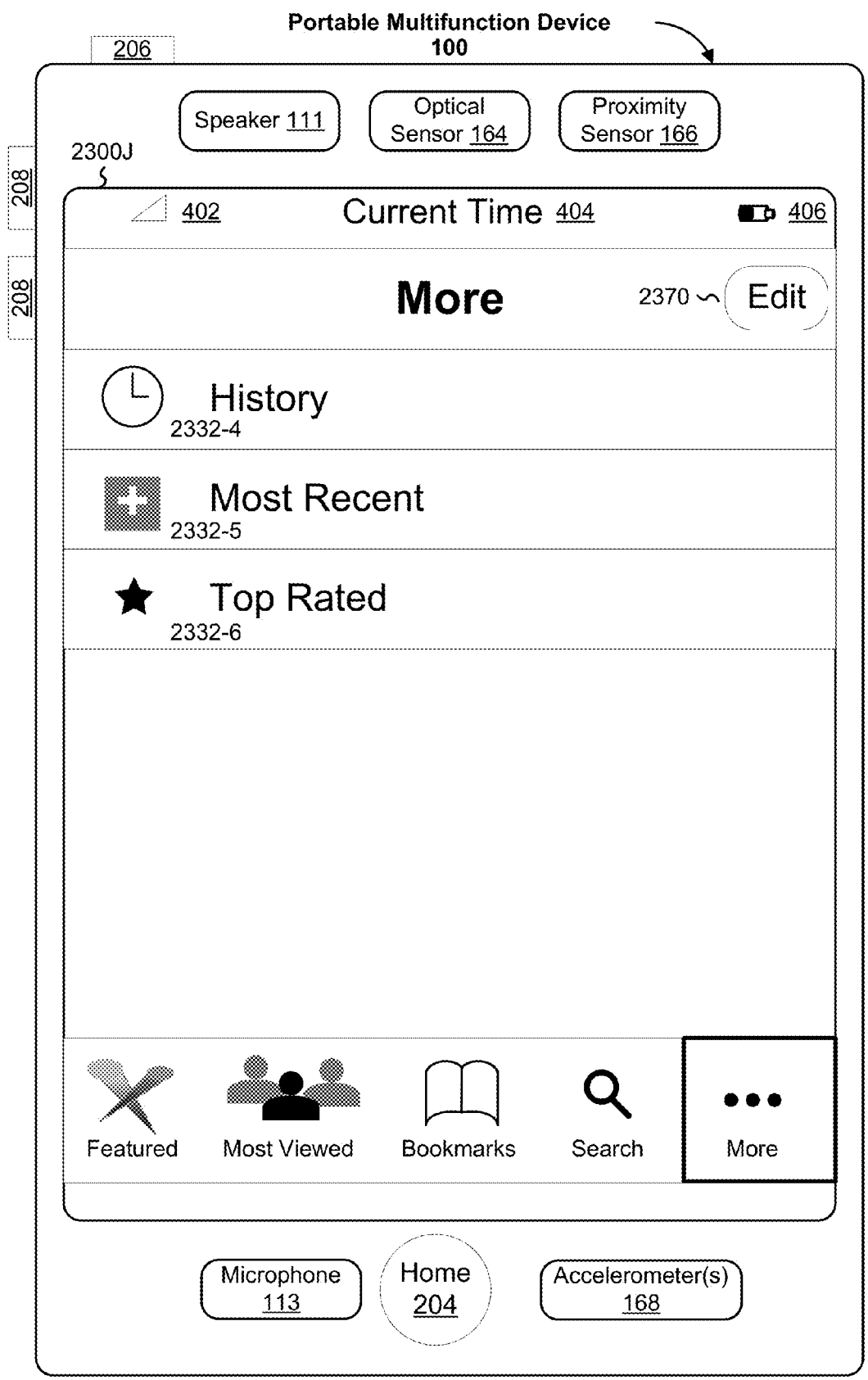
Figure 9G:
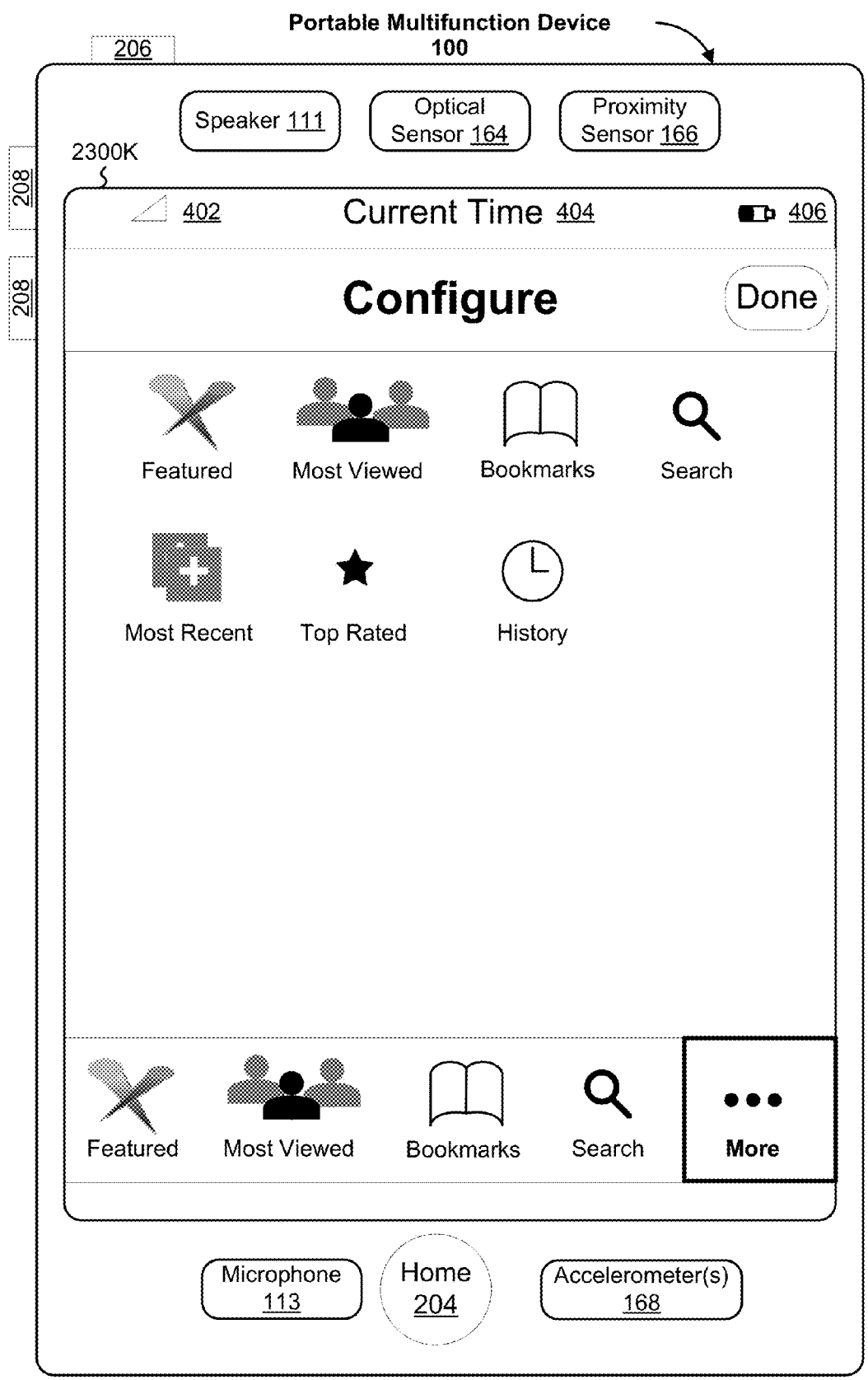
Figure 9H:
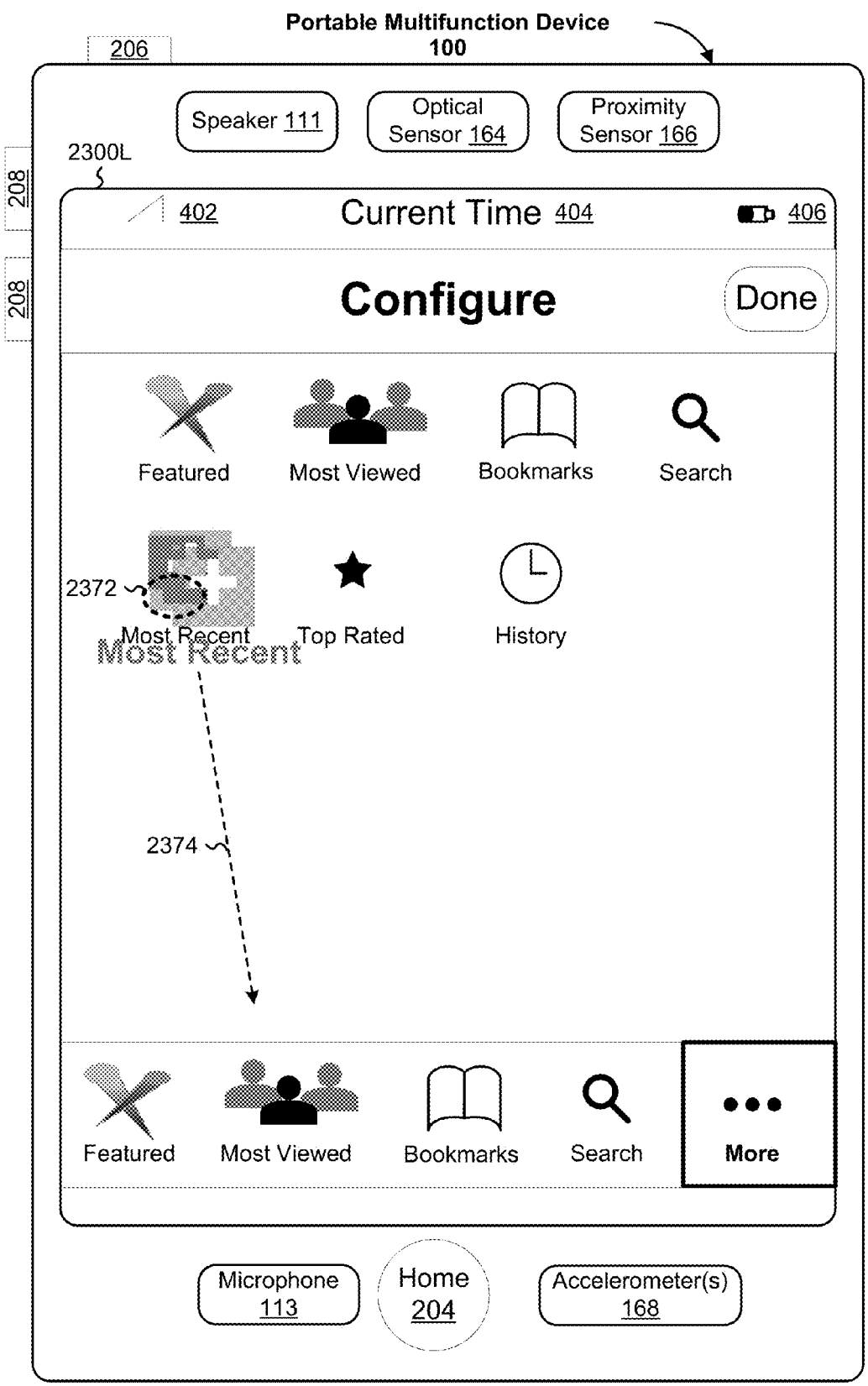
Figure 9I:
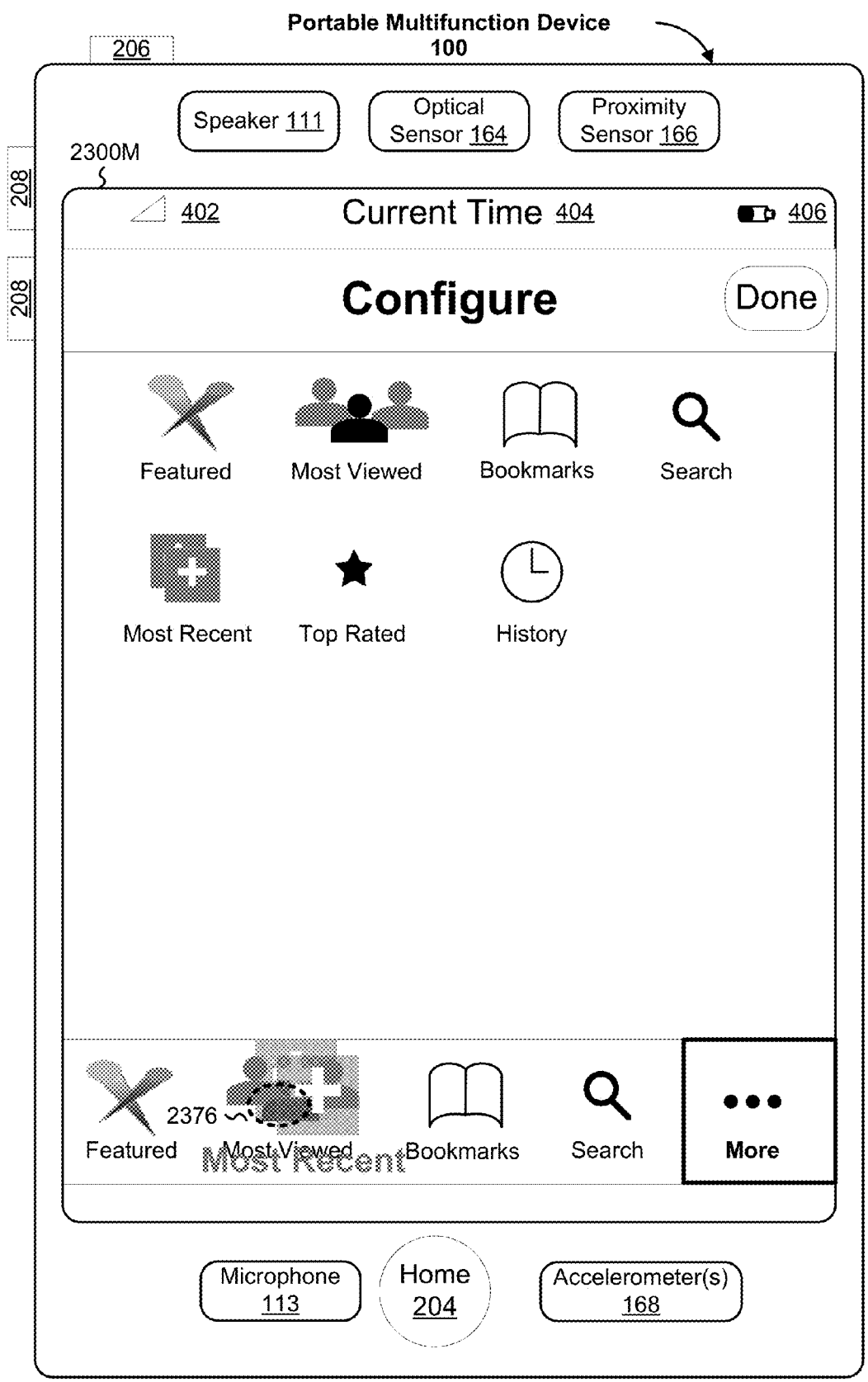
Figure 9J:
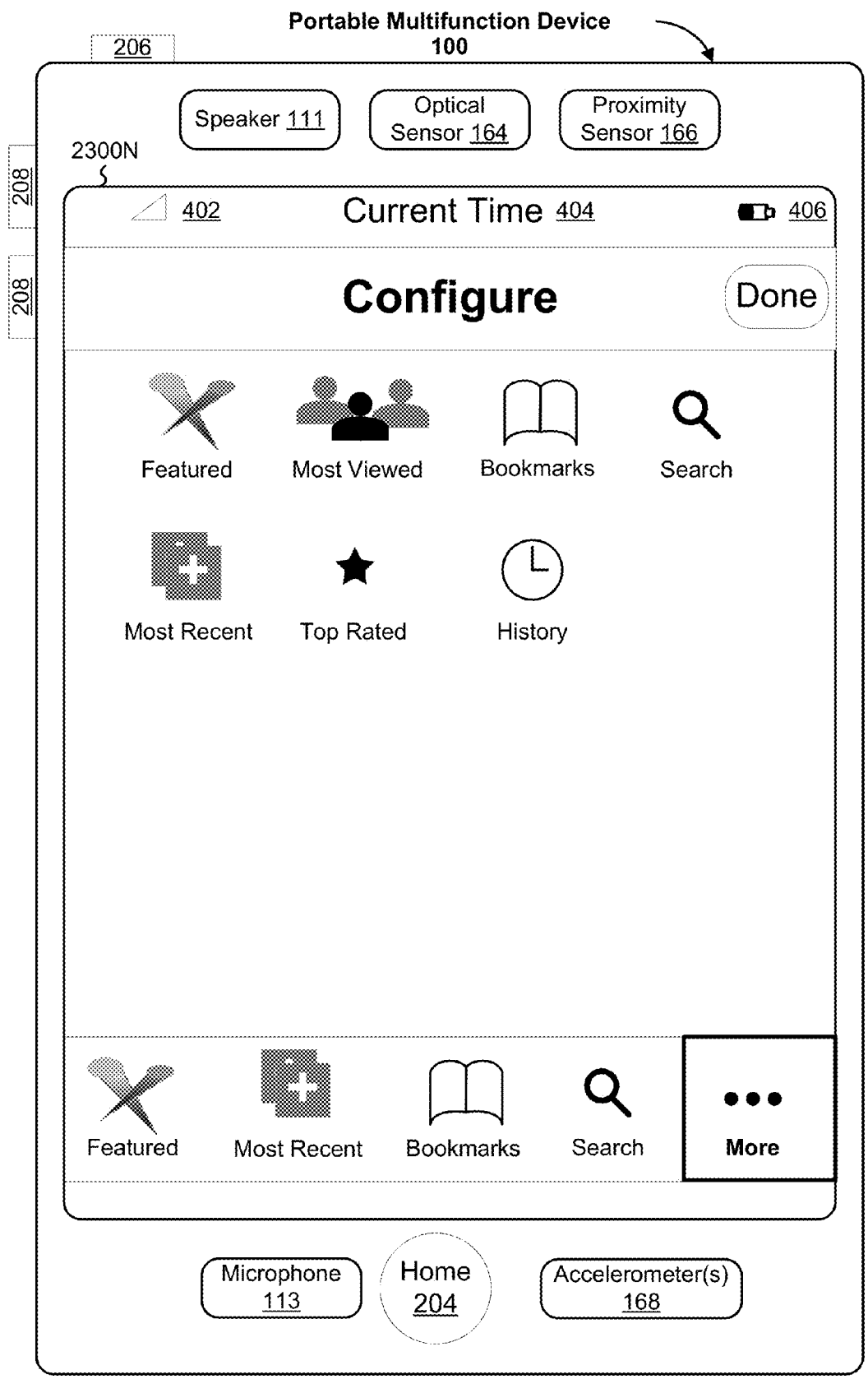
Figure 9K:
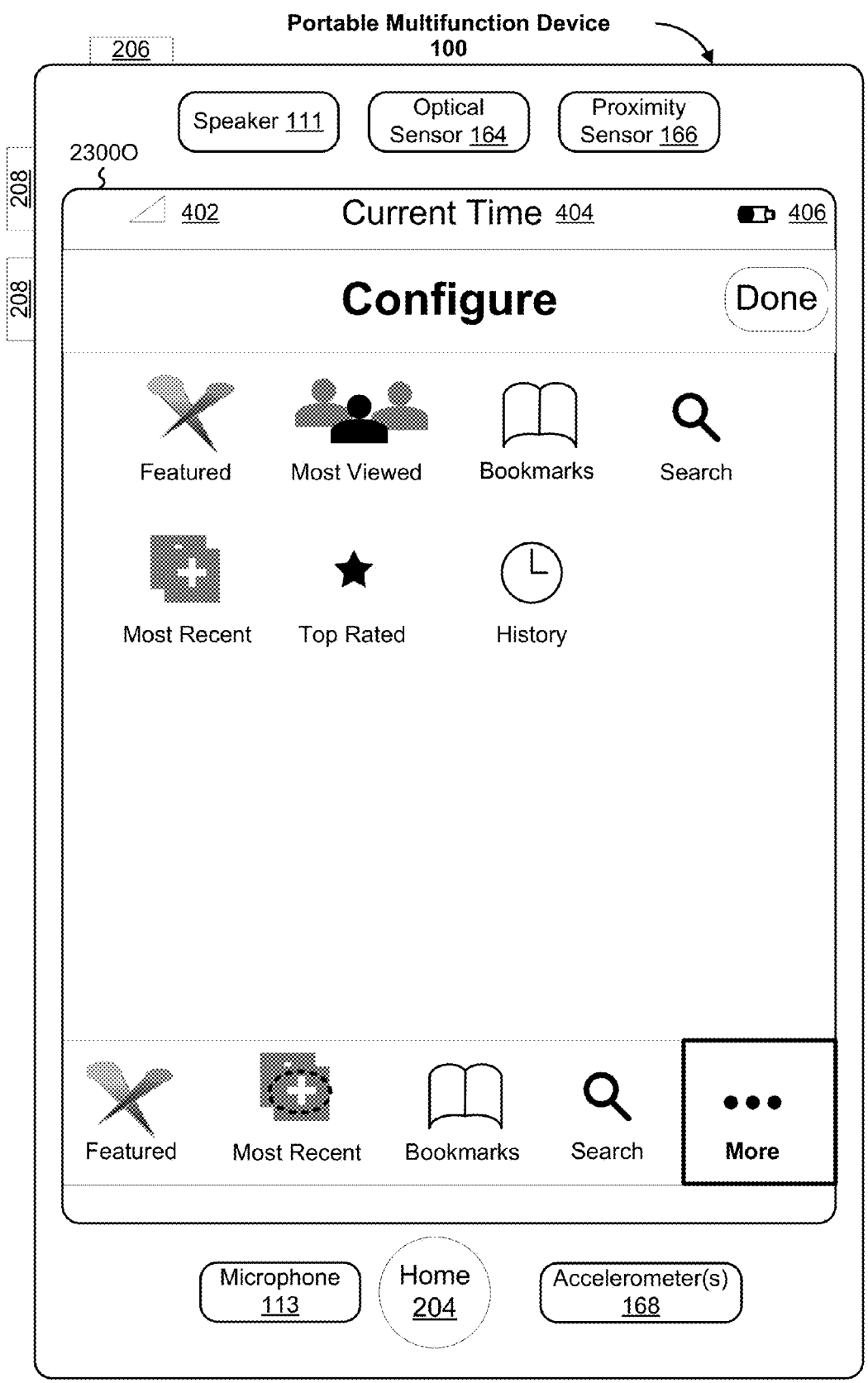
Figure 9L:
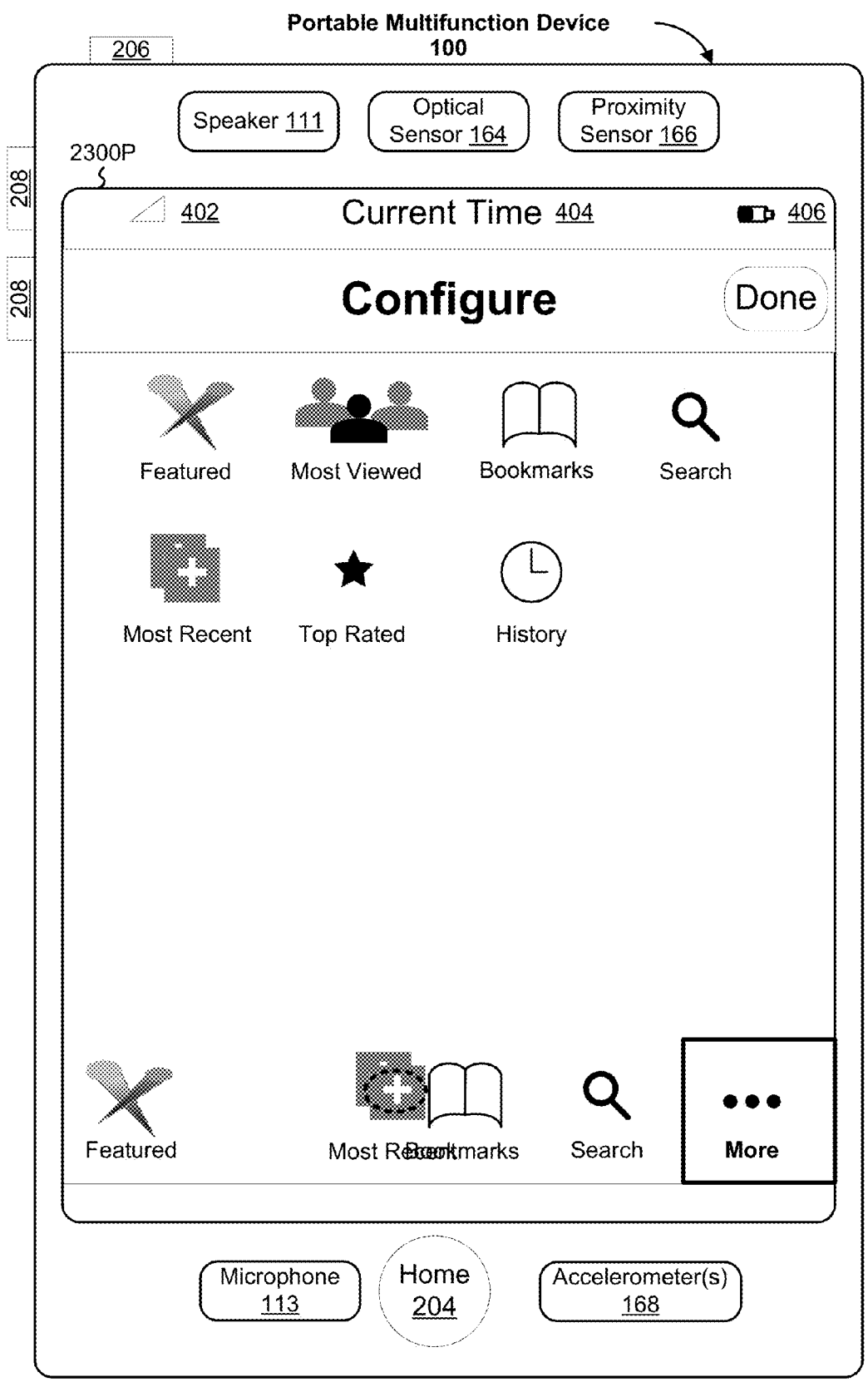
Figure 9M:
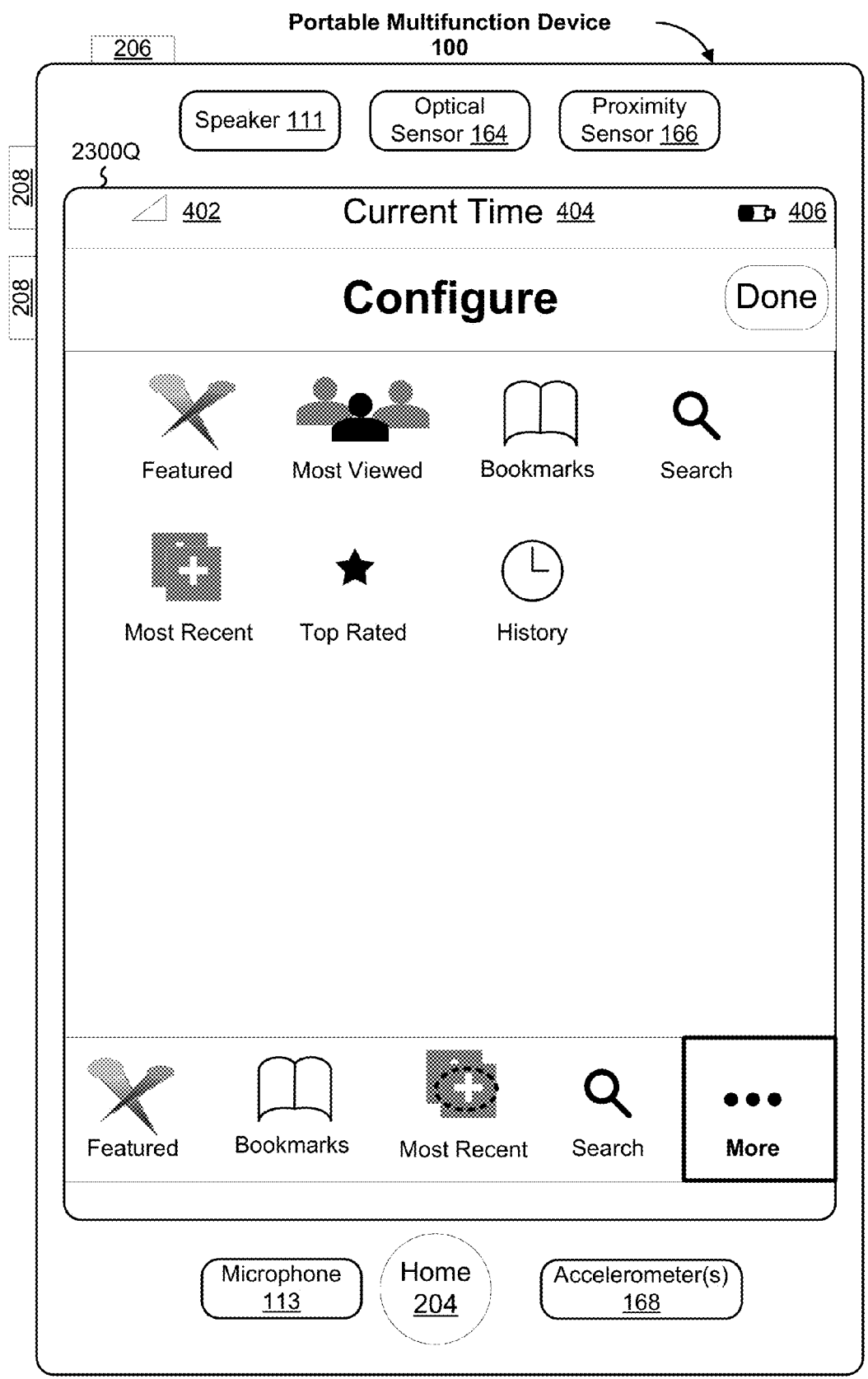
Figure 9N:
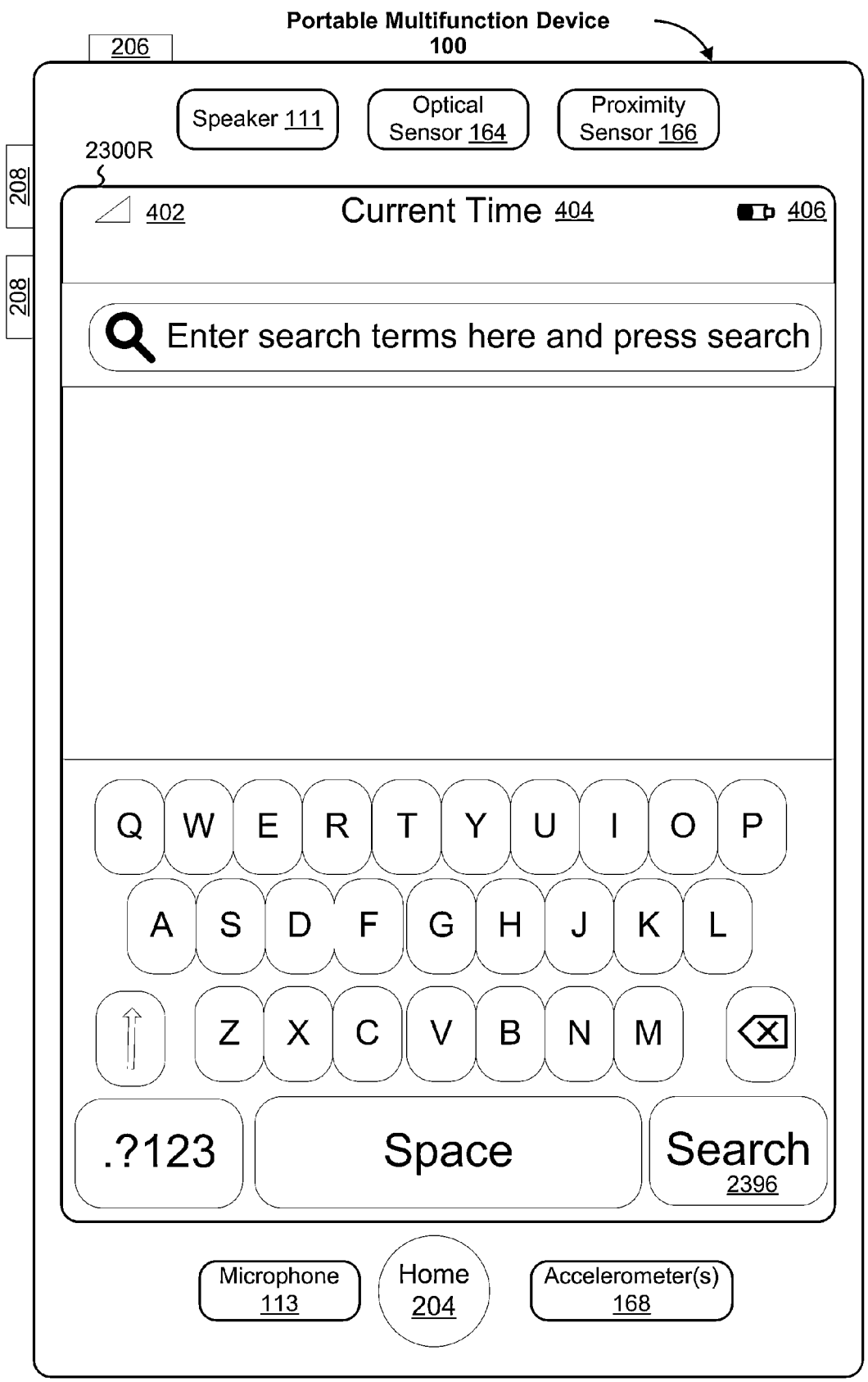
Figure 9O:
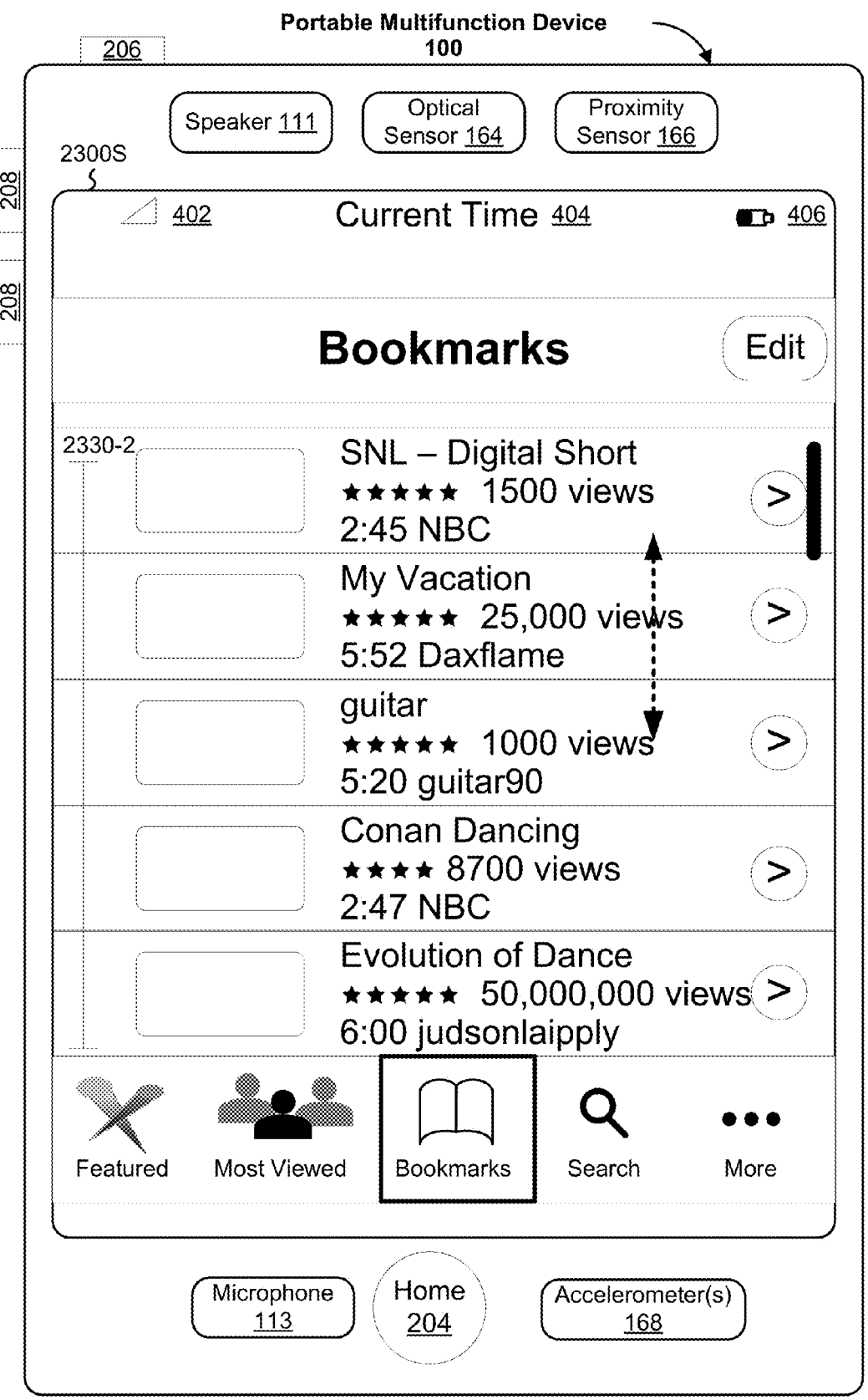
Figure 9P:
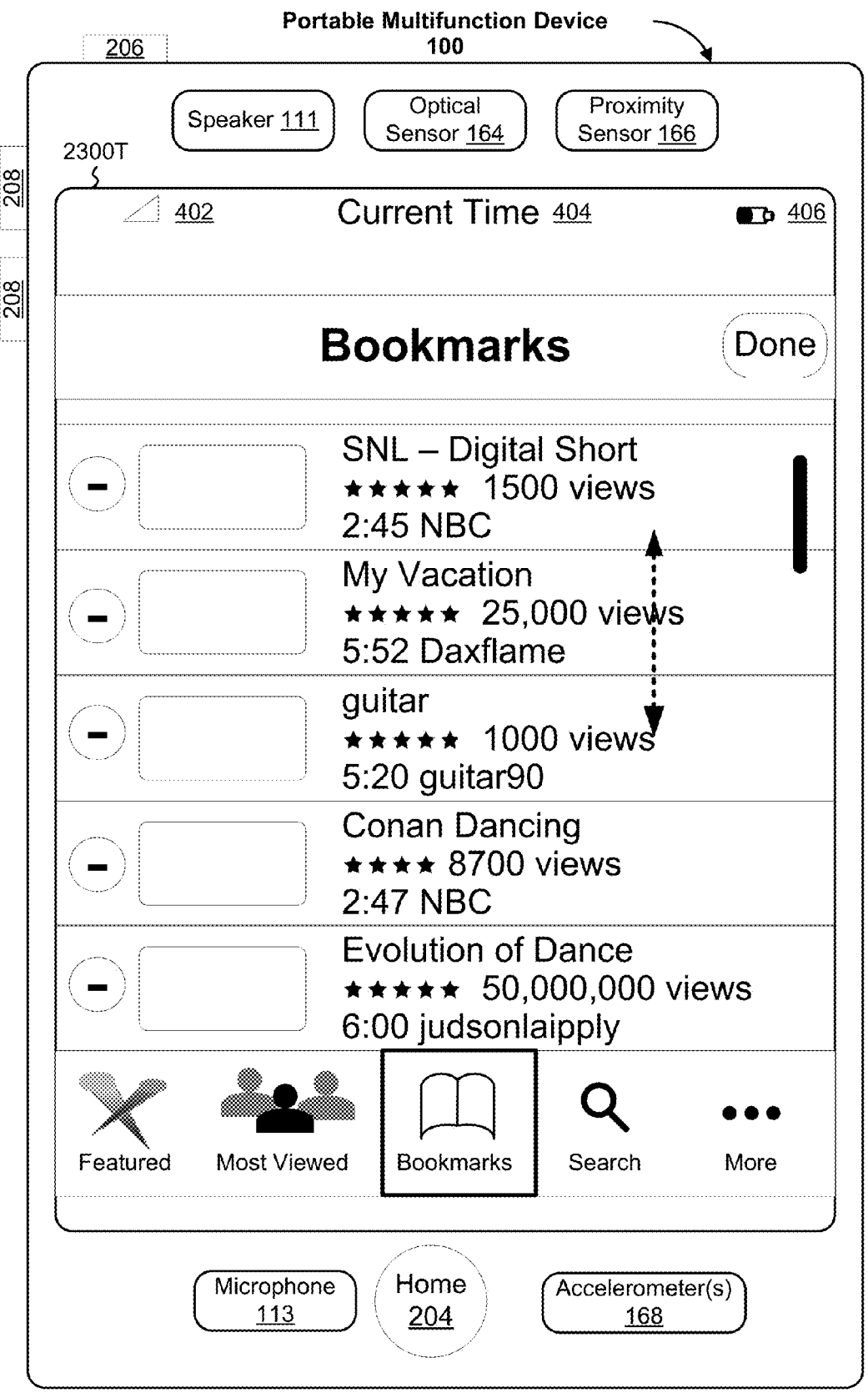

FIGS. 9A-9P illustrate exemplary user interfaces for an online video application for a portable multifunction device in accordance with some embodiments.

In some embodiments, a computer-implemented method is performed at a portable electronic device (e.g., 100) with a touch screen display 112.

The device displays a first list 2330-1 (FIG. 9A) of information about online video items in a plurality of lists 2330 of information about online video items. In some embodiments, the plurality of lists of information about online video items include at least two of: a list of information about featured content items (e.g., videos featured by the online video website), a list of information about most recently added content items (e.g., videos most recently added to the online video website), a list of information about most viewed content items (e.g., videos most viewed by other users of the online video website, 2330-1, FIG. 9A), a list of information about top rated content items (e.g., videos rated by other users of the online video website), a list of information about content items bookmarked by a user of the computing device (e.g., bookmark list 2330-2, FIG. 9O), and a list of information about content items viewed by a user of the computing device (e.g., a list with a history of the video played by the user). In some embodiments, a respective list 2330 of information about online video items is displayed in a portrait orientation of the touch screen display. In some embodiments, in response to activation of a time window icon (e.g., all 2390, today 2392, or this week 2394 icons in FIG. 9A) a respective list may be chosen to correspond to a specific time period.

The device displays a plurality of icons (e.g., 2332-1, 2332-2, and 2332-3, FIG. 9A) corresponding to at least some of the plurality of lists of information about online video items. The plurality of icons are displayed at the same time as a list of information about online video items (e.g., list 2330-1, FIG. 9A).

In some embodiments, the device displays a search icon 2334 that when activated initiates the display of a user interface 2300R (FIG. 9N) for searching for online video items.

In response to detecting a moving finger gesture 2336 on the first list of information about content items, the device scrolls the first list of information about content items.

In response to detecting a stationary finger contact on a first portion 2338 of a row 2340 in the first list of information about online video items, wherein the row contains information about a particular online video item, the device: initiates a request for the particular online video item 2342 from a remote computer (e.g., an online video server for a web site such as www.youtube.com), receives the particular online video item 2342, and plays the particular online video item 2342 (FIG. 9B). In some embodiments, the first portion 2338 of a row includes anywhere in the row except a second portion of the row, such as additional information icon 2344.

In some embodiments, the row 2340 has a width, the touch screen 112 has a width and the width of the row is substantially the same as the width of the touch screen display (e.g., at least 90% of the width of the touch screen display). In some embodiments, the touch screen display 112 has an area and the particular online video item 2342 uses substantially all (e.g., at least 90%) of the touch screen display area when the particular online video item is played. In some embodiments, the particular online video item 2342 is played in a landscape orientation of the touch screen display (FIG. 9B).

In some embodiments, in response to detecting a finger contact 2346 (FIG. 9B) on the touch screen display while the particular online video item 2342 is playing, the device displays one or more playback controls. In some embodiments, the one or more playback controls comprise a play icon 2304, a pause icon (not shown, which may toggle with the play icon 2304), a sound volume icon 2324, and/or a playback progress bar icon 2310. In some embodiments, displaying one or more playback controls comprises displaying one or more playback controls on top of the particular online video item 2342 (e.g., a semi-transparent "heads-up display", as illustrated in FIG. 9B).

In some embodiments, while playing the particular online video item 2342, the device ceases to display the one or more playback controls. In some embodiments, ceasing to display the one or more playback controls comprises fading out the one or more playback controls. In some embodiments, the display of the one or more playback controls is ceased after a predetermined time. In some embodiments, the display of the one or more playback controls is ceased after no contact is detected with the touch screen display for a predetermined time.

In some embodiments, in response to detecting a finger contact 2346 on the touch screen display while the particular online video item is playing, the device displays a bookmark icon 2350 that, if activated by another finger contact 2348, bookmarks the particular online video item 2342 (or initiates a process for creating a bookmark for the item).

In some embodiments, in response to detecting a finger contact 2346 on the touch screen display while the particular online video item is playing, the device displays a sharing icon 2352 that, if activated by another finger contact 2354, initiates creation of an electronic message to another user that includes a link to the particular online video item. In some embodiments, in response to detecting a finger contact 2346 on the touch screen display while the particular online video item is playing, the device displays a sharing icon 2352 that, if activated by another finger contact 2354, initiates creation of an electronic message to another user that includes an online address (e.g., a URL such as "http://www.youtube.com/watch?v=1xXNoB3t8vM" in FIG. 9E) for the particular online video item. In some embodiments, the electronic message is an email (FIG. 9E). In some embodiments, the electronic message is an instant message, such as an SMS message.

In response to detecting a finger contact on a respective icon (e.g., icon 2332-1, FIG. 9A or 2332-2, FIG. 9A) in the plurality of icons, the device displays a corresponding list (e.g., 2330-1, FIG. 9A or 2330-2, FIG. 9O, respectively) of information about online video items.

In some embodiments, in response to detecting a finger contact on a second portion of the row in the first list of information about online video items (e.g., a contact on icon 2344-3, FIG. 9A), the device displays additional information about the particular online video item (e.g., UI 2300G, FIG. 9C). The second portion (e.g., icon 2344) of the row is different from the first portion 2338 of the row (e.g., anywhere else in the row 2340 besides icon 2344). In some embodiments, the additional information about the particular online video item includes information about related online video items 2356. In some embodiments, in response to detecting a finger contact on the second portion of the row, the device displays a bookmark icon 2358 that, if activated by another finger contact 2360, bookmarks the particular online video item (or initiates a process for creating a bookmark). In some embodiments, in response to detecting a finger contact on the second portion of the row, the device displays a sharing icon 2362 that, if activated by another finger contact 2364, initiates creation of an electronic message to another user that includes a link to (or an online address for) the particular online video item (FIG. 9E). In some embodiments, in response to detecting a finger contact on the second portion of the row, the device: (a) displays a bookmark icon 2358 and a sharing icon 2362 if the particular online video item is not bookmarked (FIG. 9C), and (b) displays an enlarged sharing icon 2366 (FIG. 9D) without the bookmark icon if the particular online video item is already bookmarked (FIG. 9D).

In some embodiments, the device displays an icon 2368 that when activated initiates the display of: (a) icons corresponding to at least some of the plurality of lists of information about online video items (e.g., 2332-4, 2332-5, 2332-6, FIG. 9F), and (b) a configuration icon (e.g., Edit icon 2370, FIG. 9F) that when activated initiates the display of a user interface 2300K (FIG. 9G) for configuring which icons corresponding to at least some of the plurality of lists are displayed with the first list of information. In some embodiments, after detecting a gesture on the configuration icon 2370, the device: detects a finger-down event 2372 at a first icon in a plurality of icons; detects one or more finger-dragging events 2374 on the touch screen display; moves the first icon on the touch screen display along a path determined by the finger-dragging events until the first icon at least in part overlaps a second icon in the plurality of icons (e.g., in FIG. 9I, "Most Recent" icon partially overlaps "Most Viewed" icon); detects a finger-up event 2376 at the second icon; and visually replaces the second icon with the first icon (e.g., in FIG. 9J, "Most Recent" icon visually replaces the "Most Viewed" icon in FIG. 9I). In some embodiments, while moving the first icon on the touch screen display, the device displays the first icon in a manner visually distinguishable from other icons on the touch screen display (e.g., the "Most Recent" icon is enlarged in FIG. 9I). As shown in FIGS. 9K-9M, an analogous finger down, finger drag, and finger up process may be used to rearrange the icons 2332 (and 2334) that are displayed with the first list of information (e.g., exchanging the positions of the "Most Recent" icon and the "Bookmarks" icon).

In some embodiments, in response to detecting a finger contact on a playback completion icon 2314 (FIG. 9B), the device ceases to play the particular online video item 2342, and displays again the first list of information 2330-1 (FIG. 9A). In some embodiments, the finger contact detected on the playback completion icon comprises a tap gesture.

A graphical user interface 2300E on a portable electronic device 100 with a touch screen display 112 includes: a first list 2330-1 of information about online video items in a plurality of lists of information about online video items; and a plurality of icons 2332 corresponding to at least some of the plurality of lists of information about online video items. In response to detecting a finger contact on a first portion 2338 of a row 2340 in the first list 2330-1 of information about online video items, wherein the row contains information about a particular online video item: a request is initiated for the particular online video item 2342 from a remote computer, the particular online video item 2342 is received, and the particular online video item 2342 is played. In some embodiments, in response to detecting a finger contact on a second portion of the row (e.g., additional information icon 2344) in the first list of information about online video items, wherein the second portion of the row is different from the first portion of the row, additional information is displayed about the particular online video item (e.g., in UI 2300G, FIG. 9C). In response to detecting a finger contact on a respective icon 2332 in the plurality of icons, a corresponding list 2330 of information about online video items is displayed.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
   at a portable electronic device with a touch screen display:
   presenting a first plurality of category icons in a first region of the touch screen display of the portable electronic device, wherein:
   each category icon in the first plurality of category icons provides an organization of selections in a digital music library,
   each category icon is associated with a category that includes at least a portion of the selections of the digital music library,
   selection of one of the category icons causes at least a portion of the digital music library selections within the associated category to be displayed in a second region of the touch screen display that is distinct from the first region of the touch screen display, and
   each icon of the first plurality of category icons is constantly displayed in the first region of the touch screen display; and,
   in a user interface for configuring category icons shown in the first region of the touch screen display:
   displaying a second plurality of category icons on the touch screen display;
   receiving a touch input dragging a selected category icon from the second plurality of category icons to a location in the first region of the touch screen display occupied by a category icon of the first plurality of category icons; and
   in response to removal of the touch input, placing the selected category icon in the first region of the touch screen display to form a revised plurality of category icons in the first region of the touch screen display, and removing at least one category icon of the first plurality of category icons from the first region of the touch screen display.

2. A portable electronic device, comprising:
   a touch screen display;
   one or more processors;
   memory; and
   a program, wherein the program is stored in the memory and configured to be executed by the one or more processors, the program including instructions for:
   presenting a first plurality of category icons in a first region of the touch screen display of the portable electronic device, wherein:
   each category icon in the first plurality of category icons provides an organization of selections in a digital music library,
   each category icon is associated with a category that includes at least a portion of the selections of the digital music library, selection of one of the category icons causes at least a portion of the digital music library selections within the associated category to be displayed in a second region of the touch screen display that is distinct from the first region of the touch screen display, and each icon of the first plurality of category icons is constantly displayed in the first region of the touch screen display; and, in a user interface for configuring category icons shown in the first region of the touch screen display:

displaying a second plurality of category icons on the touch screen display;

receiving a touch input dragging a selected category icon from the second plurality of category icons to a location in the first region of the touch screen display occupied by a category icon of the first plurality of category icons; and in response to removal of the touch input, placing the selected category icon in the first region of the touch screen display to form a revised plurality of category icons in the first region of the touch screen display, and removing at least one category icon of the first plurality of category icons from the first region of the touch screen display.

3. A non-transitory computer readable storage medium storing one or more programs, the one or more programs comprising instructions, which when executed by a portable electronic device with a touch screen display, cause the device to:

present a first plurality of category icons in a first region of the touch screen display of the portable electronic device, wherein:

each category icon in the first plurality of category icons provides an organization of selections in a digital music library, each category icon is associated with a category that includes at least a portion of the selections of the digital music library, selection of one of the category icons causes at least a portion of the digital music library selections within the associated category to be displayed in a second region of the touch screen display that is distinct from the first region of the touch screen display, and each icon of the first plurality of category icons is constantly displayed in the first region of the touch screen display; and, in a user interface for configuring category icons shown in the first region of the touch screen display:

display a second plurality of category icons on the touch screen display;

receive a touch input dragging a selected category icon from the second plurality of category icons to a location in the first region of the touch screen display occupied by a category icon of the first plurality of category icons; and in response to removal of the touch input, place the selected category icon in the first region of the touch screen display to form a revised plurality of category icons in the first region of the touch screen display, and remove at least one category icon of the first plurality of category icons from the first region of the touch screen display.

* * * * *